United States Patent [19]
Takeuchi et al.

[11] Patent Number: 5,880,953
[45] Date of Patent: Mar. 9, 1999

[54] CONTROL SYSTEM AND INFORMATION RECORDING AND REPRODUCING APPARATUS

[75] Inventors: Hiroaki Takeuchi, Tenri; Tohru Okuda, Nara, both of Japan

[73] Assignee: Sharp Kabushiki Kaisha, Osaka, Japan

[21] Appl. No.: 786,320

[22] Filed: Jan. 23, 1997

[30] Foreign Application Priority Data

Jan. 26, 1996 [JP] Japan .................................. 8-012249
May 29, 1996 [JP] Japan .................................. 8-135562

[51] Int. Cl.$^6$ ..................................................... G06F 19/00
[52] U.S. Cl. ...................... 364/150; 364/148.1; 364/157; 364/165; 360/78.09
[58] Field of Search ..................................... 364/149, 150, 364/151, 164, 165, 148, 167.01, 176, 157, 152, 148.09, 148.1; 318/561; 360/78.09, 78.06, 75

[56] References Cited

U.S. PATENT DOCUMENTS

| | | | |
|---|---|---|---|
| 4,133,011 | 1/1979 | Kurzweil, Jr. ............................ | 360/78 |
| 4,879,643 | 11/1989 | Chakravarty et al. ............... | 364/161 X |
| 4,914,564 | 4/1990 | Surauer et al. ........................ | 364/153 |
| 5,216,556 | 6/1993 | Steinberg et al. ................... | 369/148 X |
| 5,249,116 | 9/1993 | Cluetens ................................ | 364/157 X |
| 5,483,438 | 1/1996 | Nishimura ............................. | 364/149 |

FOREIGN PATENT DOCUMENTS

| | | |
|---|---|---|
| 3-71415 | 3/1991 | Japan . |
| 4-245079 | 9/1992 | Japan . |
| 5-122970 | 5/1993 | Japan . |
| 5-300782 | 11/1993 | Japan . |
| 6-52563 | 2/1994 | Japan . |
| 7-114781 | 5/1995 | Japan . |

OTHER PUBLICATIONS

High Performance DTF Control System –Precision DTF Control System by Using a Movable Head–Paper for Lecture at Spring Meeting of Institute of Precision Engineering 1996, pp. 1071 and 1072.

High Performance DTF Control System –Precision DTF Control System and Head Wating System in a Non–scanning Period, Paper for Regular Lecture in Kansai Area of Institute of Precision Engineering 1996, pp. 37 and 38.

Precision DTF Control System Using Observer and Modified Observer, 39th Lecture of Federation of Automatic Control (Oct. 17, 1996), pp. 91 and 92.

Primary Examiner—Joseph Ruggiero

[57] ABSTRACT

An actuator moves a signal reproducing element based on an applied control input. An error detector detects a difference in relative position between a desired track and the signal reproducing element. A drive circuit computes the input valuable applied to the actuator based on an output from the error detector and applies it to an adder. On the other hand, the actuator simulation circuit for electrically simulating the characteristics of the actuator estimates the position of the actuator from the control input. Furthermore, a target follow-up estimator estimates a track bend based on outputs from the actuator simulation circuit and the error detector and are fed forward to the adder via a feedforward gain. The Adder applies the computed control input to the actuator. As a result, a control system which offers an improved precision over a wide band can be achieved while maintaining the stability.

39 Claims, 52 Drawing Sheets

HSW

TP

TP2

CK

CONTROL SYSTEM AND INFORMATION RECORDING AND REPRODUCING APPARATUS

FIELD OF THE INVENTION

The present invention relates to a control system which permits a high-precision control over a wide band, and also relates to an information recording and reproducing apparatus such as a magneto-optical recording and reproducing apparatus, etc., provided with the same.

BACKGROUND OF THE INVENTION

In recent years, in the field of information recording and reproducing apparatuses, developments have been made to realize a still higher density and a narrower track width. In the case of reproducing information from tracks of a narrower width; however, adverse effects from a tracking error, i.e., the center of a signal reproducing element deviates from the center of a track, become noticeable, and a sufficient reproducing output cannot be ensured. The possible cause of this tracking error may be an undesirable shape of tracks formed on the recording medium.

For example, in a rotary head type magnetic tape device, the center line of the track width is desirably linear in shape. In practice; however, the center line is deformed from the linear line due to an eccentricity of a rotary drum during a signal recording operation, a running state of a magnetic tape and a linearity of a lead of a fixed drum, etc. In the case of a magnetic disk device of a sector servo system, on-disk position indicative information is recorded by a servo track writer. However, due to oscillation of the servo track writer, or a disk, etc., the position indicative information recorded on the disk does not draw an accurate circle. Therefore, also the center line of the track recorded based on the position indicative information is displaced from the circle. Furthermore, in the case of a disk device adopting a disk in which a magnetic signal or an optical signal is pre-formatted, the center line of the track width has an acentric component generated when mounting the disk to the device. Hereinafter, the deviation of the center line of the track width with respect to a desirable shape is referred to as a track bend irrespectively of the kind and the shape of the recording medium.

In general, the track bend has a basic frequency $f_{tr}$, and this frequency component is the most important factor. For example, in the case of the rotary head type magnetic tape device, the basic frequency $f_{tr}$ corresponds to such frequency that a time interval from an approach of the magnetic head to the magnetic tape to a retrieval thereof is one period. While in the disk device adopting the pre-formatted disk, the basic frequency corresponds to the rotation frequency of the disk.

As an example of the track bend, FIG. 47 shows a track recorded by the rotary head type magnetic tape device. As shown by an alternate long and short dashed line in the figure, the center line of the track is wounded and is deformed from the desirable shape shown by the solid line. Therefore, the track bend Tr in a track scanning period of from t1 till t5 of the magnetic head is as shown in FIG. 48.

As the track becomes narrower, the permissible range of the tracking error is reduced. Therefore, in order to ensure a requested tracking precision, the dynamic tracking method has been adopted, wherein the signal reproducing element is mounted to an actuator which can be deformed in a track widthwise direction, to make the signal reproducing element follow the track bend.

As shown in the control block diagram of FIG. 49, in the conventional information recording and reproducing apparatus adopting the dynamic tracking technique, an error detector 101 detects a relative position error between the center line of a signal reproducing element 102 and the center line of the track based on a reproducing signal of the signal reproducing element 102 and outputs it as an error signal Err.

The error detector 101 is equivalently expressed by a comparator 101a for comparing the position X of the signal reproducing element 102 with the track bend Tr and an error detection gain 101b for converting a relative position error Xerr into a voltage level. In practice, the error detector 101 is not only arranged so as to include circuits 101a and 101b but also arranged so as to directly detect the error signal Err based on the reproducing signal of the signal reproducing element 102, for example, using the sector servo system in the disk device. Therefore, the described error detector 101 has such a drawback that the track Tr and the position X cannot be detected independently.

Furthermore, a drive circuit 103 applies an operation signal Sd1 to an actuator 104 based on the error signal Err, and the actuator 104 moves the signal reproducing element 102 in a track widthwise direction. As a result, the signal reproducing element 102 is guided to a position where the center line coincides with the control line of the track.

Especially, in the case of the rotary head type magnetic tape device, a magnetic tape is wound around a rotary drum at a predetermined winding angle, and a scanning period in which the magnetic head scans on the magnetic tape and a non-scanning period in which the magnetic head does not scan on the magnetic tape are formed. In this case, as shown in FIG. 50, a switch 105 is provided between the error detector 101 and the drive circuit 103 shown in FIG. 49. By the switch, the magnetic head is switched between a scanning state and a non-scanning state, and a signal of 0 level is inputted to the drive circuit 103 in the non-scanning period.

In respective arrangements shown in FIG. 49 and FIG. 50, the scanning period is used in common. Thus, hereinafter, explanations will be given mainly through the information recording and reproducing apparatus shown in FIG. 49. The control system of the information recording and reproducing device is, for example, shown by a block of a transfer function shown in FIG. 51.

Therefore, the open-loop transfer function $G_{open}$ of the control system is given by the equation (1):

$$G_{open} = K_e \cdot G_1(s) \cdot G_A(s) \tag{1},$$

wherein s is a Laplacean operator. In general, the actuator 104 is a second-order lag element having a resonance point, and the transfer function depends on a frequency as expressed in a function $G_A(s)$.

Normally, in the control system adopting the actuator 104 having a resonance point, effects from the resonance point are removed by means of, for example, a notch filter, etc., and a control band (gain-crossover frequency of open-loop transfer characteristics) is generally set lower than the resonance frequency $f_r$.

However, updated information recording and reproducing apparatuses are required to have the following features: The fundamental frequency $f_{tr}$ of the track bend Tr is sufficiently high, and in the case of controlling a dynamic tracking, the signal reproducing element 102 follows with high precision even with respect to the fundamental frequency component $f_{tr}$ and a high-order component. It is therefore required to set the resonance frequency $f_r$ to be very high. However, when the resonance frequency $f_r$ is raised by setting a spring constant of the actuator 104 high, a power consumption is increased. Thus, it is difficult to apply the described arrangement in practical applications.

Thus, it is a necessary condition that the resonance frequency $f_r$ of the actuator 104 is slightly higher than the fundamental frequency $f_{tr}$ of the track bend Tr. As a result, a sufficient control band cannot be obtained when removing the effects from the resonance point by a notch filter, etc.

Therefore, in order to solve the above problem, a control system in which the control band is set higher than the resonance frequency $f_r$ of the actuator 104 is known, and the control system adopting the control system is used. Hereinafter, the described control system is referred to as a punch-through servo system. In the control system, as shown in FIG. 52, in a vector trace of the open-loop transfer function, a gain achieved when the phase is in a vicinity of $-180°$ is set sufficiently high. Furthermore, in the subsequent vector trace, each element which constitutes a control system is set in such a manner that the gain is converged to 0 while observing $-1$ to the left. In the field of a control engineering, the condition for allowing the vector trace of the open-loop transfer function to pass while observing $-1$ to the left side is a stable condition, and thus, it can be said that the punch-through servo system is an effective control system which permits a control over a wide band while maintaining the stability.

The control system of FIG. 51 adopts a punch-through servo system in which a gain, a phase compensation circuit, and a constant of the low pass filter which constitute the drive circuit 103 are adjusted. Such low pass filter is adopted to remove the effects from the resonance point of the higher-order of the actuator 104. In this case, the open-loop transfer function $G_{open}$ of the control system can be derived from the equation (1).

An example of the open-loop transfer characteristics $G_{open}$ of the control system adopting the punch-through servo system is shown in FIG. 53. The control system satisfies the stable conditions, and the gain-crossover frequency $f_c$ is set substantially higher than the resonance frequency $f_r$ of the actuator 104, thereby permitting the signal reproducing element 102 to follow the high-order component of the track bend Tr.

However, in the control system adopting the punch-through servo system, the follow-up frequency band with respect to the track bend Tr is expanded, while the open-loop gain in the fundamental frequency $f_{tr}$ of the track bend Tr is limited due to the phase compensation for satisfying the conditions for the punch-through servo system. Namely, the follow-up precision of the signal reproducing element 102 with respect to the fundamental frequency $f_{tr}$ of the track bend Tr cannot be improved.

As the fundamental frequency component $f_{tr}$ is the most important factor for the track bend Tr, especially, in the case of a narrow track width, it is difficult to ensure a sufficient reproducing power, and meet the specification.

In consideration of the above, it is desired to improve the open-loop gain while maintaining a frequency band that can be controlled. In the punch-through servo system, in a higher frequency band than a resonance frequency $f_r$ of the actuator 104, a minimum phase margin is ensured by utilizing effects of the phase-lead compensation. Therefore, any mean to improve the open-loop gain to solve the above problem would not lead a reduction in the phase margin.

In the information recording and reproducing device, for example, an error detector 101 of the rotary head type magnetic tape device adopts a two frequency pilot signal system, a four pilot signal system, a wobbling system etc., as a detection method of an error. While in the disk device, a sector servo system, a magnetic signal pre-format servo systems an optical signal pre-format servo system, etc., is adopted. In any of the described error detection methods, an error signal Err indicative of a relative position error between the signal reproducing element 102 and a track as desired is directly detected. Therefore, the error detector 101 has such a drawback that the track bend Tr cannot be detected alone by isolating therefrom the displacement X of the signal reproducing element 102. Namely, the method of improving the follow-up precision by feed-forwarding the track bend Tr, i.e., the target to be followed by the signal reproducing element 102 cannot be adopted.

In order to solve the described problem, for example, Japanese Unexamined Patent Application No. 71415/1991 (Tokukaihei 3-71415) discloses a rotary head type magnetic tape device including a neuron learning control part in the control loop. According to the neuron learning control system adopted in the magnetic tape device, when a desired value has a periodically repetitive waveform, the offset can be made significantly smaller. The respective track bends Tr of respective tracks of the magnetic tape are strongly interrelated, and by performing the neuron learning control, the magnetic head in the magnetic tape device can follow the track bend Tr at high precision.

However, the neuron learning control part is constituted by the positive feedback loop containing an dead time element, and a uncountable number of poles exist therein. As a result, when introducing the neuron learning control part, the control system is apt to become unstable compared with the state before the neuron learning control element is adopted. On the other hand, in the control system adopting the punch-through servo system, as only a minimum phase margin is formed, it is difficult to introduce therein the neuron learning control part. Furthermore, in the neuron control, the problem that a residual eccentricity is increased on the contrary with respect to a desired value having a different frequency from the repetitive frequency is newly raised. Thus, the introduction of the described neuron learning control part do not offer the solution to the above-mentioned problem.

As another method of solving the described problem, Japanese Unexamined Patent Application No. 114781/1995 (Tokukaihei 7-114781) discloses a method of measuring the track bend Tr to be stored and feeding it forward when reproducing a signal. However, as this method raises a new problem that a special mechanism and time for measuring the track bend Tr are required.

Furthermore, although it is not a solution for directly solving the described problem, Japanese Unexamined Patent Application No. 52563/1994 (Tokukaihei 6-52563) discloses an information recording and reproducing apparatus in which a control ability is improved by adopting a disturbance observer. As shown in FIG. 54, the information recording and reproducing apparatus includes a disturbance observer 106 in addition to the arrangement of the information recording and reproducing apparatus shown in FIG. 49. In this figure, D indicates a disturbance to be exerted on the actuator 104, and 106b indicates a position detector for detecting the position X of the signal reproducing element 102.

In the disturbance observer 106, an actuator simulation circuit 106a electrically simulates characteristics of the actuator 104, and the position X of the signal reproducing element 102 is estimated based on the drive signal Sd to be applied to the actuator 104. On the other hand, the position detector 106b detects a position X of the signal reproducing element 102. The comparator 106c estimates a disturbance D by comparing an output of the actuator simulation circuit 106a with an output of the position detector 106b. The estimated disturbance $\hat{D}$ is fed forward to a drive signal through an inverse characteristic simulation circuit 106d which simulates the inverse characteristics of the actuator 104. As a result, the disturbance observer 106 cancels out the disturbance D applied to the actuator 104.

Therefore, like the conventional information recording and reproducing apparatus, in the case where the effect of the track bend Tr is relatively small as the track width is relatively wide, and a main cause of hindering the dynamic tracking control is a disturbance, i.e., the control is considered to a constant value control, the disturbance observer 106 is very effective.

However, the updated information recording and reproducing apparatus which have developed in terms of higher density (narrower track), it is required to make the signal reproducing element 102 follow over a wide band with high precision and over wide band even with respect to a fine track bend Tr which has not been a problem in the conventional arrangement. However, the disturbance observer 106 is provided only for suppressing the disturbance D which is exerted onto the actuator 104, and it does not improve a follow-up function with respect to the desired value. Therefore, in the described case, the disturbance observer 106 does not offer desirable effects.

As described, any of the conventional techniques does not offer a solution to achieve an information recording and reproducing apparatus which permits only a relative position error between the track and the signal reproducing element 102 to be detected by the error detector 101, and the signal reproducing element 102 to follow the track bend Tr over a wide band with high precision. This is a serious drawback in the control system adopting the punch-through servo system.

SUMMARY OF THE INVENTION

It is therefore an object of the present invention to provide a control system which offers an improved precision over a wide band while maintaining a stability, and an information recording and reproducing apparatus which offers an improved follow-up function of a signal recording and reproducing element with respect to a desired value.

In order to achieve the object, a control system in accordance with a preferred embodiment of the present invention is characterized by including: a detector for detecting a relative difference between a controlled variable of the object and a desired value; a drive circuit for adjusting a control input be applied to the object based on the relative difference; an object simulation circuit for estimating the controlled variable of the object based on the variable input to be applied to the object and outputs a controlled variable estimated signal; a target follow-up estimation circuit for estimating a target follow-up value of the controlled variable based on the relative difference and the controlled variable estimated signal and outputs a desired follow-up estimated signal; and a feedforward gain for feeding the desired follow-up estimated signal forward to an input side or an output side of the drive circuit. The object to be controlled performs a mechanical operation, and the controlled variable may be a position, etc. As an example of the desired value, in the case of a track formed on the recording medium, the target to be followed corresponds to a track bend.

According to the described arrangement, the target follow-up estimation circuit can estimate the target to be followed at real time even when the target cannot be detected independently, and the estimated result is fed forward to the controlled variable of the target to be controlled at real time. As the controlled variable is applied to the object to be controlled after being compensated in the feedback forward loop, an improved follow-up precision of the object to be controlled can be achieved with respect to the desired value over a wide follow-up frequency band while maintaining a stability compared with the conventional device.

In the described arrangement, it is preferable that the feedforward gain includes an inverse characteristic simulation circuit for simulating inverse characteristics of the object to be controlled and a filter such as a low-pass filter, a band-pass filter., etc. In this arrangement, in the feedforward loop, the filter removes a frequency component of a predetermined band such as a high frequency band, etc. This permits for example, in a specific band such as a low band, the follow-up precision of the control system to be improved, and, for example, in a residual band such as a high band, etc., the characteristics of the control system can be maintained as in the conventional control system. As a result, due to the effects of an idle time and the high-order resonance of the object to be controlled, even in an event of a phase shift, a stable operation of the control system can be ensured.

When the control system of a simplified structure is desired, it is preferable that the object simulation circuit and the inverse characteristic simulation circuit have the following arrangements. Both of these circuits simulate at least the characteristics and inverse characteristics of the highest-order, for example, second-order integration of all the characteristics of the object to be controlled. Alternatively, in the case of the band pass filter which allows a frequency component that is the same as a fundamental frequency of the follow-up target to be controlled to pass therethrough, it is the most preferable that at least one of these circuits simulates characteristics and inverse characteristics of the object to be controlled in a passing band of the band pass filter. In either arrangements, as these circuits do not simulate all of the characteristics and inverse characteristics, the respective structures of these circuits can be simplified. As a result, a control system which offers the same effect as achieved by simulating all the characteristics can be achieved with a simpler structure.

In order to achieve the aforementioned object, a control system in accordance with still another preferred embodiment is characterized by including: a detector for detecting a relative error between a controlled variable of the object to be controlled and a desired value, and a drive circuit having a positive feedback loop through a filter such as a low-pass filter, a band-pass filter, etc., for adjusting the controlled variable to be applied to the object to be controlled based on the relative error. According to the described arrangement, as the positive feedback loop is constituted by the filter, it can be simplified as compared to the feedforward loop. Additionally, the positive feedback loop offers an improved open-loop gain of the control system while maintaining the stability. As a result, an improved follow-up precision of the object to be controlled can be achieved with respect to the desired value compared with the conventional control system with a still simpler structure while maintaining the stability.

In each of the described arrangements, in the case of adopting a band-pass filter which allows the component of the same frequency as the fundamental frequency of the target to be followed by the object to be controlled as a filter which constitutes the feed forward loop or the positive feedback loop, it is preferable that each drive circuit includes a phase compensation part for performing a phase-lead compensation in a higher frequency band than the resonance frequency of the object to be controlled. In the described arrangement, the open-loop gain of the control system is held as in the conventional control system in a band apart from the fundamental frequency. In the case where the object to be controlled is a second-order lag element having a resonance point, a control can performed over a wider band without setting the resonance frequency of the object to be controlled high. Therefore, while maintaining the power consumption of the object to be controlled from the conventional control system, an improved follow-up precision with respect to the desired value of the object to be controlled can be adjusted while expanding the frequency band.

For example, in the case where a desired value for the object to be controlled is intermittingly applied such as the tracking control in the rotary head type magnetic tape device, etc., it is desirable that the control system includes a drive circuit for adjusting a controlled variable to be applied to the object to be controlled based on an input control; a detector for supplying a relative difference between the controlled variable of the object to be controlled and the desired value to the drive circuit during a detection period in which a desired value is generated; an object simulation circuit for estimating the controlled variable and outputting the controlled variable estimated signal; a target follow-up estimation circuit for estimating a target follow-up value of the controlled variable based on the relative error and the controlled variable estimated signal and outputting a desired follow-up estimated signal; target stand-by generation circuit for generating a target stand-by signal indicative of a target to be followed of a controlled variable in other non-detection period based on the desired follow-up estimated signal in the detection period; and a comparison circuit for supplying a difference signal between the target follow-up signal and the controlled variable estimated signal to the drive circuit.

In the described arrangement, during the non-detection period, a difference signal between the target stand-by signal and the controlled variable estimated signal is inputted in replace of the relative error. Therefore, the object to be controlled is controlled even in the non-detection period as desired without oscillation. As a result, the control system can make the target follow the desired value immediately from the start of the next detection period, thereby permitting an improved follow-up precision at a start of each detection period.

As for the target stand-by generation circuit, various arrangements are applicable. For example, a preferred embodiment is arranged such that the target stand-by generation circuit includes a memory circuit which holds the desired follow-up estimated signal at a start of the detection period, and during the next detection-detection period, keeps outputting a value thus held as a target stand-by signal. According to the described arrangement, for example, like the magnetic tape device, in the case where the respective target follow-up values at a start of each detection period are interrelated, the object to be controlled is surely guided to a vicinity of the target position to be followed at a start of each detection period. As a result, a still improved follow-up precision of the control system at a start of detection period can be achieved.

In a still more preferred embodiment, the control system may include the target stand-by generation circuit generates a signal whose value at the end of non-scanning period coincides with the value of the desired follow-up estimated signal at a start of the detection period, and has a waveform which does not contain a DC component as the target stand-by signal during the non-detection period. In the described arrangement, in the non-detection period, as the controlled variable of the object to be controlled does not include a DC offset, a DC offset of a relative error in the subsequent detection period is eliminated, thereby achieving a still Improved follow-up precision in the detection period.

Each of the described control systems permit a various kinds of objects to be controlled. Among all, the control system is suited especially for controlling an actuator for driving a signal recording and reproducing part of the information recording and reproducing apparatus. In the case of adopting the control system to the information recording and reproducing apparatus, the signal recording and reproducing part can follow the target such as a track bend, etc., in a wide band with high precision while maintaining the stability. Especially, in the case of following the signal recording and reproducing part to the track, the control system permits the signal recording and reproducing part to follow even a fine track bend which have not been a problem at a recording density of the conventional recording medium, thereby improving a recording density and a recording capacity of the recording medium.

In order to achieve the above object, the control system in accordance with still another embodiment is arranged so as to include a signal recording and reproducing part for performing at least a recording and reproducing operation; an actuator for moving the signal recording and reproducing part; a drive circuit for adjusting a controlled variable to be applied to the actuator with respect to a recording medium on which tracks are formed; an actuator simulation circuit for estimating a position of the signal recording and reproducing part and outputting the estimated position signal; and a comparative circuit for inputting a difference signal between a desired value indicative of a desired position of the signal recording and reproducing part and the estimated position signal to the drive circuit.

According to the described arrangement, the signal recording and reproducing part is moved in accordance with a difference between the desired value and the estimated position signal. This permits the information recording and reproducing apparatus to guide the signal recording and reproducing part to the target position such as a target track position at high speed. The described arrangements permit the processes required in the conventional arrangement to be eliminated such as a speed control in accordance with a speed of the signal recording and reproducing part, a detection of the position of the signal recording and reproducing part, etc., thereby achieving a simplified structure of the information recording and reproducing apparatus.

For a fuller understanding of the nature and advantages of the invention, reference should be made to the ensuing detailed description taken in conjunction with the accompanying drawings.

DESCRIPTION OF THE PREFERRED EMBODIMENT

[First Embodiment]

The following description will discuss one embodiment of the present invention with reference to FIG. 1 through FIG. 6 and FIG. 30 through FIG. 32.

A control system in accordance with the present invention is provided in an information recording and reproducing apparatus such as a rotary head magnetic tape device, a magnetic disk device, or an optical disk device, etc., and controls an actuator for displacing, for example, a signal reproducing element such as a magnetic head, an optical pickup, etc., in a track widthwise direction.

Figure 1:
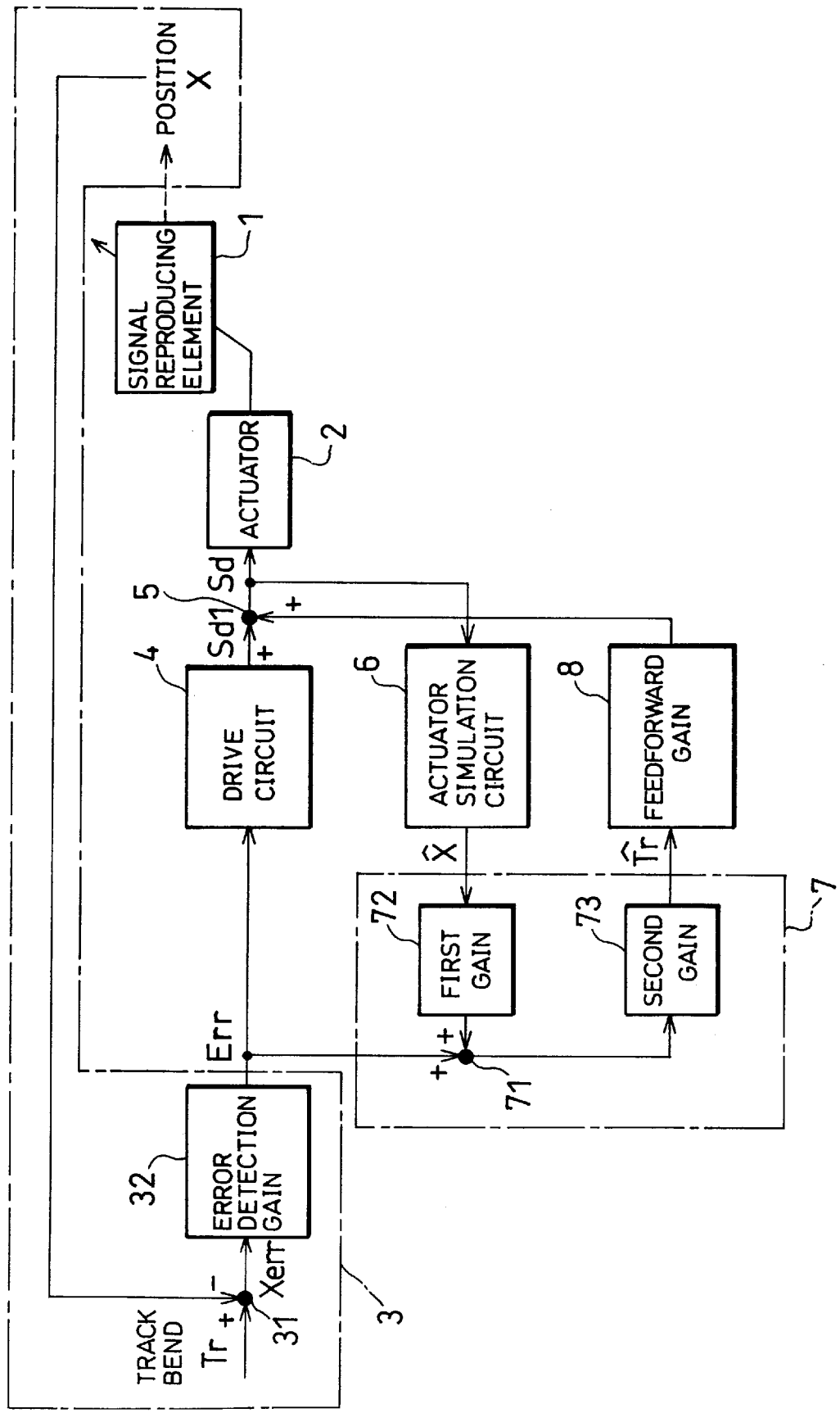
FIG. 1 is a block diagram showing a structure of essential parts of a control system adopted in respective information recording and reproducing apparatuses in accordance with first through sixth embodiments of the present invention.

As shown in FIG. 1, the control system includes a signal reproducing element 1 (signal recording and reproducing part), an actuator 2 (object to be controlled), an error detector 3 (detector), and a drive circuit 4 (controlling element). The signal reproducing element 1 is provided for reproducing a signal from the track formed on the recording medium. The actuator 2 is provided for moving the signal reproducing element 1. The error detector 3 is provided for detecting a relative positioning error signal Err (hereinafter simply referred to as an error signal Err) corresponding to a relative positioning error Xerr between the track bend Tr and the position X of the signal reproducing element 1. The drive circuit 4 is provided for adjusting a variable input to be applied to the actuator 2.

Figure 2:
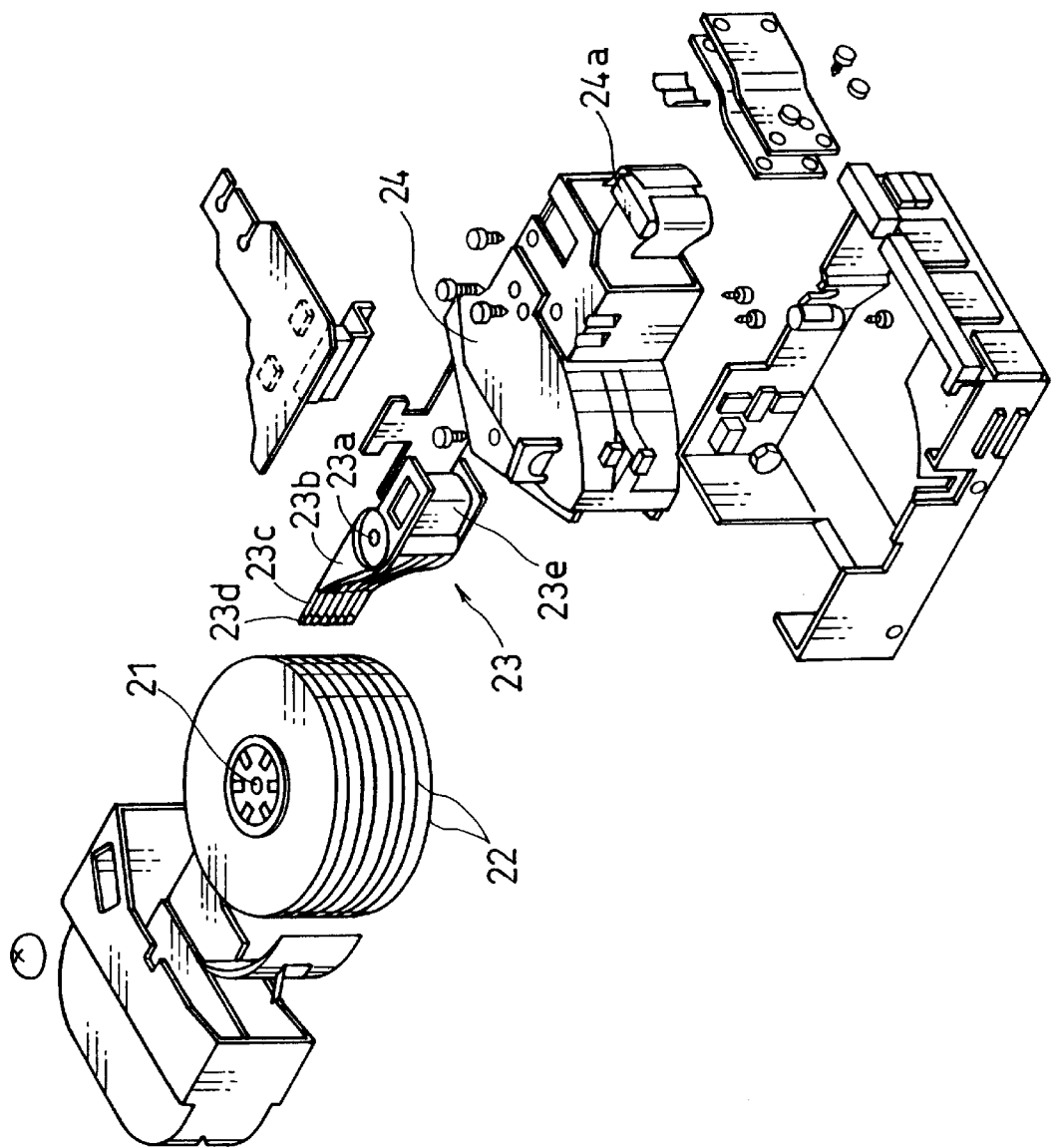
FIG. 2 which shows an example structure of the information recording and reproducing apparatus is a perspective view showing essential parts of a disk device.

The structure of essential parts of the magnetic disk device disclosed in Japanese Unexamined Patent Application No. 68623/1994 (Tokukaihei 6-68623) as an example of the information recording and reproducing apparatus will be explained. As shown in FIG. 2, the magnetic disk device includes a plurality of disks 22, an actuator arm assembly 23 (hereinafter simply referred to as an assembly), and a housing 24. The plurality of the disks 22 are provided so as to be rotatable about a spindle shaft 21. The assembly 23 includes a plurality of magnetic heads (not shown) provided on a signal recording and reproducing surface of the respective disks 22. The housing 24 rotatably supports the assembly 23 through an actuator shaft 23a. At the end portion on the disk side of the assembly 23, a plurality of arms 23b are provided. At a leading end of each arm 23b (end portion on the disk side), a slider 23d is mounted via a load spring 23c. Furthermore, the slider 23d supports the magnetic head. At the other end portion of the assembly 23, a voice coil 23e for rotating the assembly 23 about the actuator shaft 23a is provided. In the housing 24, a permanent magnet 24a is provided.

In the described arrangement, upon energizing the voice coil 23e, an electromagnetic force is generated between the voice coil 23e and the permanent magnet 24a, whereby the assembly 23 is rotated in the rotating direction of the actuator shaft 23a. As a result, a relative position between the magnetic head and the disk 22 varies. Therefore, the position of the magnetic head with respect to the disk 22 can be controlled by adjusting a current supplied to the voice coil 23e.

In the described example, the magnetic head and the assembly 23 including the voice coil 23e respectively corresponds to the signal reproducing element 1 and the actuator 2 in FIG. 1. As another example of the information recording and reproducing device, a drum device of a rotary head-type magnetic tape device disclosed in Japanese Examined Patent Application No. 8486/1993 (Tokukohei 5-8486) will be briefly explained. The drum device is provided with a dynamic tracking mechanism of a moving magnet system.

Figure 30:
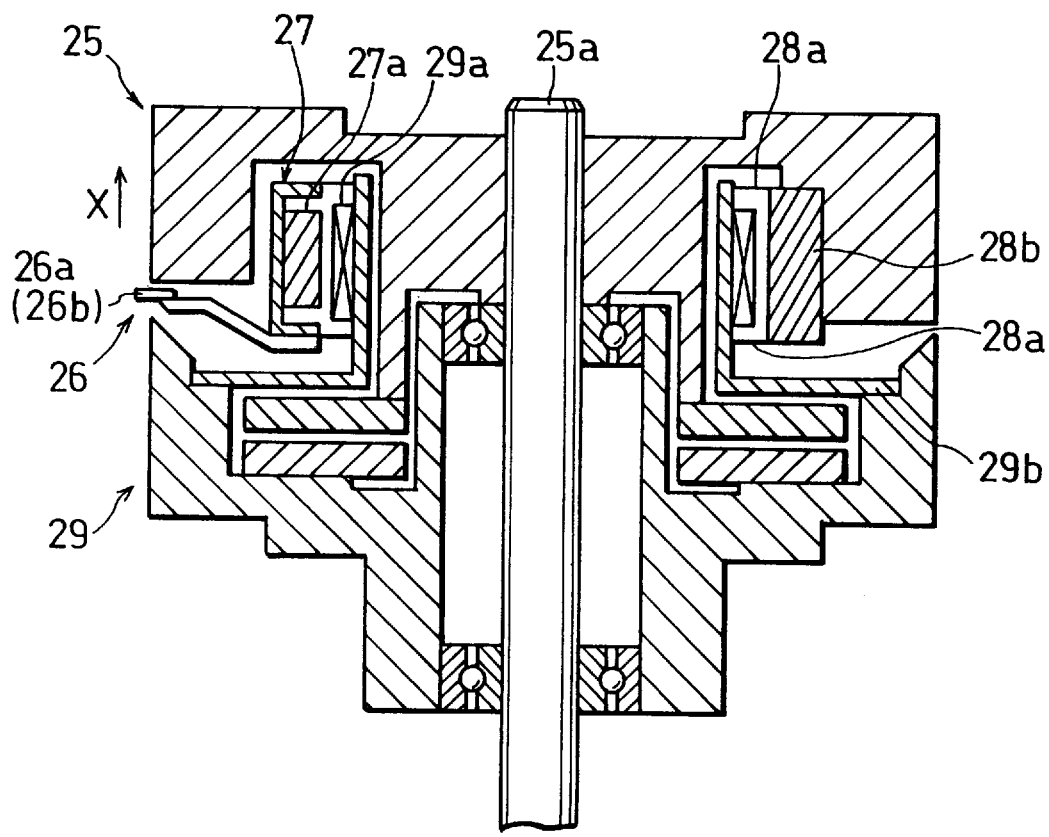
FIG. 30 which shows the structure of the respective information recording and reproducing apparatuses adopted in the embodiments of the present invention is a cross-sectional partial view showing essential parts of a drum device in a rotary head-type magnetic tape device.
Figure 31:
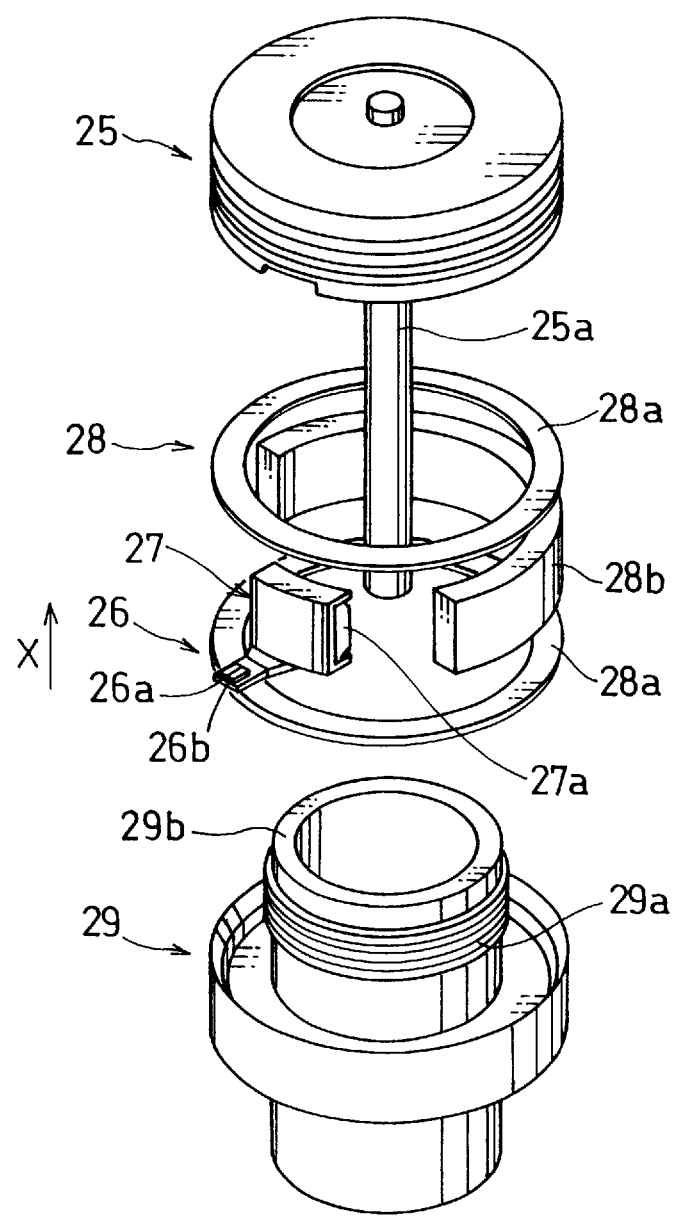
FIG. 31 is a perspective view showing essential parts of the drum device.

As shown in FIG. 30 and FIG. 31, the drum device includes a rotary drum 25 which integrally rotates with a rotary shaft 25a, a magnetic head 26, a movable piece 27, a parallel plate spring mechanism 28 for supporting the movable part 27 so as to be movable in a height direction (axis direction) X, and a fixed drum 29 for supporting the rotary shaft 25a so as to be rotatable.

The parallel plate spring 28 includes two ring-shaped plate springs 28a and a fixing member 28b. Both of the plate springs 28a are fixed to the rotary drum 25 by the fixing member 28b. The plate springs 28a support the movable piece 27, thereby permitting the movable piece 27 to move in a height direction X.

The magnetic head 26 includes two magnetic heads 26a and 26b, and the magnetic heads 26a and 26b are provided so as to have a gap of one track pitch in the height direction X. The magnetic heads 26a and 26b are amounted to the movable piece 27 via the same head base.

Furthermore, the movable piece 27 includes a permanent magnet 27a, and the fixed drum 29 has a stator 29b having a drive coil 29a wound therearound, the magnetic flux generated by the permanent magnet 27a crosses the drive coil 29a.

According to the described arrangement, upon energizing the drive coil 29a, by the Fleming's rule of the left hand, the drive force is generated in the height direction X with respect to the permanent magnet 27a. Therefore, the movable piece 27 is moved to a position where the driving force balances with a reaction force of the parallel plate spring mechanism 28. By the control current to the drive coil 29a, the height of the magnetic head 26 mounted to the movable piece 27 can be adjusted.

In the described embodiment, the magnetic head 26 corresponds to the signal reproducing element 1, the movable piece 27, and the parallel plate spring mechanism 28 and the drive coil 29a correspond to the actuator 2. In this case, the input part of the actuator 2 corresponds to the input part of the drive coil 29a. Namely, by applying a drive voltage to the actuator 2, the signal reproducing element 1 is displaced.

When recording and reproducing a signal, the magnetic tape (not shown) is wound around an outer surface of the drum device over 180°. Therefore, by displacing the magnetic head 26 in the height direction X, the magnetic head 26 is also displayed in a width direction X of a track formed on the magnetic tape.

It should be noted here that the signal reproducing element 1 and the actuator 2 are not limited to those shown in FIG. 2, FIG. 30 and FIG. 31, and those having other arrangements may be adopted.

Figure 3:
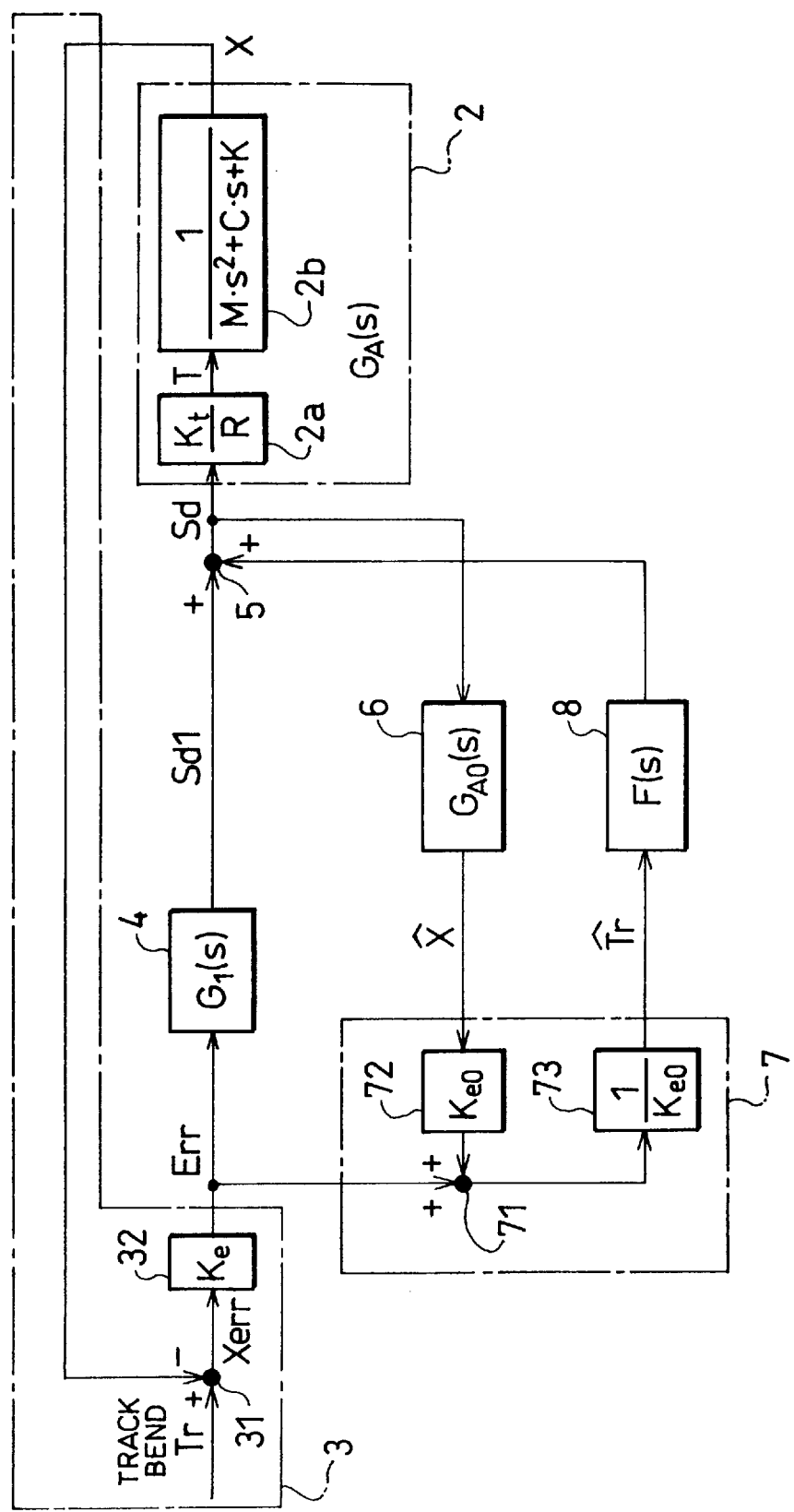
FIG. 3 is a control block diagram in which each block in the equivalent circuit of FIG. 1 is shown in transfer function.

As shown in FIG. 3, when the structure of FIG. 1 is expressed in a transfer function, the actuator 2 is divided into the first block 2a for converting a drive signal Sd into a driving force T and the second block 2b indicating a response (displacement X) of the actuator 2 in response to the driving force, and the transfer function $G_A(s)$ of the actuator 2 is a product of transfer functions of both the first block 2a and the second block 2b. Thus, the transfer function $G_A(s)$ of the actuator 2 is obtained by the following equation (2):

$$G_A(s)=(Kt/R)/(M \cdot s^2+C \cdot +K) \tag{2}$$

wherein M is a mass of a movable part, C is a viscosity coefficient inducing effects from a back electromotive force, K is a spring constant, R is an electric resistance of a drive coil, and $K_c$ is a force factor (drive force/current).

As is clear from the equation (2), the actuator 2 in accordance with the present embodiment is a second-order lag element having a resonance point. In the equation (2), s is a Laplacean operator, and the element $G_A(s)$ expressed using the Laplacean operator s depends on frequency.

Figure 4:
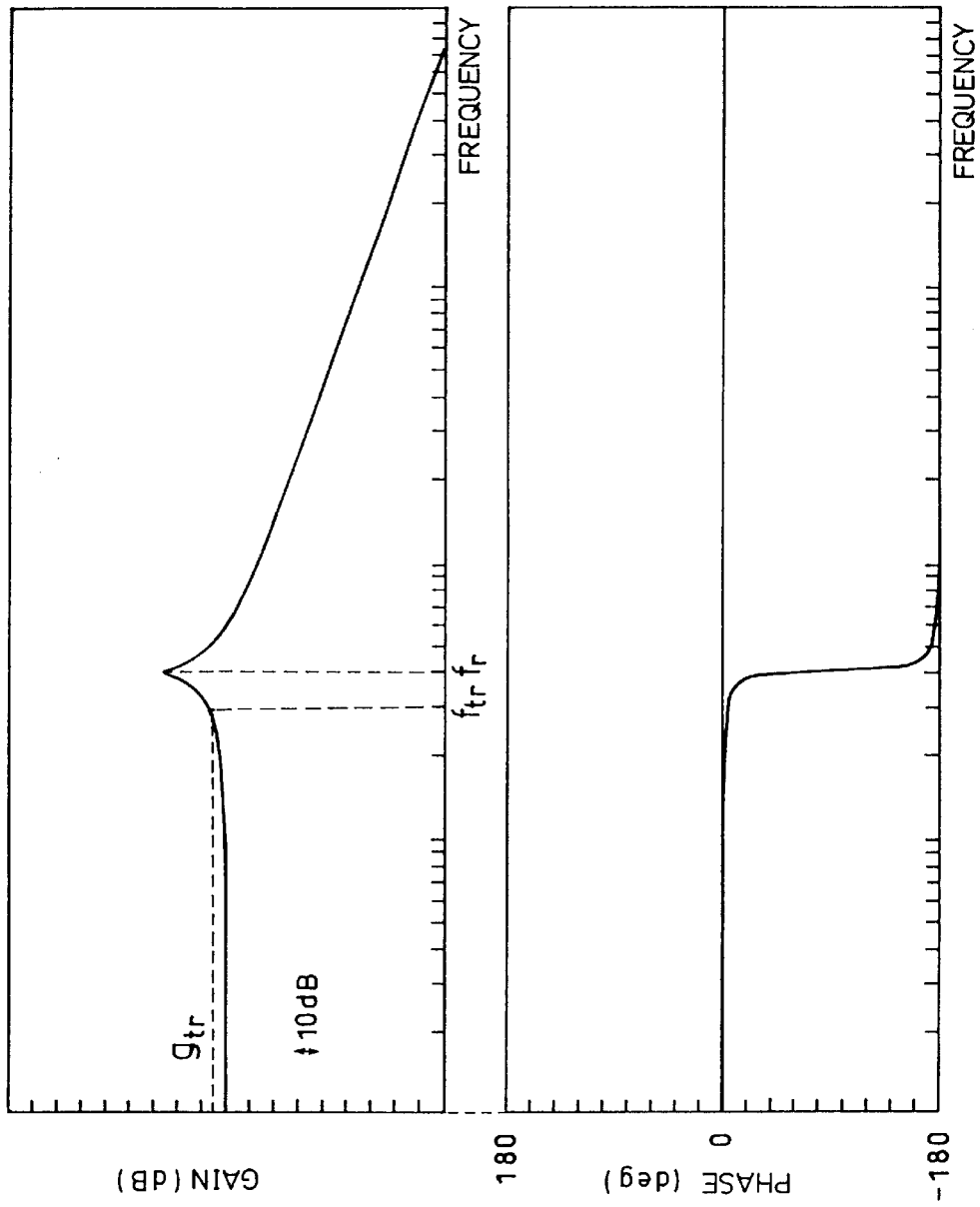
FIG. 4 is a Bode diagram showing characteristics of an actuator in the control system of FIG. 3.

For example, as shown in FIG. 4, the actuator 2 in accordance with the present embodiment is arranged such that the resonance frequency $f_r$ is set in slightly upper frequency than the fundamental frequency $f_{tr}$ of the track bend Tr in consideration of the power consumption, etc.

The error detector 3 outputs a signal indicative of an error with regard to a relative position between the position X of the signal reproducing element 1 and the track bend Tr of a target to be followed. The error detector 3 is equivalently expressed by a comparator 31 for comparing the position X of the signal reproducing element 1 with the track bend Tr, and the error detection gain 32 for converting the relative positioning error Xerr as a result of comparison into a voltage level. The factor Ke of the error detection gain 32 depends on the reproducing sensitivity of the signal reproducing element 1. The error detector 3 generally adopted in the information recording and reproducing apparatus cannot detect the track bend Tr and the position x independently, and directly detects the error signal Err which corresponds to the relative positioning error Xerr, for example, using the sector servo system, etc., based on a reproduced output by the signal reproducing element 1. Namely, the comparator 31 and the error detection gain 32 do not exist in the form of actual electric circuits. The error signal Err is given by the following equation (3):

$$Err=K_e \cdot (Tr-X) \tag{3}$$

As to the detection method, for example, the 2-frequency pilot signal system, the 4-frequency pilot signal system, and the wobbling system may be adopted for the rotary head type magnetic tape device; and sector servo system, magnetic signal pre-format servo system, and an optical signal pre-format servo system, etc., may be adopted for the disk device.

Figure 32:
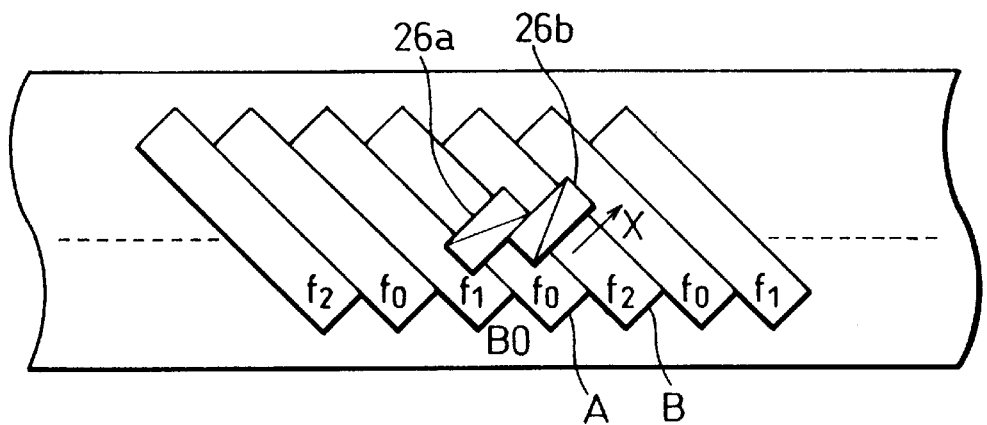
FIG. 32 is an explanatory view explaining a track pattern in the rotatable-head type magnetic tape apparatus.

Here, as an example detection method of a relative positioning error performed by the error detector 3, the two-frequency pilot signal system adopted by the rotary head type magnetic tape device will be briefly explained in reference to FIG. 32. Here, the head has the arrangement shown in FIG. 30 and FIG. 31.

In the two-frequency pilot signal system, pilot signals f1 and f2 of mutually different frequencies are recorded in a state where they are superimposed on the main signal. The track on which the pilot signal f1 is recorded and the track on which the pilot signal f2 is recorded are mutually disposed with the track on which the pilot signal is not recorded (denoted as f0 in FIG. 32) in between. While the magnetic head 26a scans the track A on which the pilot signal is not recorded, the magnetic head 26a reproduces the pilot signals f1 and f2 from the adjoining tracks B0 and B as a cross-talk component. The respective levels of the reproduced pilot signals f1 and f2 change by a correlation in relative position between the magnetic head 26a and the track A. Therefore, by comparing respective levels, an error in relative position between the magnetic head 26a and the track A can be detected.

The magnetic heads 26a and 26b shown in FIG. 30 and FIG. 31 are positioned with an interval of one track pitch in between in the track width direction. The magnetic heads 26a and 26b are mounted on the same actuator 2, and the relative position of the magnetic heads 26a and 26b do not vary. Therefore, based on the detected error in relative position, by making the magnetic head 26a to follow the track, the magnetic head 26b automatically follows the adjacent track.

It should be noted here that other detection methods may be adopted as long as the position of the signal reproducing element 1, and a relative error with regard to the relative position between the position X of the signal reproducing element 1 and the track bend Tr can be detected.

The drive circuit 4 includes a gain, a phase compensation and a low-pass filter, etc., which are respectively adjusted to be suited for conditions of the aforementioned punch-through servo. The transfer function of the drive circuit 4 as a whole is given by $G_1(s)$.

Additionally, as shown in FIG. 1 and FIG. 3, the control system in accordance with the present embodiment includes an adder 5, an actuator simulation circuit 6 (transfer function: $G_{A0}(s)$) and a target follow-up estimator 7, and a feedforward gain 8 which constitute a feedforward loop. The adder 5 is provided between the drive circuit 4 and the actuator 2. The actuator simulation circuit 6 estimates the position X of the signal reproducing element 1 from the control input Sd to be applied to the actuator 2 and outputs the estimated position signal $\hat{x}$. The target follow-up estimator 7 makes an estimation of the track bend Tr of the target to be followed by the signal reproducing element 1 based on the outputs from the error detector 3 and the actuator simulation circuit 6. The feedforward gain 8 is provided for feeding the desired follow-up estimated signal $\hat{Tr}$ forward to the adder 5 with a predetermined gain (transfer function F(s)).

Thus, the control input Sd to be received by the actuator 2 is obtained by feeding the desired follow-up estimated signal $\hat{Tr}$ to be added to the control input specified by the drive circuit 4. Here, the actuator simulation circuit 6 and the target follow-up estimator 7 are respectively correspond to the object simulation means and the target follow-up estimation means recited in claims.

The target follow-up estimator 7 includes an adder 71, the first gain 72 with a factor of $K_{e0}$, and the second gain 73 with a factor of $1/K_{e0}$. In the target follow-up estimator 7, the adder 71 receives the estimated position signal $\hat{x}$ from the actuator simulation circuit 6 via the first gain 72, and outputs the desired follow-up estimated signal $\hat{Tr}$ to the feedforward gain 8 via the second gain 73 after adding the received value to the error signal Err from the error detector 3. Here, it is preferable that the factor $K_{e0}$ be equivalent to the factor $K_e$ of the error detection gain 32.

The displacement X of the signal reproducing element 1 and the open-loop transfer function $G_{open}1$ in the control system having the described arrangement are obtained in the following manner.

The actuator 2 moves the signal reproducing element 1 based on the control input Sd. Therefore, the actual position X of the signal reproducing element 1 is given by the following equation (4):

$$X = G_A(s) \cdot Sd \qquad (4).$$

On the other hand, in the feedforward loop, the estimated position signal $\hat{x}$ to be outputted from the actuator simulation circuit 6 is given by the following equation (5)

$$\hat{x} = G_{A0}(s) \cdot Sd \qquad (5).$$

Furthermore, the target follow-up estimator 7 outputs the desired follow-up estimated signal $\hat{Tr}$ given by the following equation (6) based on the estimated position signal $\hat{x}$ and the error signal Err, $$\hat{Tr} = (Err + K_{e0} \cdot \hat{x})/K_{e0} \qquad (6).$$

The equation (6) can be rearranged to the following equation (7) from the equation (3):

$$\hat{Tr} = (K_e/K_{e0}) \cdot Tr + (K_{e0} \cdot \hat{x} - K_e \cdot X)/K_{e0} \qquad (7)$$

The $\hat{Tr}$ is sent to the adder 5 via the feedforward gain 8.

Further, as the adder 5 adds $\hat{Tr}$ to the output Sd1 of the drive circuit 4 by feeding forward, the control input Sd to be outputted is given by the following equation (8):

$$Sd = G_1(s) \cdot Err + F(s) \cdot \hat{Tr} \qquad (8).$$

Further, Sd can be rearranged to the following equation (9) from the equations (5), (6) and (8):

$$Sd = [\{G_1(s) + F(s)/K_{e0}\}/\{1 - G_{A0}(s) \cdot F(s)\}] Err \qquad (9).$$

The displacement X of the signal reproducing element 1 is given by the following equation (10) from the equations (3), (4) and (8):

$$X = [K_e \cdot G_1(s) \cdot G_A(s) \cdot Tr + G_A(s) \cdot F(s) \cdot \hat{Tr}]/(1 + K_e \cdot G_1(s) \cdot G_A(s)) \qquad (10).$$

Here, as a response of the control input Sd with respect to the error signal Err is given by the equation (9), the open-loop transfer function $G_{open}1$ of the control system in accordance with the present embodiment is given by the following equation:

$$\begin{aligned} G_{open}1 &= K_s \cdot G_A(s) \cdot [(G_1(s) + F(s)/K_{e0})/(1 - G_{A0}(s) \cdot F(s))] \quad (11) \\ &= [G_{open} + (K_e/K_{e0}) \cdot G_A(s) \cdot F(s)]/[1 - G_{A0}(s) \cdot F(s)]. \end{aligned}$$

Here, $G_{open}$ indicates an open-loop transfer function in the conventional arrangement given by the aforementioned equation (1), i.e., an open-loop transfer function before adding the feedforward loop.

Figure 5:
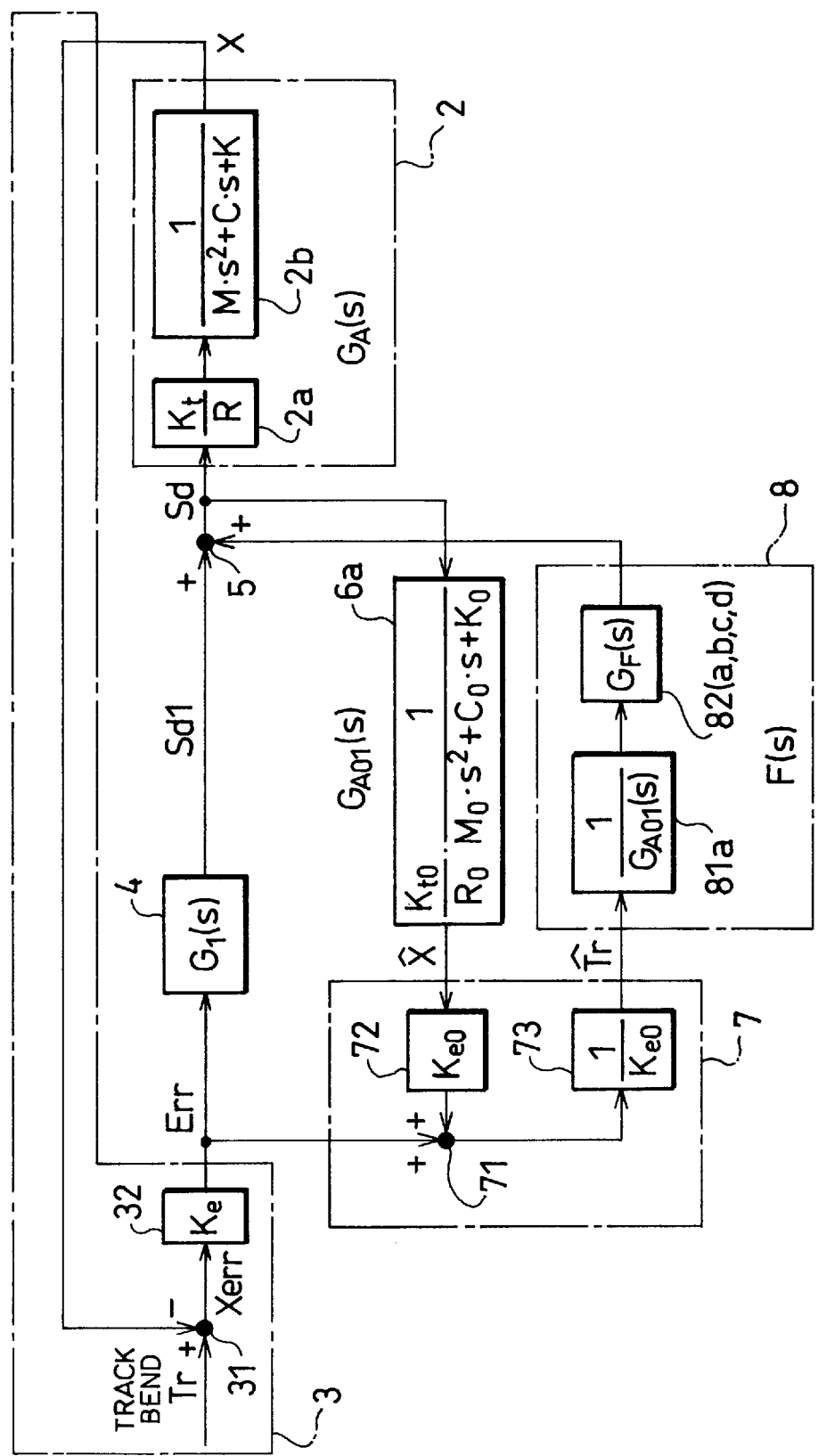
FIG. 5 which shows the structure of FIG. 3 in more detail is a control block diagram showing essential parts of the control system in the information recording and reproducing apparatus in accordance with the first through fourth embodiments.

Hereinafter, the actuator simulation circuit 6 (transfer function: $G_{A0}(s)$) in accordance with the present embodiment is designated by the reference numeral 6a, and the transfer function is given by $G_{A01}(s)$ as shown in FIG. 5.

Furthermore, the feedforward gain 8 in accordance with the present embodiment includes a reverse characteristic simulation circuit 81a (transfer function: $1/G_{A01}(s)$) and a feedforward gain part 82 (transfer function: $G_F(s)$). The reverse characteristics simulation circuit 81a is provided for electrically simulating the inverse characteristics of the actuator 2. The reverse characteristics simulation circuit 81a and the feedforward gain part 82 respectively correspond to the inverse characteristic simulation means and the gain part recited in claims.

Thus, the transfer function F(s) of the feedforward gain 8 is given by the following equation (12):

$$F(s) = G_F(s)/G_{A01}(s) \qquad (12).$$

By substituting the equation (12) in the equation (11), the equation (13) is obtained:

$$G_{open}1 = [G_{open} + G_F(s) \cdot (K_e \cdot G_A(s))/(K_{e0} \cdot G_{A01}(s))]/(1 - G_F(s)) \qquad (13).$$

On the other hand, the actuator simulation circuit 6a of the present embodiment has the transfer function $G_{A01}(s)$ which is set by the following equation (14):

$$G_{A01}(s) = (K_{e0}/R_0)/(M_0 \cdot s^2 + C_0 \cdot s + K_0) \qquad (14).$$

wherein $K_{t0}$, $R_0$, $M_0$, $C_0$ and $K_0$ are respectively simulate elements of Kt, R, M, C, and K of the actuator 2, and it is preferable that these simulation parameters be respectively equivalent to actual parameters.

Thus, in this case, the following equation (15) holds.

$$G_{A01}(s) = G_A(s) \qquad (15).$$

It is preferable that the first gain 72 (factor: $K_{e0}$) and the second gain 73 (factor: $1/K_{e0}$) satisfy the condition given by the following equation (16), $$K_{e0} = K_e \qquad (16)$$

This offers the following equation (17) from the equations (4) and (5) and the following equation (18) from the equations (7) and (17), $$\hat{x} = X \quad (17)$$

$$\hat{Tr} = Tr \quad (18).$$

As a result, the target follow-up estimator 7 can estimate the track bend Tr, i.e., the target to be followed of the signal reproducing element 1 with almost 100 percent sure. Needless to mention, the unit of X and TR is [m] and a unit of $\hat{x}$ and $\hat{Tr}$ is [V].

In this case, from the equations (10), (12), (15) and (18), the following equation (19) is derived;

$$X = [(K_e \cdot G_1(s) \cdot G_A(s) + G_F(s))/(K_e \cdot G_1(s) \cdot G_A(s) + 1)] \cdot Tr \quad (19).$$

From the equation (13), the open-loop transfer function $G_{open}1$ of the control system is given by the following equation (20):

$$G_{open}1 = [G_{open} + G_F(s)]/[1 - G_F(s)] \quad (20).$$

As a result, in the necessary frequency band width, by setting the transfer function $G_F(s)$ of the feedforward gain part 82 as:

$$G_F(s) \doteq 1 \quad (21),$$

desirable conditions of $X \doteq Tr$ and $G_{open}1 \doteq \infty$ can be achieved, thereby permitting the signal reproducing element 1 to completely follow the track bend Tr of the track.

From the equation (20), the following equation (22) or (23) can be derived:

when $|G_{open}| \gg |G_F(s)|$, $$G_{open}1 \doteq G_{open}/[1 - G_F(s)]$$

when $|G_{open}| \ll |G_F(s)|$, (22)

$$G_{open}1 \doteq G_F(s)/[1 - G_F(s)] \quad (23).$$

A feedforward gain part 82a in accordance with the present embodiment is composed of an element proportional to the factor $K_F$. Thus, $G_F(s)$ is given by the following equation (24):

$$G_F(s) = K_F \quad (24).$$

Figure 6:
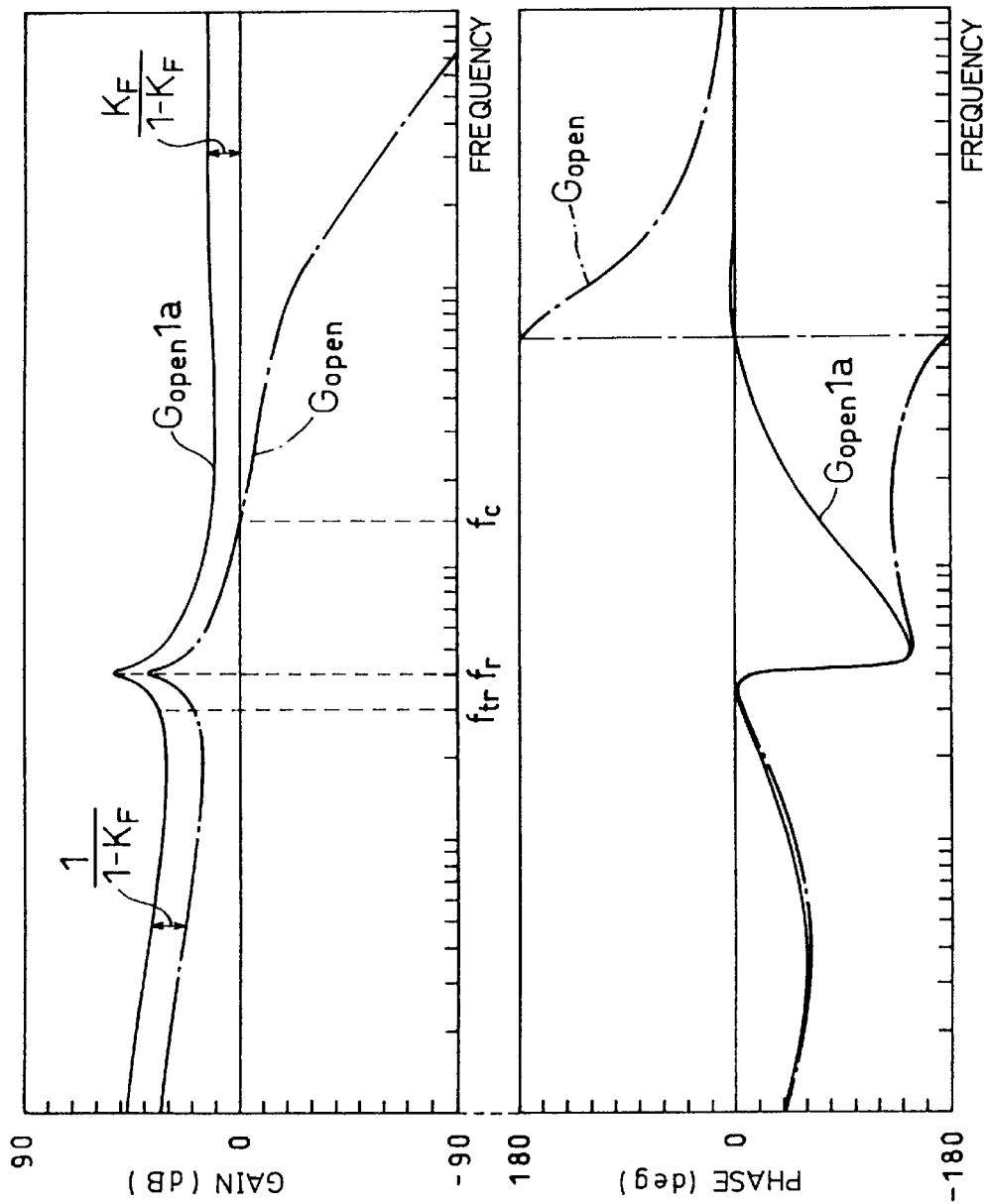
FIG. 6 is a Bode diagram showing open-loop transfer characteristics of the control system in the information recording and reproducing apparatus in accordance with the first embodiment of the present invention.

FIG. 6 shows the open-loop transfer characteristics $G_{open}1a$ of the control system, for example, with $K_F = 0.8$ together with the conventional open-loop transfer characteristics $G_{open}$. As is clear from FIG. 6 and the equations (22) and (23), the open-loop gain of the present embodiment is $1/(1-K_F)$ times of the conventional loop gain in the low band which is increased by 14 dB. On the other hand, in the upper band, the open-loop gain is $K_F/(1-K_F)$ and is maintained at 12 dB. On the other hand, as the phase lag is 0° in the upper band, the control system stably operates.

As a result, the control system in accordance with the present embodiment permits an open-loop gain to be increased in any band width under stable conditions. As a result, the follow-up precision with respect to the track bend Tr of the signal reproducing element 1 can be improved, and the follow-up frequency can be set high.

Thus, the control system of the present embodiment permits a signal reproducing element 1 to be followed stably with an improved precision in a wide band even with respect to a fine track bend Tr compared with the conventional control system. As a result, in the information recording and reproducing apparatus in accordance with the present embodiment, the track width of the recording medium can be set still narrower, thereby improving a recording density and a recording capacity of the recording medium.

[Second Embodiment]

As shown in FIG. 6, in the first embodiment, an open-loop gain is not less than 0 dB in high band. Thus, in the event of a phase shift due to an idle time or a high order resonance of the actuator 2, a control system may become unstable.

In order to prevent the above problem, the present embodiment is arranged so as to adopt a feedforward gain part 82 shown in FIG. 5 composed of a low-pass filter, so as to stabilize an operation of the control system.

Namely, a transfer constant $G_F(s)$ of the feedforward gain part 82b in accordance with the present embodiment is as given by the following equation (25):

$$G_F(s) = G_{LPF}1(s) \quad (25).$$

Figure 7:
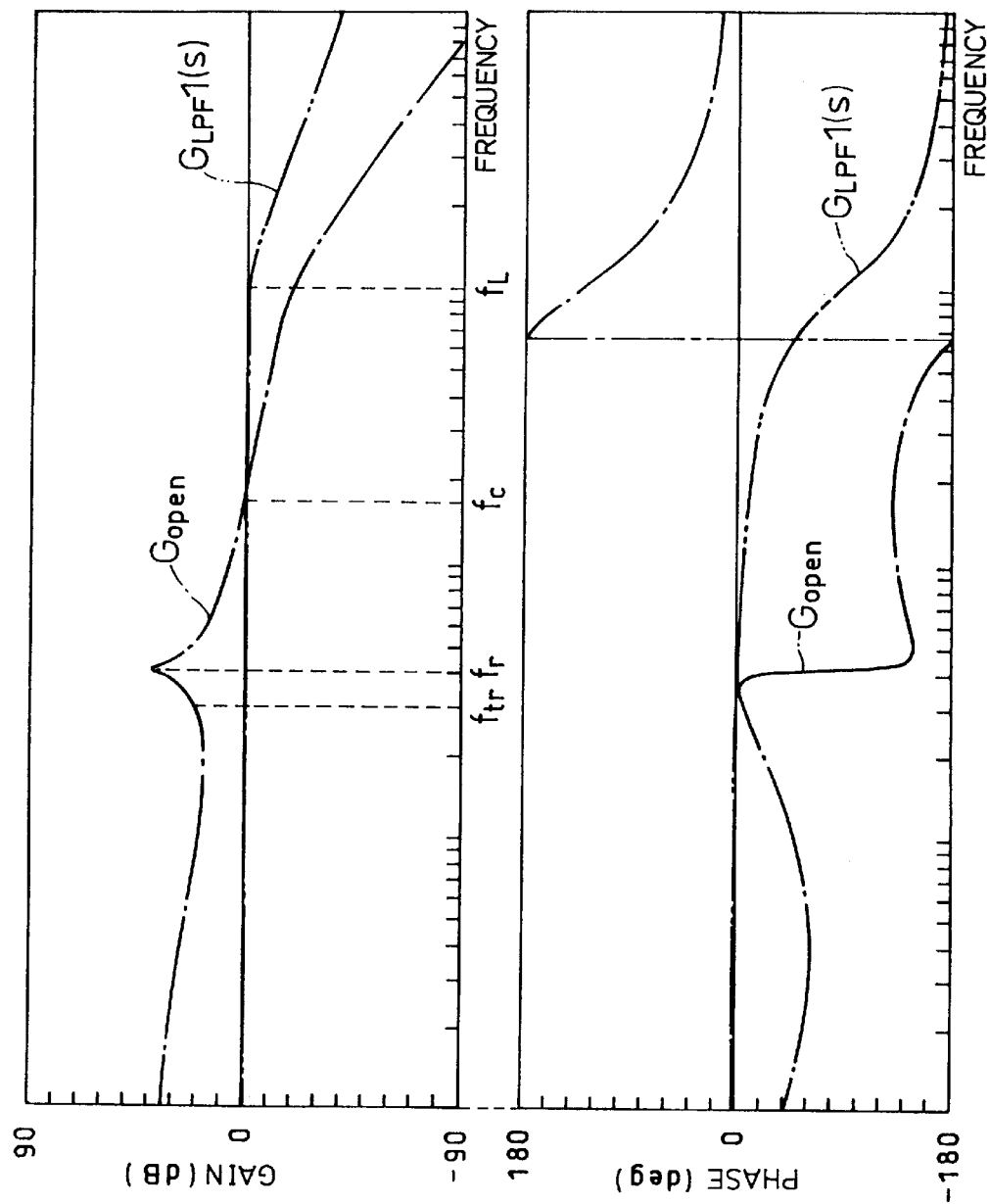
FIG. 7 is a Bode diagram showing transfer characteristics of a low-pass filter provided in the control system in the information recording and reproducing apparatus in accordance with the second embodiment of the present invention.

As shown in FIG. 7, the feedforward gain part 82b is, for example, composed of the second order low-pass filter having a DC gain of −2 dB. Additionally, the cut-off frequency $f_L$ of $G_{LPF}1(s)$ of $G_{LPF}$ is set higher than the gain-crossover frequency $f_c$ of the conventional open-loop transfer characteristic ($G_{open}$). Other than the above, the feedforward gain part 82b of the present embodiment is the same as that of the aforementioned embodiment, and thus the descriptions thereof shall be omitted here.

Figure 8:
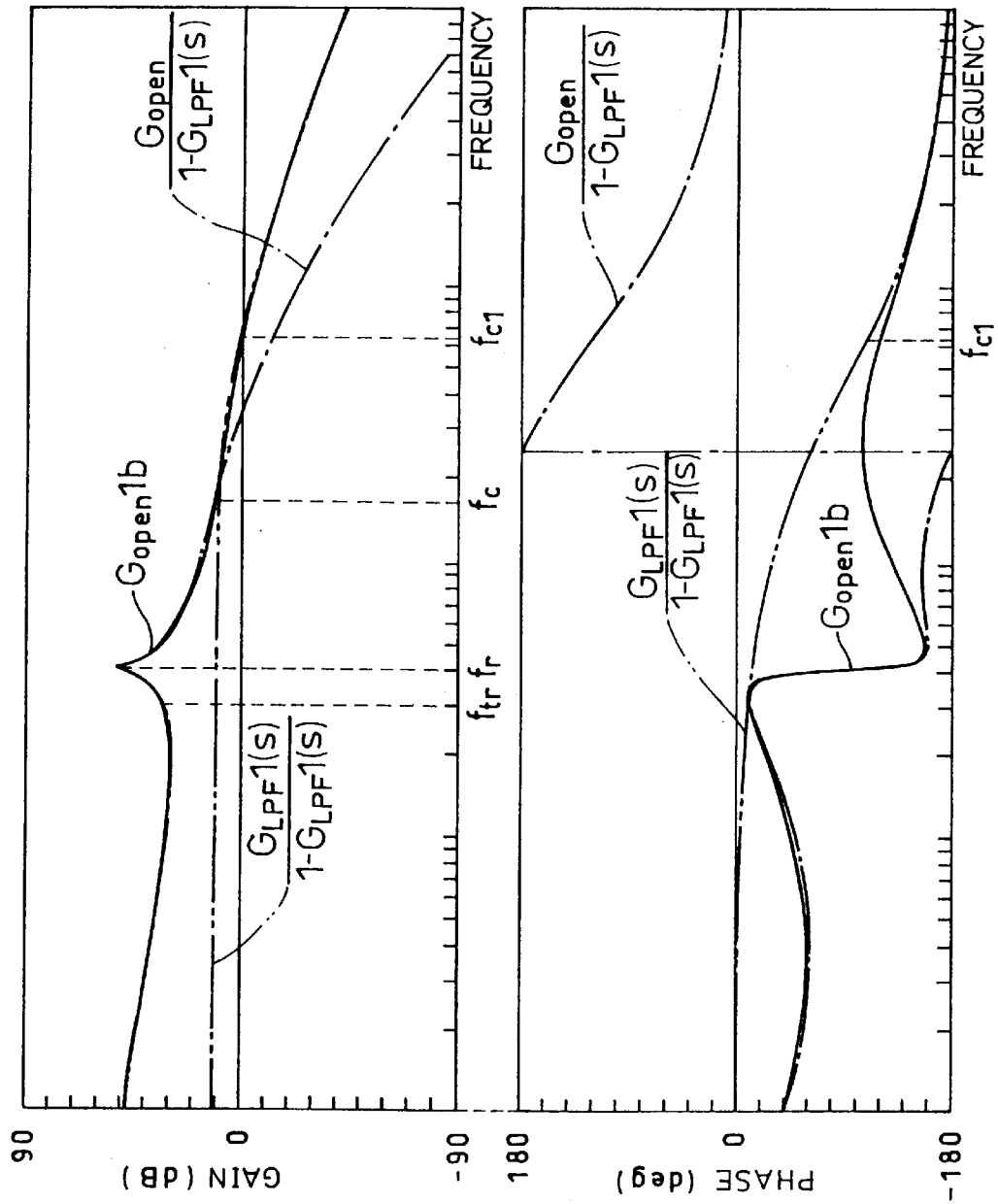
FIG. 8 is a Bode diagram showing a correlation between transfer characteristics of each element and open-loop transfer characteristics in the control system.

As shown in FIG. 8, the open-loop transfer function $G_{open}1b$ of the control system in accordance with the present embodiment is greatly affected by the characteristics given by the equation (22) when $|G_{open}| \gg |G_{LPF}1(s)|$, i.e., frequency $f \ll f_c$. Additionally, when $|G_{open}| \ll |G_{LPF}1(s)|$, i.e., $f \gg f_c$, characteristics given by the equation (23) appear in $G_{open}1b$.

Figure 9:
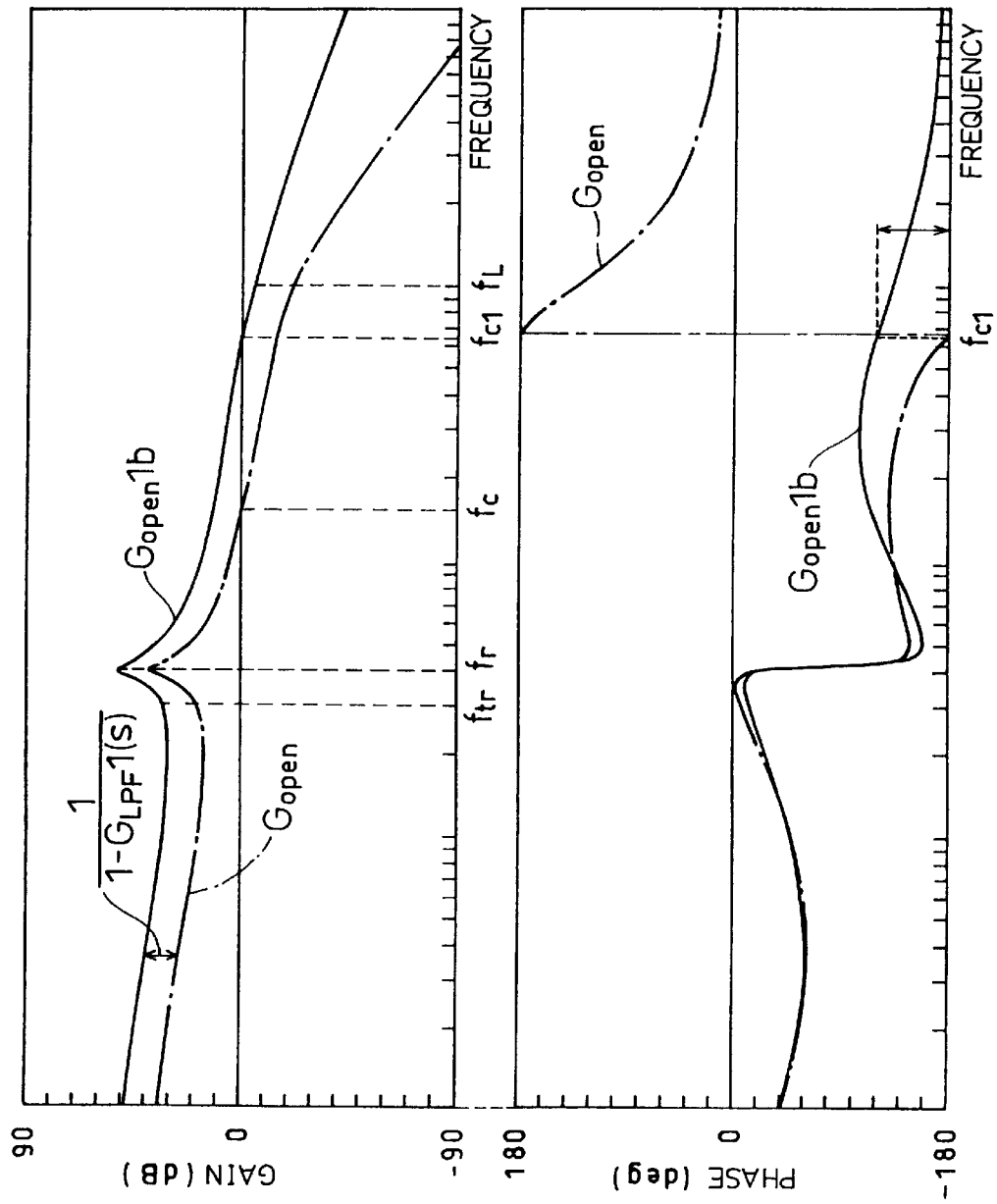
FIG. 9 is a Bode diagram showing open-loop transfer characteristics in the control system.

Thus, as shown in FIG. 9, the gain of the $G_{open}1b$ in accordance with the present embodiment is increased by $1/\{1 - G_{LPF}1(s)\}$ times in $f \ll f_c$ compared with that of the conventional $G_{open}$. Further, when $f \gg f_c$, $G_{open}1b$ is substantially $G_{LPF}1(s)/(1 - G_{LPF}1(s))$. In the described control system, the gain-crossover frequency $f_{c1}$ is by far higher than the conventional gain-crossover frequency $f_c$, while ensuring a sufficient phase margin. As a result, a stable control can be ensured over a wide band.

Compared with the $G_{open}1a$ (see FIG. 6) in the first embodiment, the gain of $G_{open}1b$ in the present embodiment is not more than 0 dB in high band while obtaining an equivalent gain increase effect in the low band. As a result, in the event of a phase shift due to a circuit lag, a high-order resonance of the actuator 2, etc., the control system is able to control the signal reproducing element 1 more stably than the arrangement of the first embodiment.

As a result, a still narrower track of the recording medium can be achieved in the information recording and reproducing apparatus in accordance with the present embodiment, thereby achieving a recording medium of a higher density and larger capacity.

[Third Embodiment]

In the second embodiment, the gain-crossover frequency $f_{c1}$ is set significantly higher than the conventional gain-crossover frequency $f_c$. This feature is effective especially in terms of increasing the band width of the control system. However, as a phase shift due to a circuit lag or a high-order resonance of the actuator 2 occurs in the lower band than estimated in the second embodiment, it may be required to increase the open-loop gain without changing the control band (gain-crossover frequency) from the conventional control band.

Figure 10:
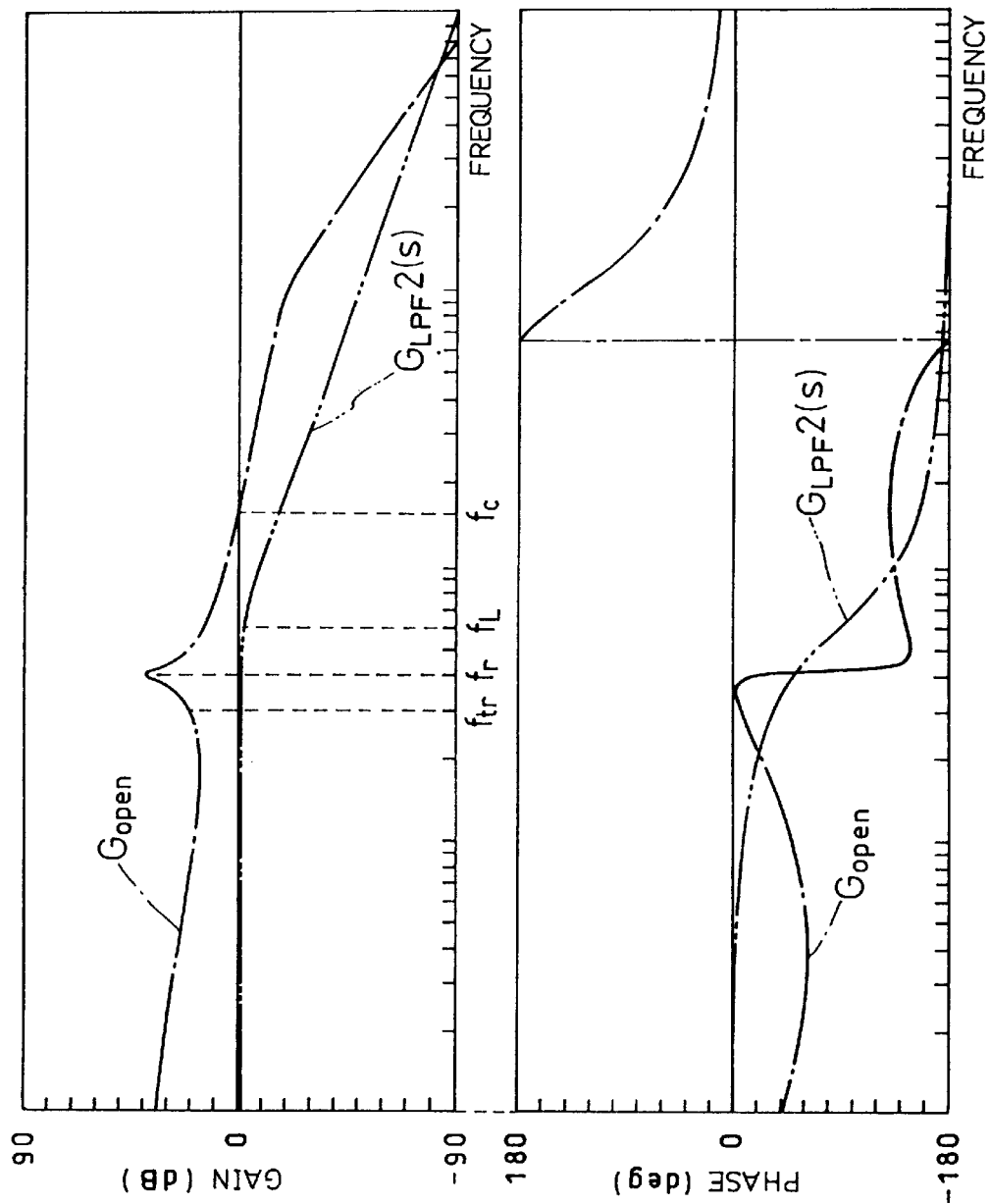
FIG. 10 is a Bode diagram showing transfer characteristics of a low-pass filter provided in the control system in the information recording and reproducing apparatus in accordance with the third embodiment of the present invention.

In consideration of the described problem, in the present embodiment, the feedforward gain part 82 shown in FIG. 5 is constituted by the low-pass filter (transfer function: $G_{LPF2}(s)$) having different characteristics from that of the second embodiment As shown in FIG. 10, in the feedforward gain part 82c, the cut-off frequency $f_L$ is set lower than the gain-crossover frequency $f_c$ of the conventional open-loop transfer characteristic ($G_{open}$). Other than the above, the arrangement of the present embodiment is the same as that of the second embodiment, and thus the explanations thereof shall be omitted here.

According to the arrangement of the present embodiment, as the cut-off frequency $f_L$ of the feedforward gain part 82c is set lower than the gain-crossover frequency $f_c$ of the $G_{open}$, except for the very high band, the condition of $|G_{open}|>>|G_{LPF}2(s)|$ holds. Thus, the open-loop transfer characteristics $G_{open}1c$ in the present embodiment have characteristics given by the equation (22) over the entire band.

Figure 11:
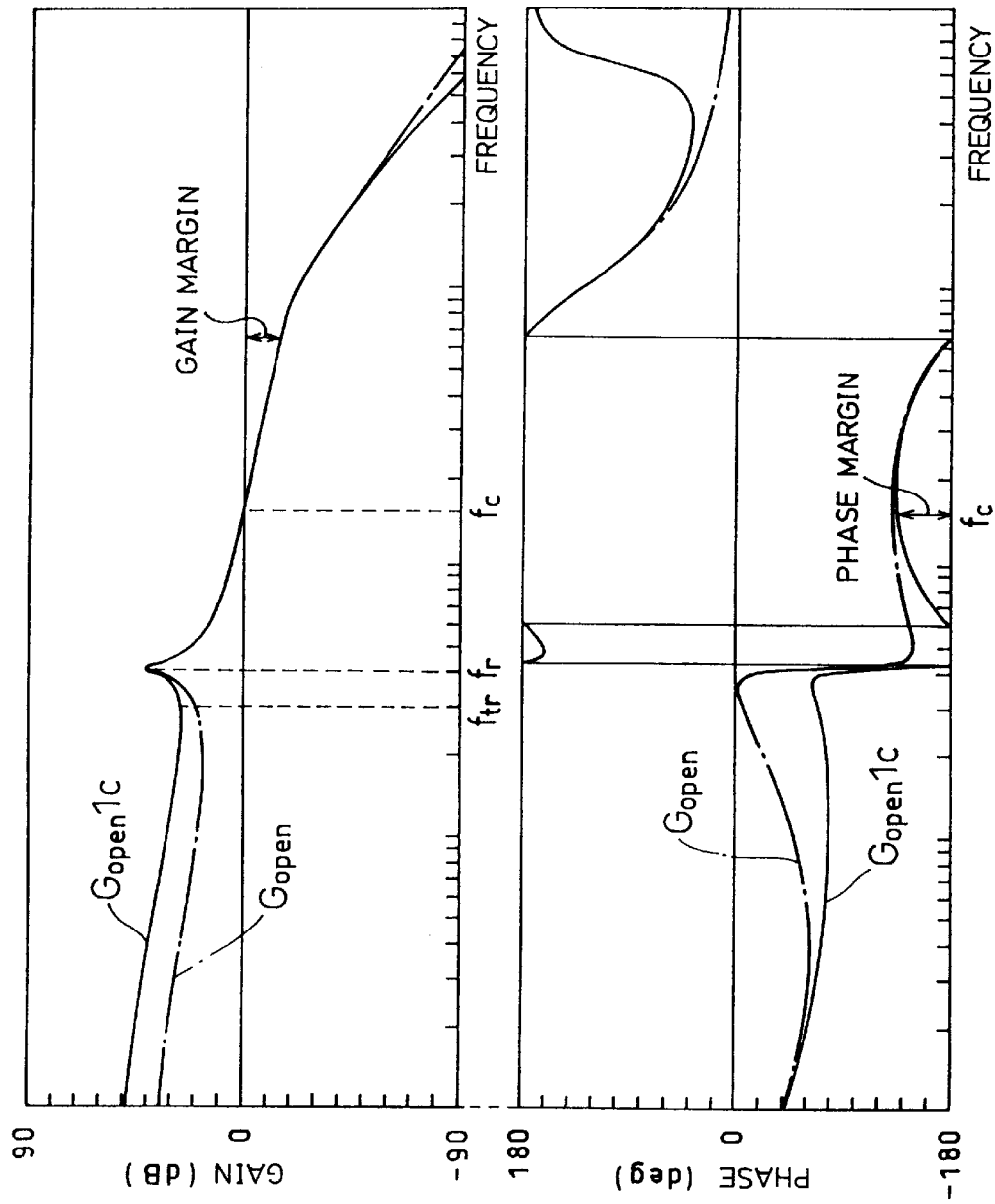
FIG. 11 is a Bode diagram showing an open-loop transfer characteristic in the control system.

As a result, as shown in FIG. 11, the control system in accordance with the present embodiment has the same open-loop characteristics as the conventional control system in the high band while obtaining the same open-loop gain increase effects in the low band as the first and second embodiments. The $G_{open}1c$ causes a greater phase shift than $G_{open}$ known in the prior art; however, with an appropriate selection of the frequency characteristics of the low-pass filter, the stability as achieved by the conventional technique can be ensured, thereby achieving the same gain margin and the phase margin as achieved in the conventional control system.

Thus, the control system in accordance with the present embodiment offers an improved track bend follow-up precision of the signal reproducing element 1 while ensuring a sufficient stability. Furthermore, as the control band of the control system is not varied, the signal reproducing element 1 can be controlled stably even if a circuit lag or a high-order resonance of the actuator 2 occurs in the lower band than the second embodiment.

As a result, a still narrower track of the recording medium can be achieved in the information recording and reproducing apparatus in accordance with the present embodiment, thereby achieving a recording medium of a higher density and a larger capacity.

[Fourth Embodiment]

In the described arrangement of the third embodiment, in order to ensure the stability in the same control band as the conventional technique, the frequency characteristics of the low-pass filter which constitutes the feedforward gain part 82c are restricted. Thus, at the fundamental frequency $f_{tr}$ of the track bend Tr, the open-loop gain $|G_{open}1c|$ of the third embodiment shows a significant improvement over $|G_{open}|$ of the prior art, but the improvement therefrom is smaller than that achieved from the open-loop gains of the first and second embodiments.

In contrast, the feedforward gain part 82d in accordance with the fourth embodiment includes a band-pass filter in which the center frequency is set to the fundamental frequency $f_{tr}$. Thus, the $G_F(s)$ in the feedforward gain part 82d is given by the following equation $$G_F(s)=G_{LPF}(s) \tag{26}$$

Figure 12:
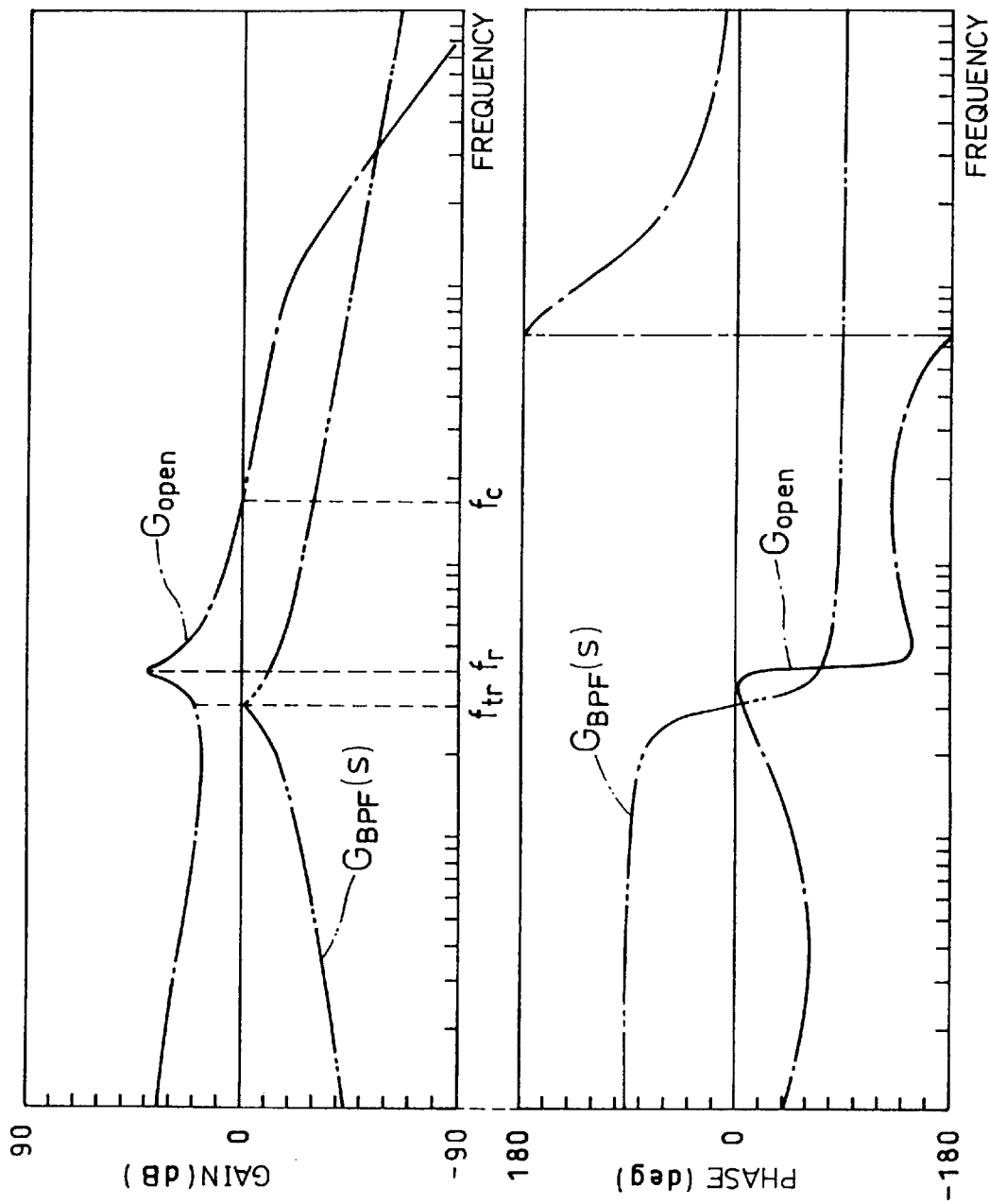
FIG. 12 is a Bode diagram showing an open-loop transfer characteristic of a band-pass filter provided in the control system in the information recording and reproducing apparatus in accordance with the fourth embodiment of the present invention.

As shown in FIG. 12, in the present embodiment, the second order band-pass filter having a gain of −2 dB at the center frequency is adopted as an example of the band-pass filter. Other than the above, the control system of the present embodiment has the same arrangement as the aforementioned embodiment, and thus explanations thereof shall be omitted here.

Figure 13:
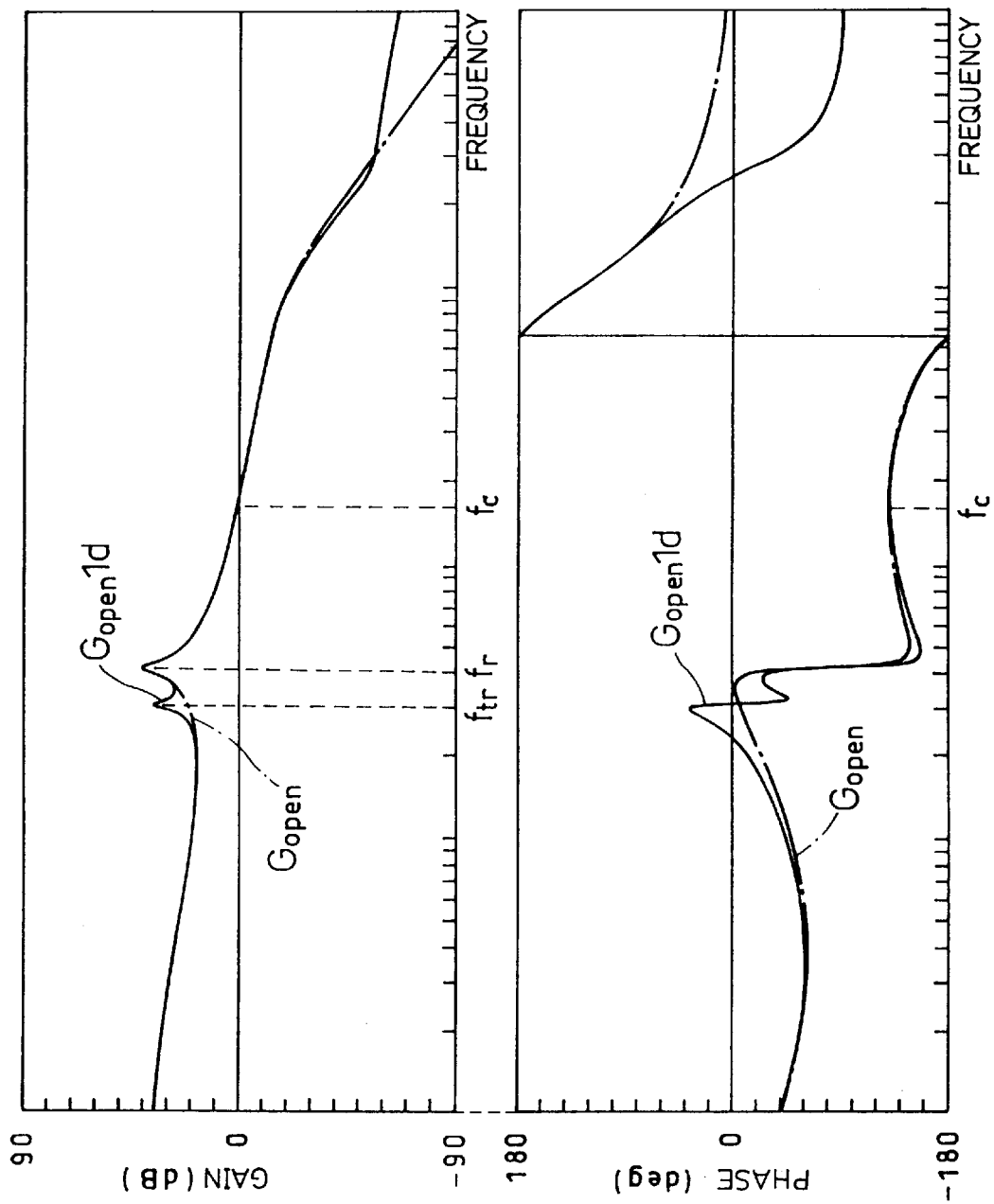
FIG. 13 is a Bode diagram showing an open-loop transfer characteristic in the control system.

In the present embodiment, except for a very high band, the condition of $|G_{open}|>>|G_{BPF}(s)|$ holds. In the open-loop transfer characteristic $G_{open}1d$ of the present embodiment, characteristics given by the equation (22) appear obviously. Thus, as shown in FIG. 13, $G_{open}1d$ shows the same open loop gain increase effects as the first and second embodiments in a vicinity of the fundamental frequency $f_{tr}$ of the track bend Tr, and shows substantially the same open loop characteristics as the prior art in the high band. Additionally, the phase characteristics of the control system in accordance with the present embodiment are substantially the same as prior art except in the vicinity of the center frequency ft of the band-pass filter.

As a result, the control system in accordance with the present embodiment permits an open loop gain to be increased with respect to a component of the fundamental frequency $f_{tr}$ of the track bend Tr compared with the conventional control system. Therefore, the follow-up precision with respect to the track bend Tr of the signal reproducing element 1 can be improved while maintaining a sufficient stability. Additionally, the control system in accordance with the present embodiment offers an improved follow-up precision of the track bend Tr with respect to the fundamental frequency $f_{tr}$ component compared with the control system of the third embodiment.

As a result, in the information recording and reproducing apparatus in accordance with the present embodiment, the track width of the recording medium can be still reduced, thereby achieving a still improved recording density and recording capacity of the recording medium.

Additionally, the open-loop characteristics of the control system in accordance with the present embodiment are the same as the prior art with respect to the frequency apart from the fundamental frequency $f_{tr}$ of the track bend Tr. Thus, like the control system adopting the punch-through servo system, in the frequency band higher than a resonance frequency $f_r$ of the actuator 2, even in the case of ensuring the minimum phase margin, the signal reproducing element 1 can be controlled stably with high precision while maintaining the phase margin, whereby both the stability of the control system and the improved follow-up precision of the signal reproducing element 1 can be achieved.

[Fifth Embodiment]

Figure 14:
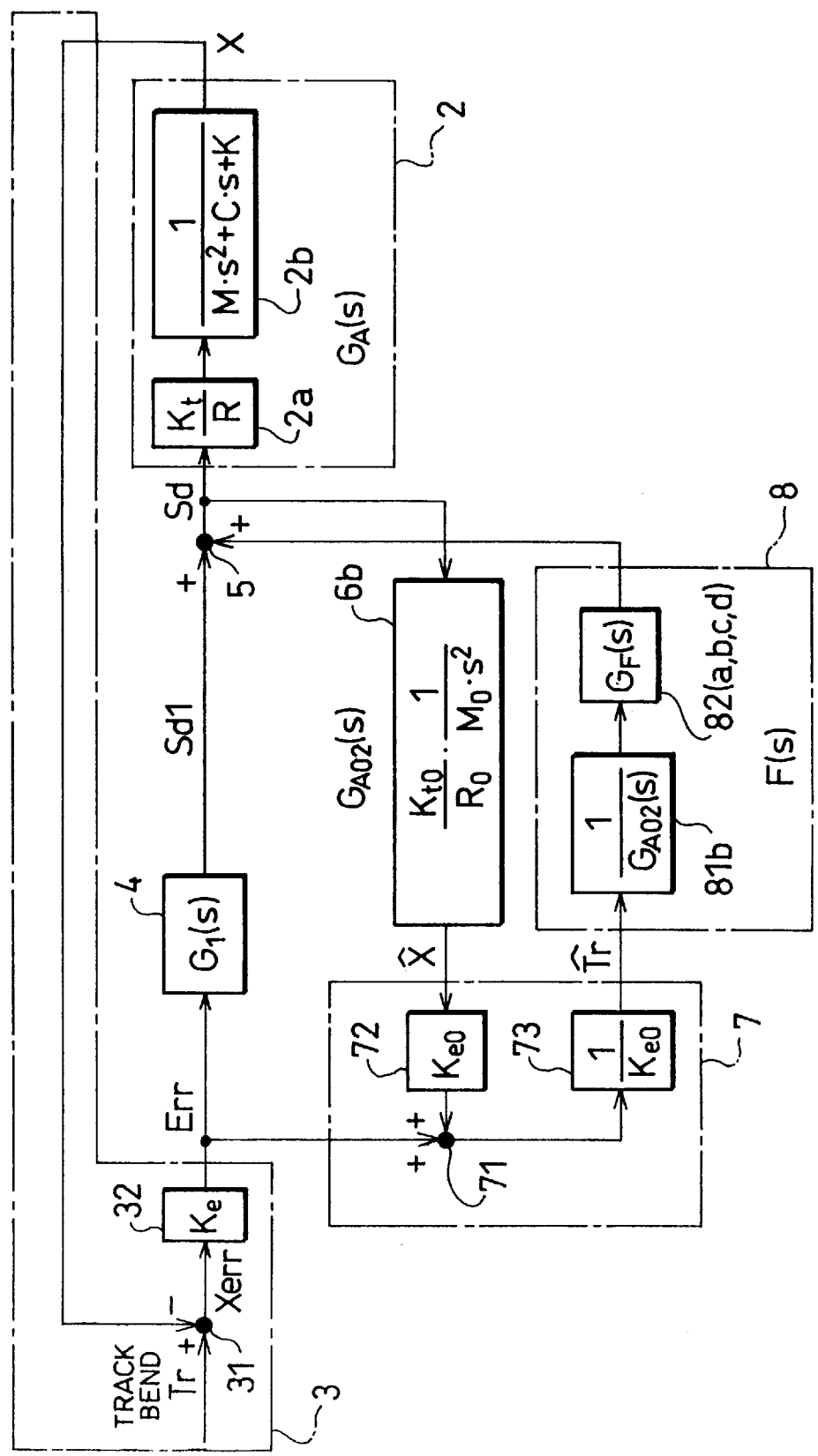
FIG. 14 which shows the structure of FIG. 3 in more detail is a control block diagram showing essential parts of the control system in the information recording and reproducing apparatus in accordance with the fifth embodiment of the present invention.

As shown in FIG. 5, in the first through fourth embodiments, in the actuator simulation circuit 6a, all the characteristics ($G_A(s)$) of the actuator 2 are simulated. Therefore, the actuator simulation circuit 6a and the inverse characteristic simulation circuit 81a tend to be complicated. In contrast, as shown in FIG. 14, in an actuator simulation circuit 6b of the present embodiment, only double integral characteristics are simulated among all the characteristics ($G_A(s)$) of the actuator 2. Therefore, a the transfer function $G_{A02}(s)$ of the actuator simulation circuit 6b is as given by the equation (27)

$$G_{A02}(s) = (K_{t0}/R_0)/(M_0 \cdot s^2) \qquad (27).$$

The inverse characteristic simulation circuit 81b is set so as to have inverse characteristics of the actuator simulation circuit 6b. The transfer function is $1/G_{A02}(s)$. Other than the actuator simulation circuit 6b and the inverse characteristic simulation circuit 81b, the control circuit of the present embodiment has the same arrangement as the first through fourth embodiments, and thus the descriptions thereof shall be omitted here.

The open-loop transfer function $G_{open}2$ is derived in the same manner as the equation (13) as follows:

$$G_{open}2 = [G_{open} + G_F(s) \cdot (K_e \cdot G_A(s))/(K_{e0} \cdot G_{A02}(s))]/(1 - G_F(s)) \qquad (28).$$

Here, $G_{A02}(s)$ given by the above equation is simplified compared with $G_{A01}(s)$ given by the equation (14).

Here, as in the case of the first through fourth embodiments, by setting so as to satisfy the condition of $K_{e0} = K_e$, the following equation is derived:

$$G_{open}2 = [G_{open} + G_F(s) \cdot \{G_A(s)/G_{A02}(s)\}]/[1 - G_F(s)] \qquad (29).$$

In the present embodiment, as the actuator 2 is not completely simulated in the actuator simulation circuit 6b, the term $G_A(s)/G_{A02}(s)$ remains unlike the case of the first through fourth embodiments (see equation (20)).

Figure 15:
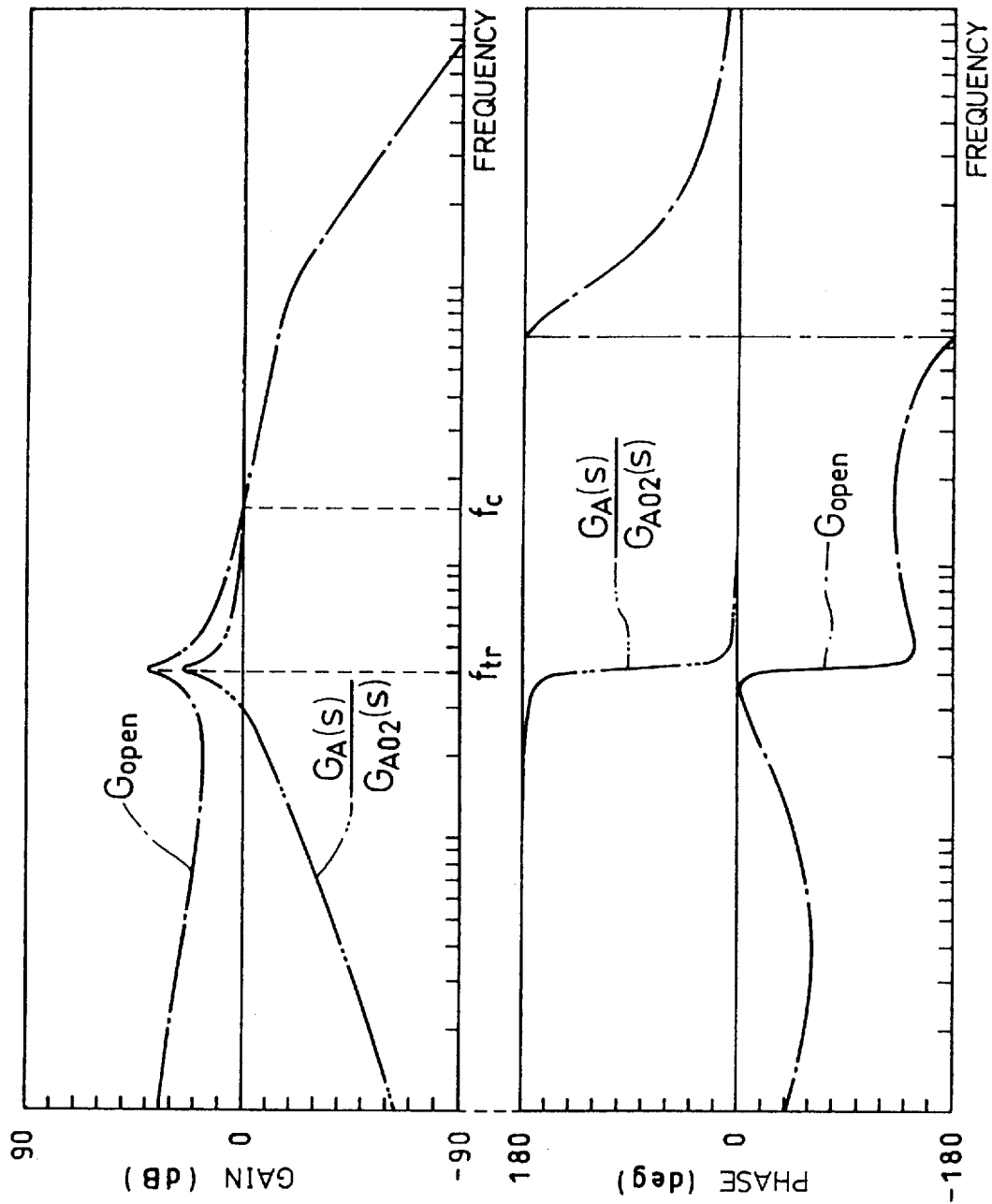
FIG. 15 is a Bode diagram showing a ratio in transfer function of the actuator and a transfer function of an actuator simulation circuit.

The respective characteristics of the term in $G_A(s)/G_{A02}(s)$ and the term in $G_{open}$ appeared in the equation (29) are shown in FIG. 15.

Therefore, the following condition is satisfied.
(a) when $|G_{open}| \gg 1$ is satisfied, $$|G_A(s)/G_{A02}(s)| \ll |G_{open}| \qquad (30)$$

(b) when the condition (a) is not satisfied, $$|G_A(s)/G_{A02}(s)| \doteq 1 \qquad (31).$$

Furthermore, as shown in the first through fourth embodiments, $G_F(s)$ is set such that the maximum gain $|G_F(s)|_{max}$ is substantially 1. Thus, the equation (30) is rearranged as follows.
(a) when $|G_{open}| \gg |G_F(s)|$ is satisfied, $$|G_F(s) \cdot G_A(s)/G_{A02}(s)| \ll |G_{open}| \qquad (32),$$

Further, from the equation (29), the following equation holds.

$$G_{open}2 \doteq G_{open}/[1 - G_F(s)] \qquad (33),$$

On the other hand, from the equations (29) and (31),
(b) when the condition (a) is not satisfied, $$G_{open}2 \doteq [G_{open} + G_F(s)]/[1 - G_F(s)] \qquad (34).$$

Here, as the equation (33) is given by applying the condition (a) to the equation (34), roughly, the equation (35) is always satisfied.

$$G_{open}2 \doteq [G_{open} + G_F(s)]/[1 - G_F(s)] \qquad (35).$$

Therefore, the open loop transfer function $G_{open}2$ in the present embodiment is substantially the same as the open loop transfer function $G_{open}1$ (see equation (20)) of the first through fourth embodiments.

Figure 16:
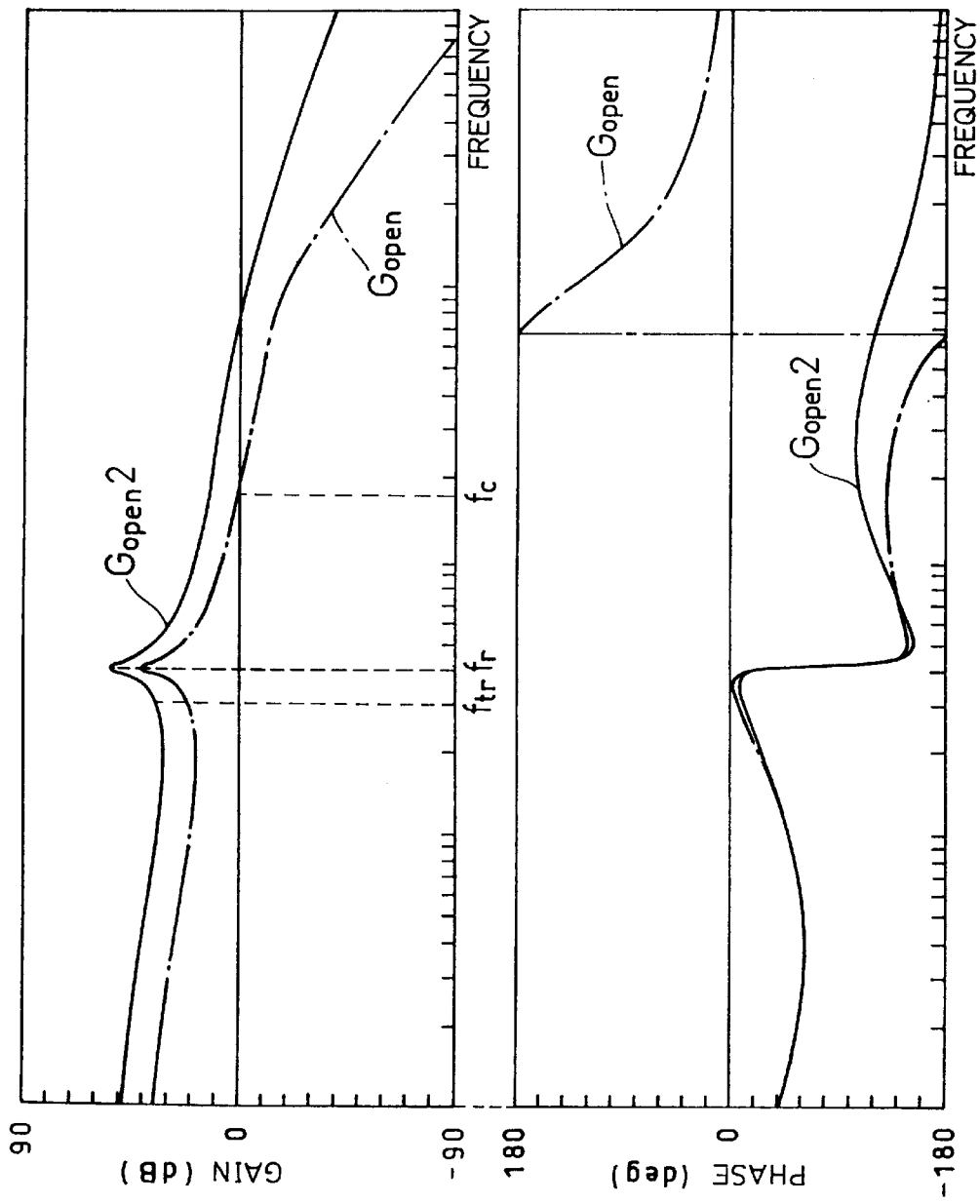
FIG. 16 is a Bode diagram showing an open-loop transfer characteristics in the control system.

Here, an example of the open loop transfer function $G_{open}2$ in accordance with the present embodiment is shown in FIG. 16. Other than the arrangements of the actuator simulation circuit 6b and the inverse characteristic simulation circuit 81b, the control circuit of the present embodiment has the same arrangement as the second embodiment. As can be seen from the comparison between FIG. 9 and FIG. 16, the control system in accordance with the present embodiment offers substantially the same function as the second embodiment.

FIG. 16 shows only the same arrangement as the second embodiment, however, the present embodiment is not limited to such arrangement. As can be seen from the equation (35), the control system in accordance with the present embodiment has the same open-loop transfer function as the corresponding embodiments even in the case adopting the feedforward gain part 82 having the same arrangement as that of the first through fourth embodiments. As a result, improved follow-up precision and the frequency of the signal reproducing element 1 with respect to the track bend Tr can be achieved.

Furthermore, in the actuator simulation circuit 6b in accordance with the present embodiment, only the double integral characteristics of all the characteristics of the actuator 2 are simulated. Therefore, compared with the case of completely simulating the characteristics of the last embodiment, structures of the actuator simulation circuit 6 and the inverse characteristic simulation circuit 81 can be simplified, and also these circuits can be adjusted with ease. As a result, the cost of the control system can be reduced.

In the present embodiment, the explanations have been given through the case where the actuator simulation circuit 6b simulates only the double integral characteristics of the actuator. However, the present invention is not limited to this. For example, the actuator simulation circuit 6b may have the second order low-pass filter. As long as the actuator simulation circuit 6b simulates at least double integral characteristics, the same effect as the present embodiment can be achieved.

[Sixth Embodiment]

In the fifth embodiment, as the actuator simulation circuit 6 shown in FIG. 1 simulates the double integral characteristics of the actuator 2, the structures of the actuator simulation circuit 6 and the inverse characteristic simulation circuit 81 are simplified. In contrast, in the present embodiment, by simulating the characteristics of the actuator 2 in a specific frequency band, the respective structures of the simulation circuits 6 and 81 are simplified.

Figure 17:
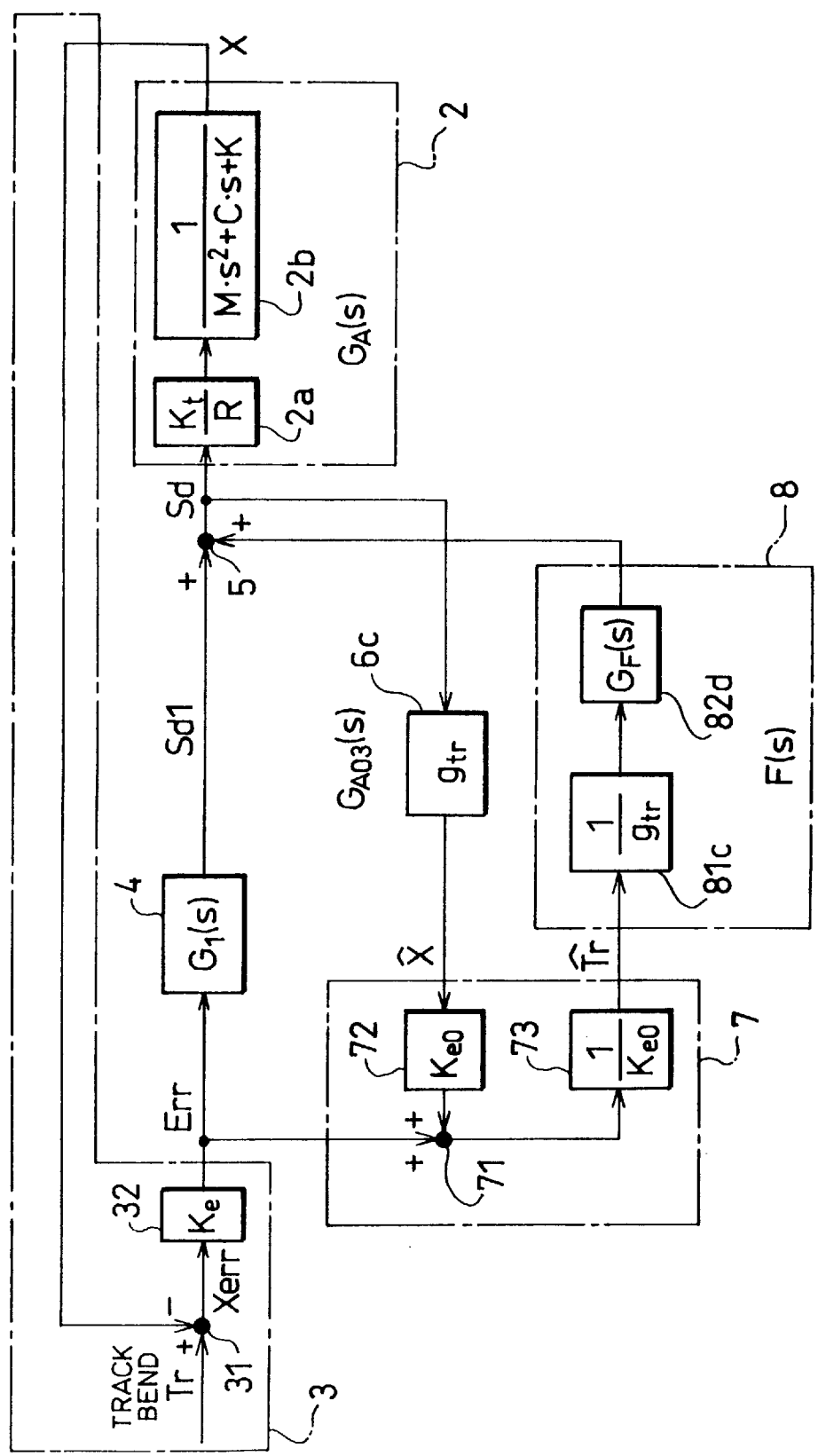
FIG. 17 which shows the structure of FIG. 3 in more detail is a control block diagram showing essential parts of the control system in the information recording and reproducing apparatus in accordance with the sixth embodiment.

As shown in FIG. 17, the control system in accordance with the present embodiment includes the actuator simulation circuit 6c which simulates the characteristics of the actuator in a vicinity of the fundamental frequency $f_{tr}$ of the track bend Tr in replace of the actuator simulation circuit 6a (see FIG. 5) adopted in the fourth embodiment. The actuator simulation circuit 6c is composed of, for example, the gain of the comparative elements, etc.

Accordingly, the inverse characteristic simulation circuit 81c is set so as to have inverse characteristics of the actuator simulation circuit 6c. The feedforward gain part 82d includes a band-pass filter having the transfer function of $G_{BPF}(s)$ as in the case of the fourth embodiment. Other than the arrangements of the actuator simulation circuit 6c and the inverse characteristic simulation circuit 81c are the same as the fourth embodiment, and thus the members having the same functions as those shown in the fourth embodiment will be designated by the same reference numerals, and thus the descriptions thereof shall be omitted here.

The actuator simulation circuit 6c in accordance with the present embodiment simulates the gain at the fundamental frequency $f_{tr}$ of the track bend Tr. Thus, the transfer function $G_{A03}(s)$ of the actuator simulation circuit 6c in accordance with the present embodiment is derived from the following equation (36):

$$G_{A02}(s)=g_{tr}=|G_A(j\cdot(2\pi\cdot f_{tr}))| \quad (36).$$

Accordingly, the transfer function of the inverse characteristics simulation circuit 81c are set to $1/g_{tr}$. In the equation (36), j is an imaginary unit.

Figure 18:
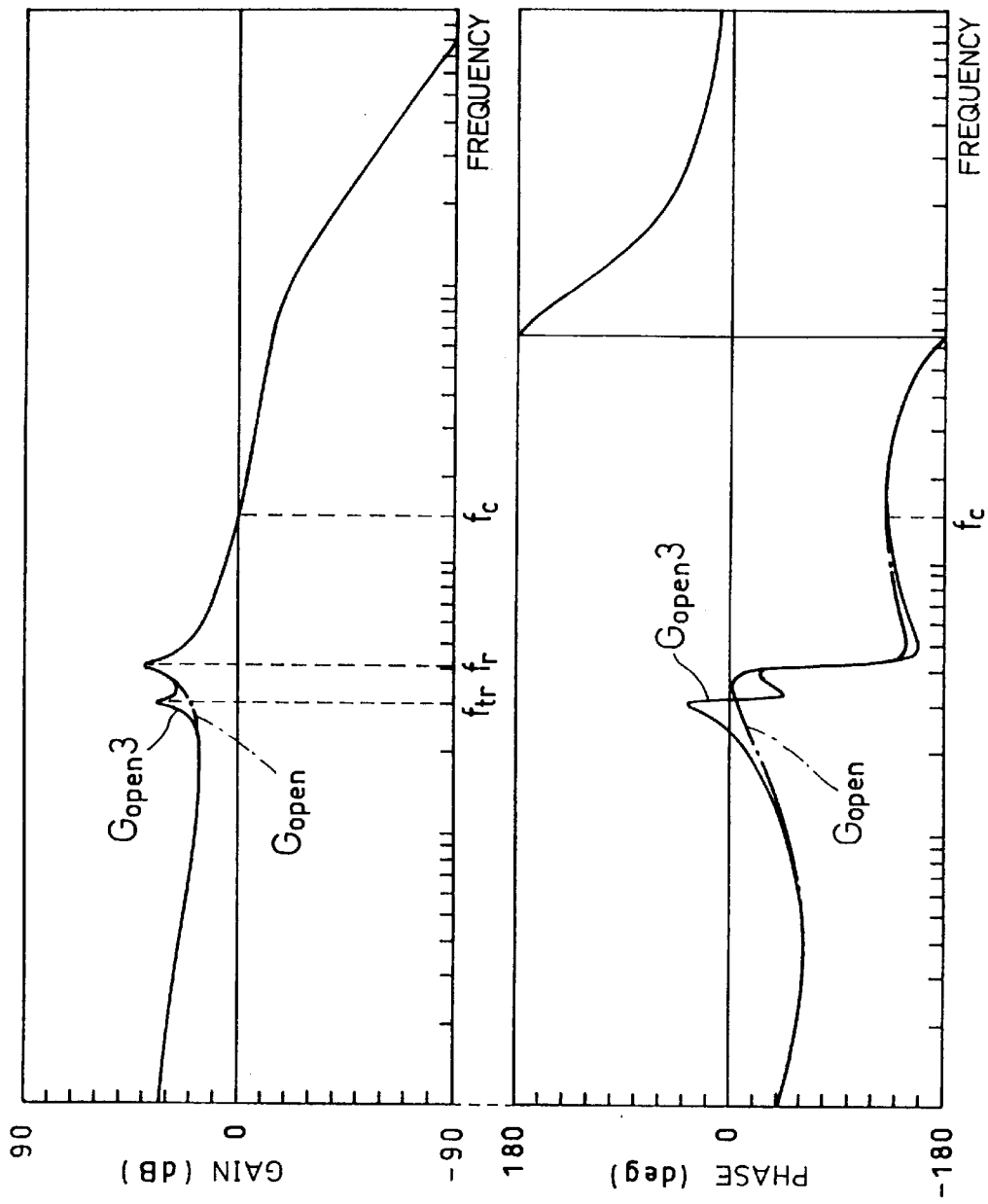
FIG. 18 is a Bode diagram showing open-loop transfer characteristics in the control system.

FIG. 18 shows an example of the open loop transfer function $G_{open}3$ in accordance with the present embodiment. Except the characteristics of the actuator simulation circuit 6c and the inverse characteristic simulation circuit 81c, the control system of the present invention has the same arrangement as that of the fourth embodiment (see FIG. 5). As can be seen from the comparison between FIG. 13 and FIG. 18, the open-loop transfer characteristics $G_{open}3$ of the present embodiment is the same as the open-loop transfer characteristics $G_{open}1d$ of the fourth embodiment except for the very high band.

Thus, the control system in accordance with the present embodiments offers an improved follow-up precision of the signal reproducing element 1 with respect to the track bend Tr while ensuring the same stability as prior art. Furthermore, the actuator simulation circuit 6c and the inverse characteristic simulation circuit 81c do not completely simulate the characteristics and inverse characteristics of the actuator 2. For example, the simulation circuits 6c and 81c can be constituted by the gains of comparative elements. As a result, respective structures of these circuits can be significantly simplified, and can be adjusted with ease. As a result, costs incurred on the control system can be reduced.

Figure 19:
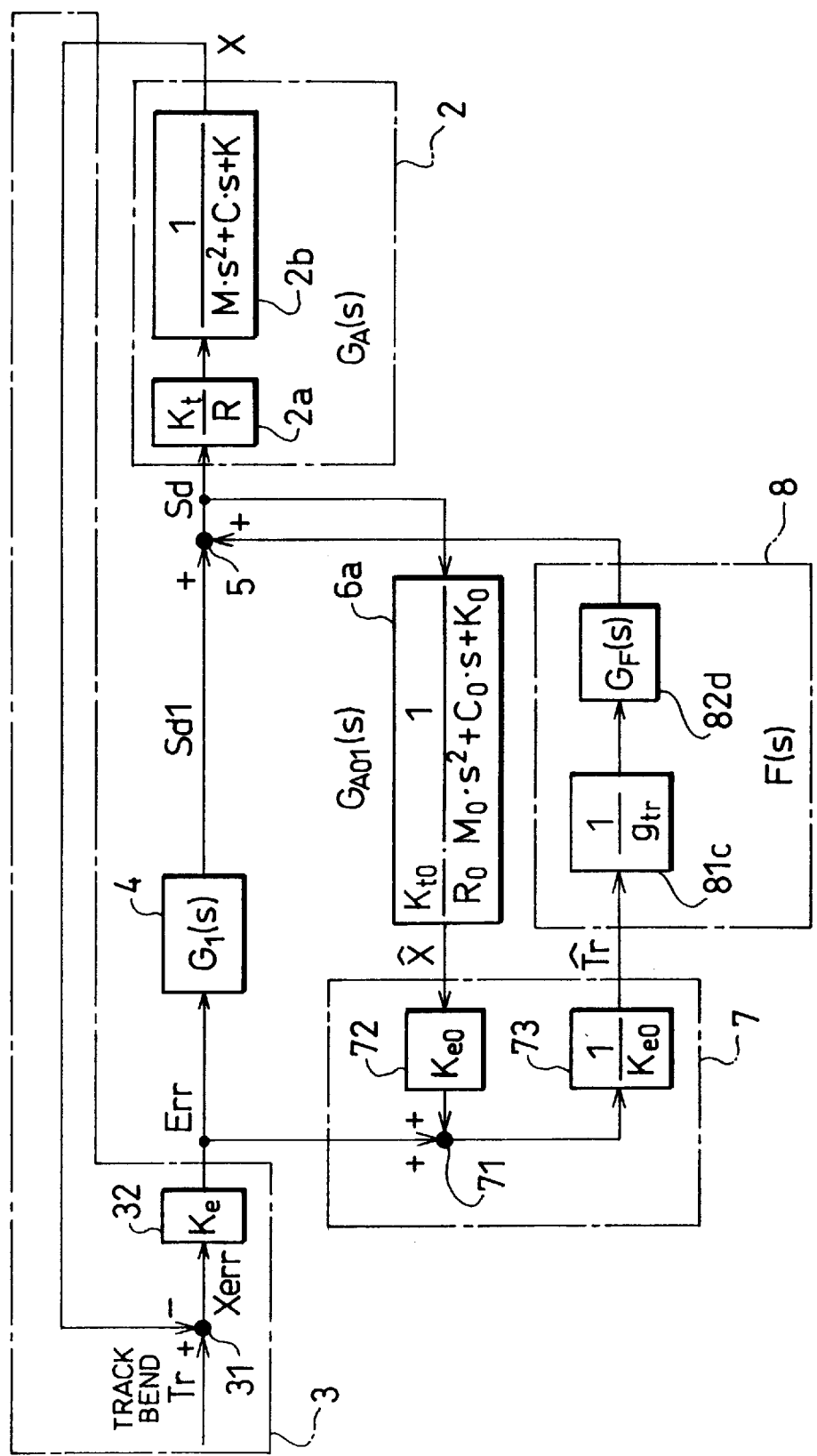
FIG. 19 which shows the structure of FIG. 3 in more detail is a control block diagram showing a modification of the control system in the control information recording and reproducing apparatus in accordance with the sixth embodiment.

Although explanations have been given through the case where both simulation circuits 6 and 81 are constituted by the gains. However, as shown in FIG. 19, the inverse simulation circuit 81c in which only the inverse characteristic simulation circuit 81 is constituted by gain may be adopted. As long as either one of the circuit is composed of gain, the same effect as achieved from the structure of the present invention can be achieved.

[Modified Example 1]

Figure 20:
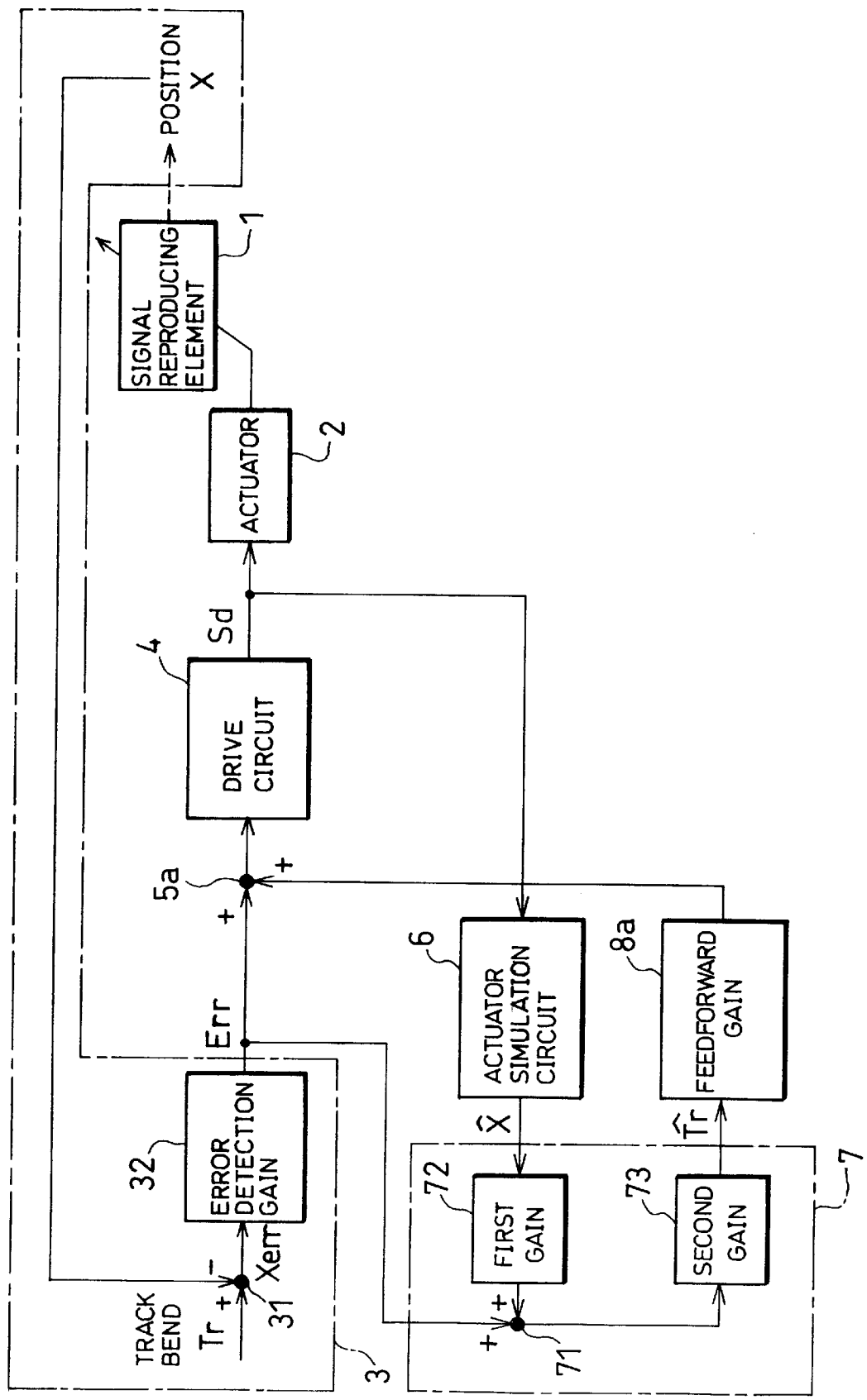
FIG. 20 which is a block diagram showing a structure of essential parts of the control system shows one modified example of the control system in the information recording and reproducing apparatus in accordance with first through sixth embodiments of the present invention.
Figure 21:
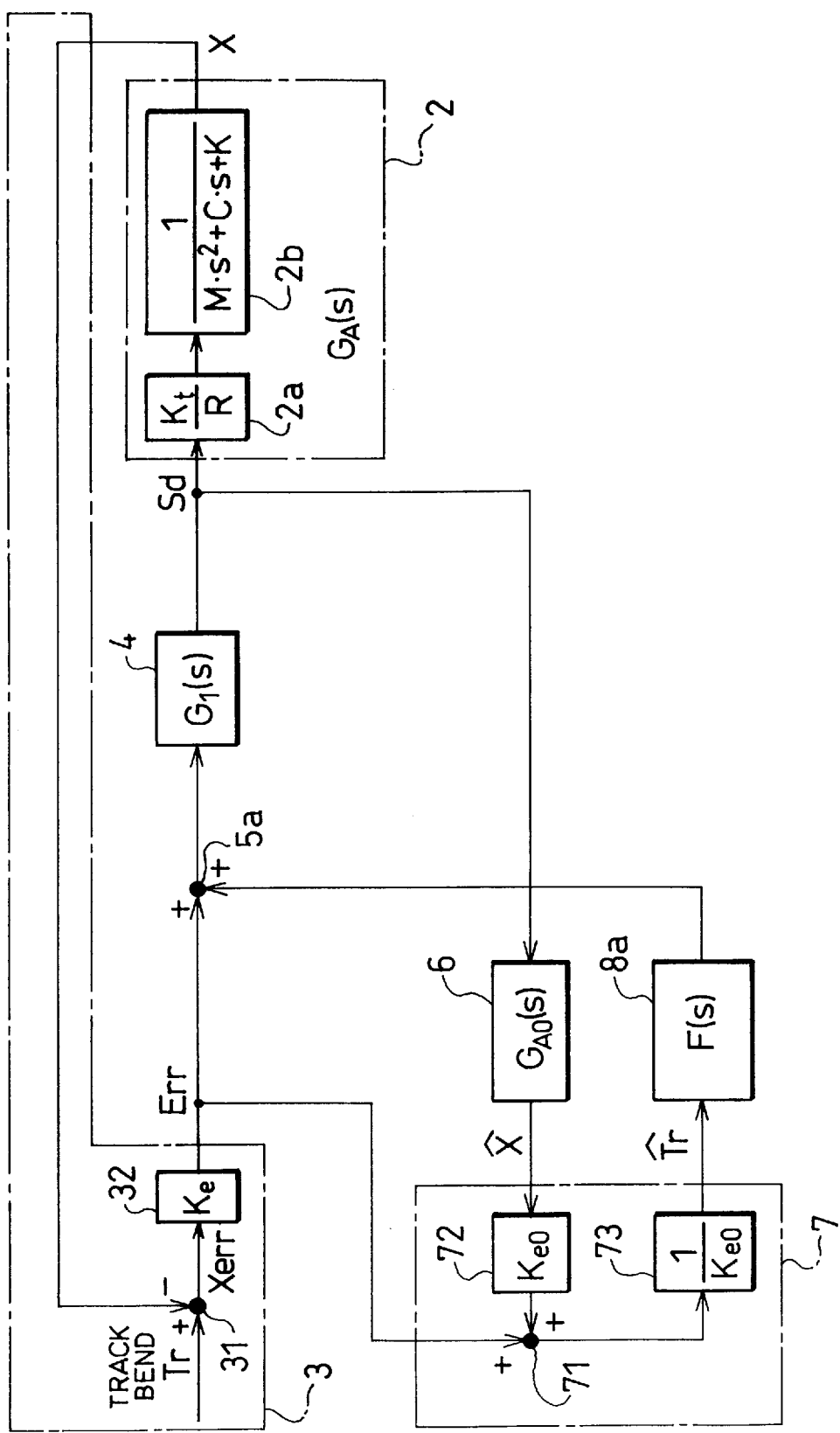
FIG. 21 is a control block diagram in which each block in the equivalent circuit of FIG. 20 is shown in transfer function.

As shown in FIG. 1, in the described first through sixth embodiments, explanations have been given through the case of feeding the desired follow-up estimated signal $\hat{Tr}$ forward to a control input Sd; however, the present invention is not limited to this. As shown in FIG. 20, the arrangement where the follow-up estimated signal $\hat{Tr}$ is fed forward to an input side of the drive circuit 4 would offer the same effect. In this case, in replace of the adder 5 shown in FIG. 1, an adder 5a is provided in the previous stage of the drive circuit 4. Accordingly, the transfer function F(s) of the feedforward gain 8a shown in FIG. 21 is set to different characteristics from F(s) shown in FIG. 3 for a difference in adding position by feedforward. In the feedforward gain 8a, in addition to the inverse characteristic simulation circuit 81 and the feedforward gain 82, a circuit for simulating the inverse characteristics of the drive circuit 4 is added.

As explained, the control system in accordance with the first through sixth embodiments includes the actuator 2 for guiding the signal reproducing element 1 to a track formed on the recording medium, the error detector 3 for detecting a difference in relative position between the signal reproducing element 1 and the track, and the drive circuit 4 for adjusting a control input to be applied to the actuator 2 based on outputs of the error detector 3. Furthermore, the feedforward loop is constituted by the actuator simulation circuit 6, the target follow-up estimator 7, the inverse characteristic simulation circuit 81 and the feedforward gain part 82, and the estimated result is fed forward to the output side or the input side of the drive circuit 4.

In the described arrangement, the actuator 2 moves the signal reproducing element 1 based on the control input Sd. The error detector 3 detects a difference in relative position between the track and the signal reproducing element 1 and outputs an error signal Err. The drive circuit 4 outputs a control input Sd1 of the actuator 2 based on the error signal Err.

On the other hand, the actuator simulation circuit 6 simulates the characteristics of the actuator 2, and estimates the position X of the signal reproducing element 1 based on the control input Sd to be supplied to the actuator 2. The target follow-up estimator 7 estimates a track bend Tr of a follow-up target of the signal reproducing element 1 based on the output from the error detector 3 and the actuator simulation circuit 6. Furthermore, the target follow-up estimated signal $\hat{Tr}$ outputted from the target follow-up estimator 7 is supplied to the adder 5 via the feedforward gain 8, and is supplied by feeding it forward to the output side or the input side of the drive circuit 4. As a result, a corrected control input Sd is supplied to the actuator 2 using an estimated signal of the track bend Tr.

Additionally, the control input recited in claims corresponds to a control input Sd to be supplied to the actuator 2, and in the control system shown in FIG. 1, the drive circuit 4 outputs a control input Sd1 based on the error signal Err, to adjust the control input Sd.

As described, the control system in accordance with the first through sixth embodiments estimates a track bend Tr which cannot be detected independently by the error detector 3 at a real time, and feeds the estimated signal forward at real time through the feedforward gain 8. As a result, the control system permits the signal reproducing element 1 to follow the track bend Tr with high precision over a wide band while maintaining the stability compared with the conventional control system.

In the case where the feedforward gain 8 is divided into the inverse characteristic simulation circuit 81 for simulating the inverse characteristics of the actuator 2 and the feedforward gain part 82, various arrangements can be applied to the feedforward gain part 82.

For example, in the first embodiment, the feedforward gain part 82 is arranged such that the transfer function $G_F(s)$ has a proportional gain that is independent of frequency. According to the described arrangement, an open-loop gain can be improved over the entire frequency band. As a result, the signal reproducing element 1 can follow the track bend Tr with high precision over a wide band while maintaining the stability compared to the conventional control system.

Like the arrangements adopted in the second through sixth embodiments, it is preferable that the feedforward gain part 82 includes a filter such as a low-pass filter, a band-pass filter, etc. In these embodiments, in the feedforward loop, for example, the filter removes a frequency component of a predetermined band such as a high frequency band, etc. Thus, the follow-up precision of the control system is improved in a specific passband such as low band. On the other hand, other than the specific pass band such as high band, the conventional characteristics of the control system are maintained. As a result, in the event of a phase shift in the high band due to the dead time caused by the circuit lag, or high-order resonance of the actuator 2, or an event of insufficient phase margin like the case of adopting the punch-through servo, the control system offers an improved follow-up precision of the signal reproducing element 1 with respect to the track bend Tr.

To be more specific, in the second and third embodiments, the feedforward gain part 82 includes a low-pass filter. According to the described arrangement, in the feedforward loop, the high frequency component is removed by the low-pass filter. Therefore, the open-loop gain of the control system is suppressed to not more than 0 dB in high band. As a result, due to the effects of the idle time caused by the circuit lag or the effect of the high order resonance of the actuator 2, even in an event of a phase shift occurred in the high band, the control system permits the signal reproducing element 1 to follow the track bend Tr stably with high precision.

Like the arrangement adopted in the third embodiment, the cut-off frequency $f_L$ of the low-pass filter may be set lower than the gain-crossover frequency $f_c$ before the feedforward loop is added. In this case, in the low band side, i.e., the passband of the low-pass filter, the open-loop gain of the control system increases. Additionally, in a vicinity of the gain-crossover frequency $f_c$, the open-loop characteristics of the control system are substantially the same as the conventional control system. As a result, compared with the conventional control system, the open-loop gain can be increased without changing the control band. Therefore, even the control system does not permit the control band to be changed due to the effects of the circuit lag or the actuator 2 or the high order resonance of the actuator 2, an improved follow-up precision can be achieved.

Like the arrangements adopted in the fourth through sixth embodiments, the feedforward gain part 82 may include a band-pass filter. Here, the center frequency of the band-pass filter is set to the fundamental frequency $f_{tr}$ of the track bend Tr.

According to the described arrangement, in the feedforward loop, only the component in a vicinity of the center frequency is fed forward to be added. Therefore, compared with the conventional control system, an open-loop gain in a vicinity of the center frequency is increased. As a result, in a vicinity of the fundamental frequency $f_{tr}$ of the track bend Tr, the control system offers a significantly improved follow-up precision with respect to the track bend Tr. On the other hand, as the band-pass filter removes the frequency component of the cut-off band that is apart from the center frequency, the open-loop transfer characteristics in the cut-off band are substantially the same as the conventional control system, thereby ensuring the same stability as the conventional control system. Therefore, for example, like the control system adopting the punch-through servo system, even when the control system has a minimum phase margin before the feedforward loop is added, a still improved follow-up precision with respect to the track bend Tr can be achieved under stable conditions.

Additionally, in the band that is apart from the center frequency, the characteristics of the feedforward loop composed of the actuator simulation circuit 6 do not have effects on the open-loop characteristics of the control system. Therefore, based on the characteristics in a vicinity of the center frequency, the feedforward characteristics can be determined, thereby achieving an improved degree of freedom in setting characteristics.

On the other hand, various arrangements may be adopted also for the actuator simulation circuit 6 and the inverse characteristic simulation circuit 81. In the first through fourth embodiments, both simulation circuits 6a and 81a respectively simulate all the characteristics and inverse characteristics of the actuator 2. Therefore, as the target follow-up estimator 7 can estimate the track bend Tr with accuracy, the maximized effect can be achieved in terms of the track bend follow-up precision and the control band.

On the other hand, the respective simulation circuits 6b and 81b adopted in the fifth embodiment simulate at least the highest-order integral characteristics and the inverse characteristics of all the characteristics of the actuator 2. In the described arrangement, as the actuator 2 is shown by a second-order lag element having a resonance, the simulation circuits 6b and 81b simulate only the double integral characteristics, and the inverse characteristics thereof.

In the described arrangement, as not all the characteristics are simulated, compared with the arrangement adopted in the first through fourth embodiments in which all the characteristics are simulated, the respective structures of the simulation circuits 6b and 81b can be simplified. As a result, the same effect as achieved by the arrangement of the first through fourth embodiments can be achieved with a simplified structure. This not only permits the manufacturing cost of the control system having the simulation circuits 6b and 81b to be reduced, but also permits the control system of a simplified structure to be adjusted with precision.

Furthermore, in the sixth embodiment, the feedforward gain part 62 is provided with a band-pass filter for passing therethrough a component in a vicinity of the fundamental frequency $f_{tr}$ of the track bend Tr, and the simulation circuits 6c and 81c are constituted by an element having the same characteristics as the actuator 2 and substantially the same inverse characteristic as the actuator 2 at least in the passband.

As a result, in the passband, the target follow-up estimator 7 permits the track bend Tr to be estimated accurately. Therefore, compared with the conventional control system, an improved follow-up precision can be achieved in the passband compared with the conventional control system. Additionally, as the band to be simulated is limited, the described simulation circuits 6c and 81c can be achieved, for example, by a gain, etc., which does not have frequency characteristics, and compared with the case where the characteristics and inverse characteristics of the actuator 2 are simulated in all the frequency band, a simplified structure can be achieved. As a result, the respective structures of the simulation circuits 6c and 81c can be still simplified. Therefore, the same effect as achieved from the arrangement of the fourth embodiment can be achieved with a simple structure. Additionally, as the band-pass filter is provided, in the band that is apart from the passband, even if respective characteristics of the simulation circuits 6c and 81c differ from respective characteristics and inverse characteristics of the actuator 2, it would not be a problem.

As in the arrangement adopted in the fourth and sixth arrangements, in the case of adopting the second order band-pass filter ($G_{BPF}(s)$) as the feedforward gain part 82, especially, in the transfer function F(s) of the feedforward gain 8 composed of the inverse characteristic simulation circuit 81*a* and the feedforward gain part 82*d*, the order of s of the numerator is higher than that of the denominator and is contaminated in the feedforward loop, which may cause the output of the feedforward gain 8 to be saturated with respect to a high band noise. Such problem may be prevented by providing the low-pass filter for cutting off the high band noise in the feedforward gain part 82.

Namely, the transfer function $G_F(s)$ of the feedforward gain part 82 is given by the following equation:

$$G_F(s) = G_{BPF}(s) \cdot G_{LPF5}(s) \tag{37}$$

wherein $G_{LPF5}(s)$ is the transfer function of the low-pass filter.

For example, assume that the low-pass filter is the second order low-pass filter. Then, the transfer function of the forward gain 8 is arranged such that the numerator has a lower order of s than that of the denominator, and this feature permits the control system to operate stably even if the high band noise is contaminated.

In order to cut off the high band noise, the low-pass filter is arranged such that the cut-off frequency is significantly higher than the fundamental frequency $f_{tr}$ of the track bend Tr. Therefore, even if the low-pass filter is used, the same operation of the control system as achieved from the arrangement without the low-pass filter can be ensured. Additionally, the described low-pass filter for cutting off the high band noise is applicable to not only the fourth and the sixth embodiment but also other arrangements. In any case, the high band noise can be cut off while ensuring the operation of the control system.

[Seventh Embodiment]

In the third and fourth embodiments, as shown in FIG. 10 and FIG. 12, except for very high band, the following condition holds:

$$|G_{open}| >> |G_F(s)| \tag{38}$$

As a result, characteristics are shown substantially as expressed by the following equation (39) except for a very high band.

$$G_{open}1 \doteq G_{open}/\{1 - G_F(s)\} \tag{39}$$

As a result, $G_{open}1$ in the low band or the specific frequency band is increased.

Figure 22:
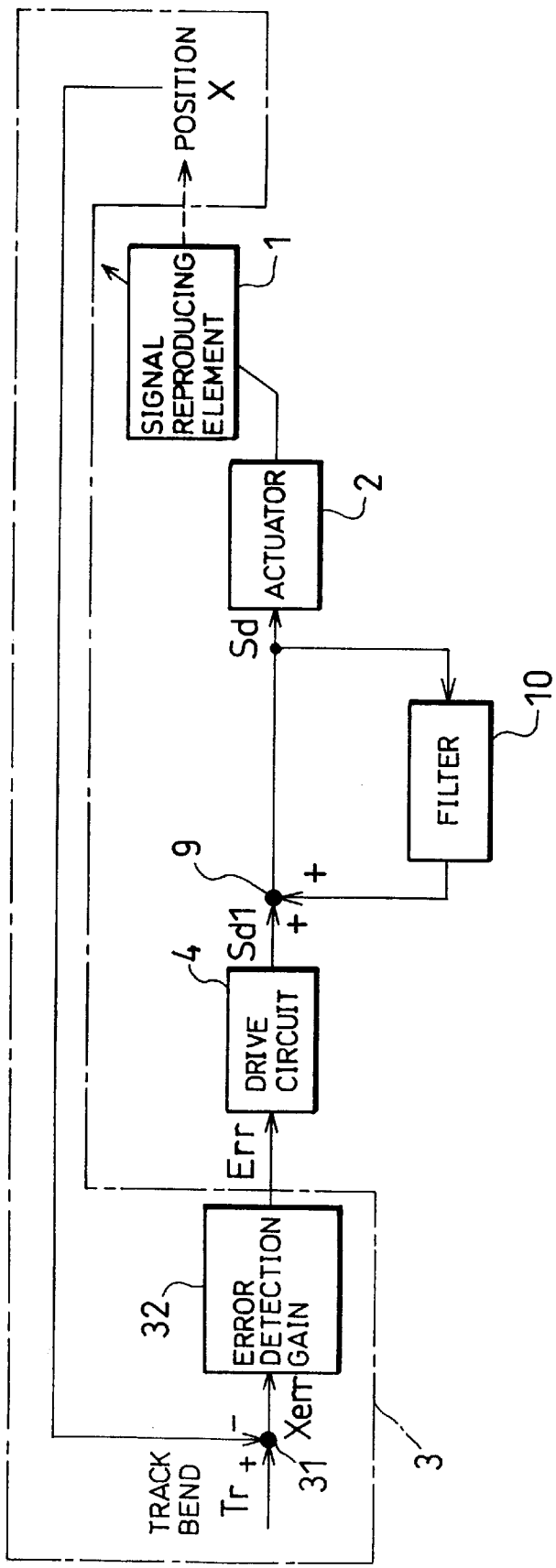
FIG. 22 is a block diagram showing a structure of essential parts of the control system in information recording and reproducing apparatuses in accordance with the seventh and eighth embodiments of the present invention.
Figure 23:
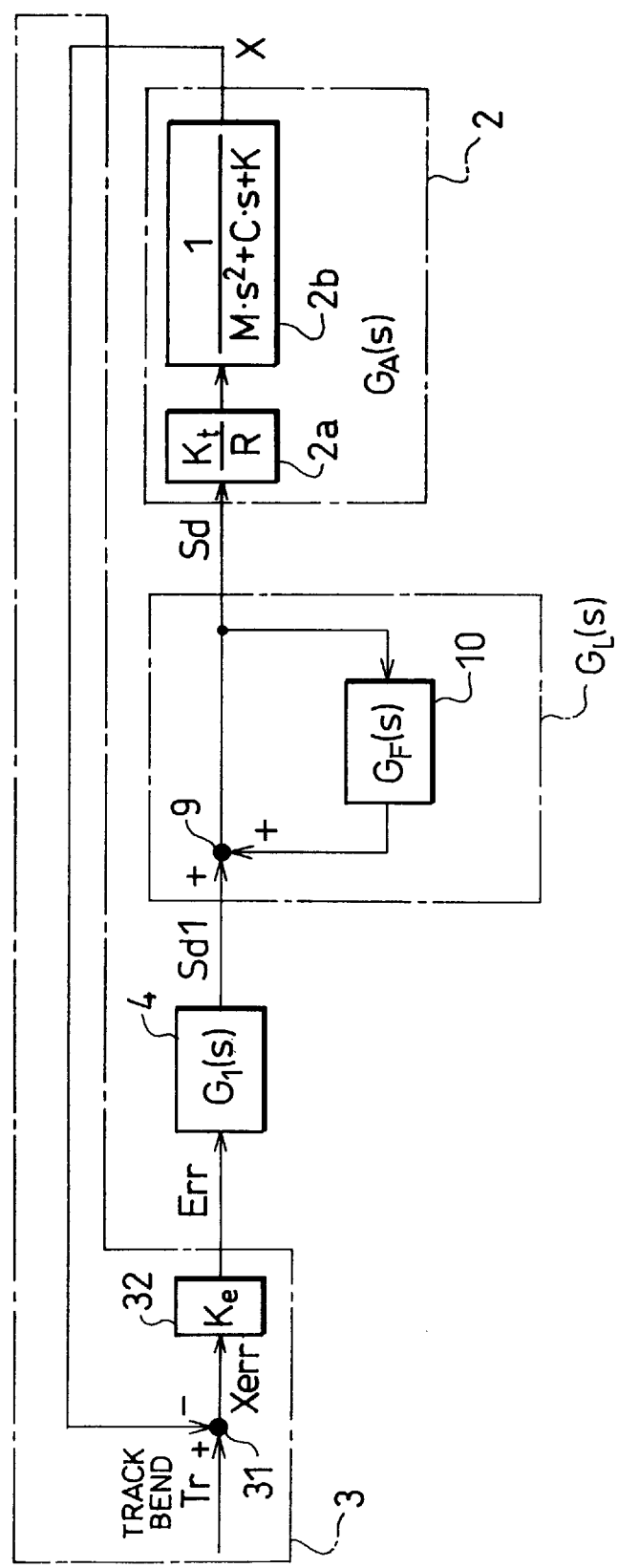
FIG. 23 is a control block diagram in which each block in the equivalent circuit of FIG. 22 is shown in transfer function.

In contrast, as shown in FIG. 22 and FIG. 23, in replace of a feedforward loop composed of the adder 5, the actuator simulation circuit G, the target follow-up estimator 7 and the feedforward gain 8 shown in FIG. 1, the control system in accordance with the present embodiment includes an adder 9 provided between the drive circuit 4 and the actuator 2, and a filter 10 (transfer function: $G_F(s)$) for positive-feeding a control input Sd back to the actuator 2. Here, in claims, a controlling element corresponds to both the drive circuit 4 and the positive feedback loop in the present embodiment.

Therefore, the transfer function $G_L(s)$ of the positive feedback loop is given as:

$$G_L(s) = 1/\{1 - G_F(s)\} \tag{40}$$

As a result, the $G_{open}4$ of the open-loop transfer characteristics is given as:

$$\begin{aligned} G_{open}4 &= K_e \cdot G_1(s) \cdot G_L(s) \cdot G_A(s) \\ &= G_{open}/\{1 - G_F(s)\}. \end{aligned} \tag{41}$$

The above equation (41) is substantially the same as the equation (39).

Figure 24:
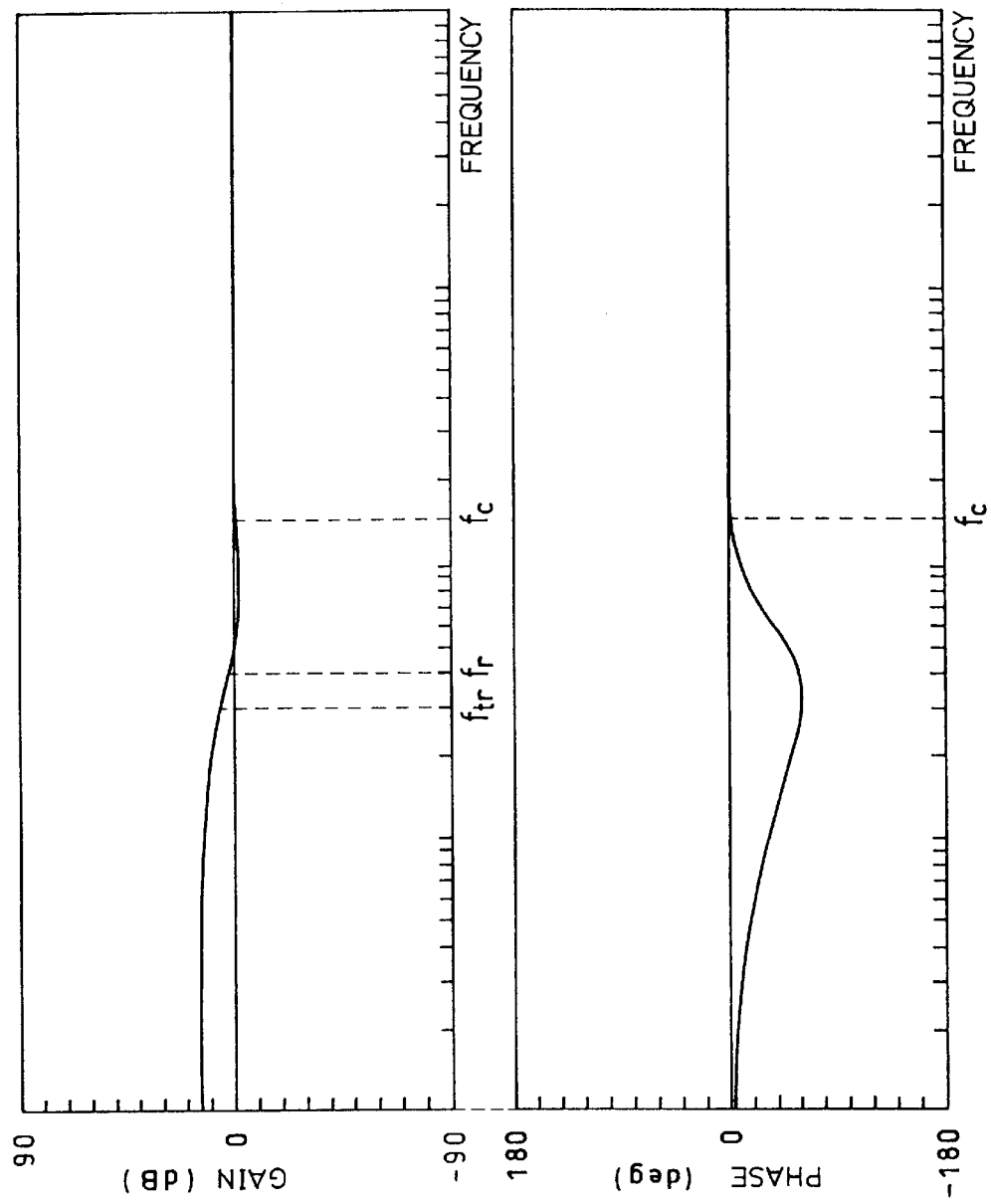
FIG. 24 is a Bode diagram showing transfer characteristics of a positive feedback loop provided in the control system of the information recording and reproducing apparatus in accordance with the seventh embodiment of the present invention.

The filter 10*a* in accordance with the present embodiment is the same as the low-pass filter ($G_{LPF}2(s)$) of the third embodiment (see FIG. 10). As shown in FIG. 24, in an upper band than the gain-crossover frequency $f_c$ before the positive feedback loop is added (gain-crossover frequency $f_c$ of the conventional art), the transfer characteristic $G_L(s)$ of the positive feedback loop in accordance with the present embodiment has a gain of 0 dB and a phase lag of 0°. On the other hand, a high gain of 14 dB is obtained in the low band.

Figure 25:
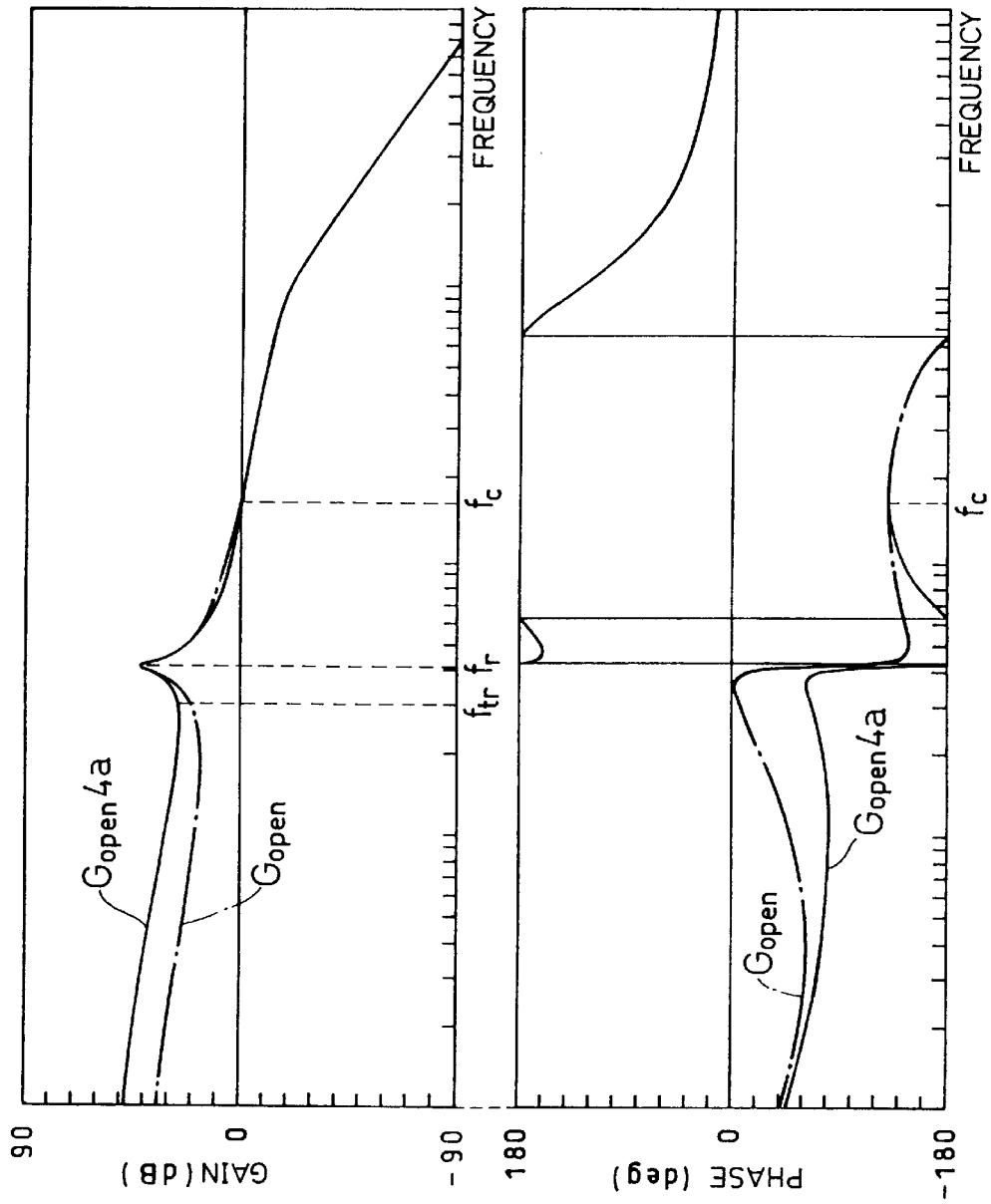
FIG. 25 is a Bode diagram showing open-loop transfer characteristics in the control system.

As a result, as shown in FIG. 25, the open-loop transfer characteristics $G_{open}4a$ in accordance with the present embodiment are such that the phase margin at the gain-crossover frequency $f_c$ is not reduced as much as the conventional arrangement. Additionally, the open loop gain on the low band side is increased as in the open-loop characteristics (see FIG. 11) of the third embodiment. However, compared with the gain-crossover frequency $f_c$, the characteristics of very high band are slightly different from the gain-crossover frequency $f_c$. Namely, in the present embodiment, as the positive feedback loop is provided, almost the same function as achieved by estimating the track bend and feeding it forward can be achieved. Therefore, the control system in accordance with the present embodiment offers an improved follow-up precision of the signal reproducing element 1 with respect to the track bend Tr while ensuring a sufficient stability as achieved from the third arrangement.

Furthermore, the positive feedback loop in accordance with the present embodiment is composed of the filter 10, etc., and compared with the feedforward loop in the control system in accordance with the third embodiment, the structure can be significantly simplified, thereby permitting a significant simplification of the circuit structure and a reduction in cost of the control system.

[Eighth Embodiment]

In the described seventh embodiment, as in the third embodiment, the frequency characteristics of the low-pass filter are restricted in order to enure the stability as achieved by the conventional control system. Thus, the open loop gain in the fundamental frequency $f_{tr}$ of the track bend Tr cannot be increased significantly.

In contrast, in the arrangement of the eighth embodiment, as the filter 10 shown in FIG. 22 and FIG. 23, a band-pass filter in which a center frequency thereof is set to a fundamental frequency $f_{tr}$ of the track bend Tr. Other than the arrangement of the filter 10, the control system of the eighth embodiment is the same as that of the seventh embodiment, and thus the descriptions thereof shall be omitted here.

Figure 26:
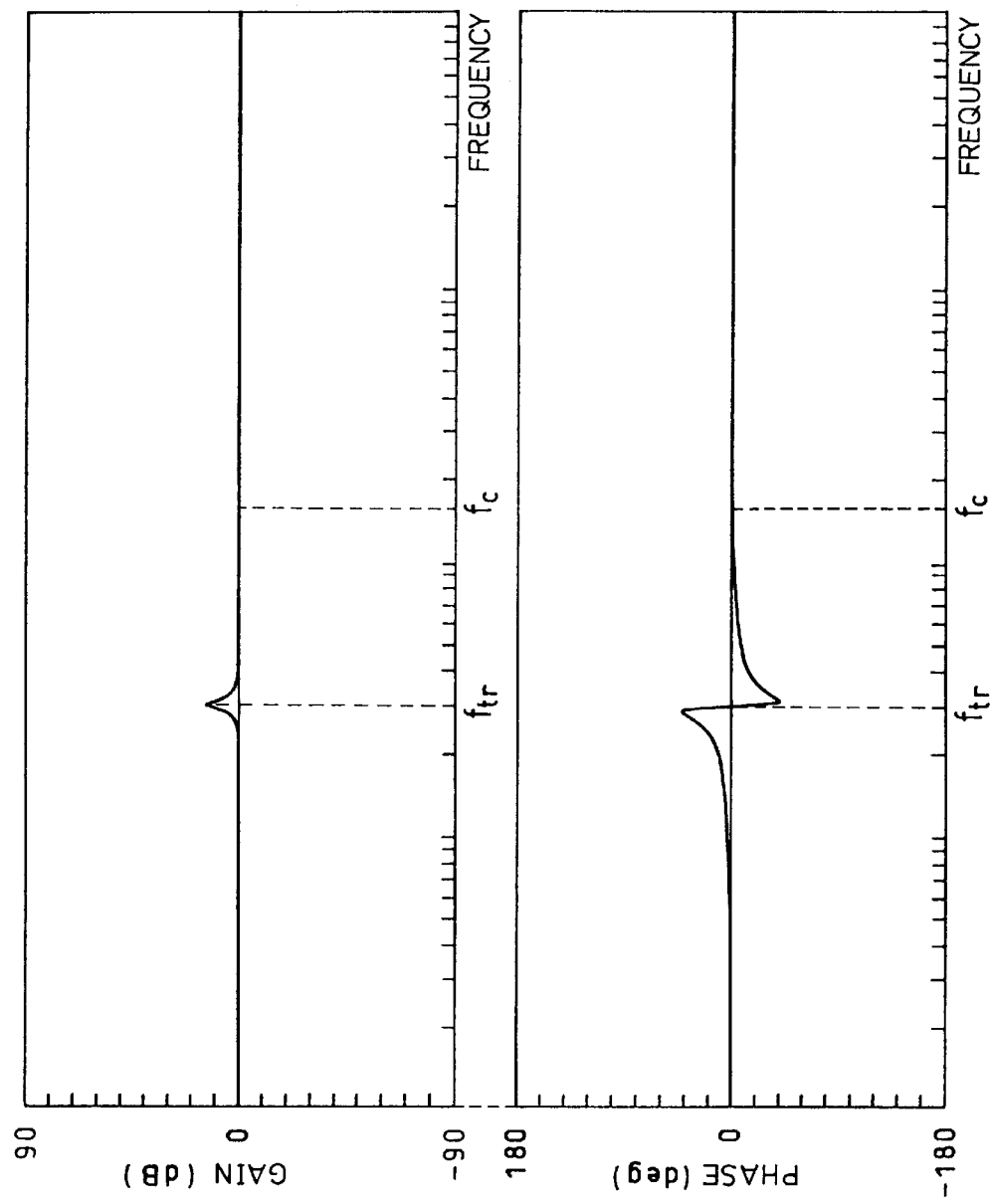
FIG. 26 is a Bode diagram showing transfer characteristics of a positive feedback loop provided in a control system in an information recording and reproducing apparatus in accordance with the eighth embodiment of the present invention.

An example of the transfer characteristics $G_L(s)$ of the positive feedback loop in the present embodiment is shown in FIG. 26. A filter 10*b* adopted in this embodiment is the same as the band-pass filter ($G_{BPF}(s)$: see FIG. 12) of the fourth embodiment.

As shown in the figure, the transfer characteristics $G_L(s)$ show a high gain of 14 dB at a fundamental frequency $f_{tr}$ of the track bend Tr. The phase characteristic is 0° except for a vicinity of the center frequency $f_{tr}$ of the band-pass filter.

Figure 27:
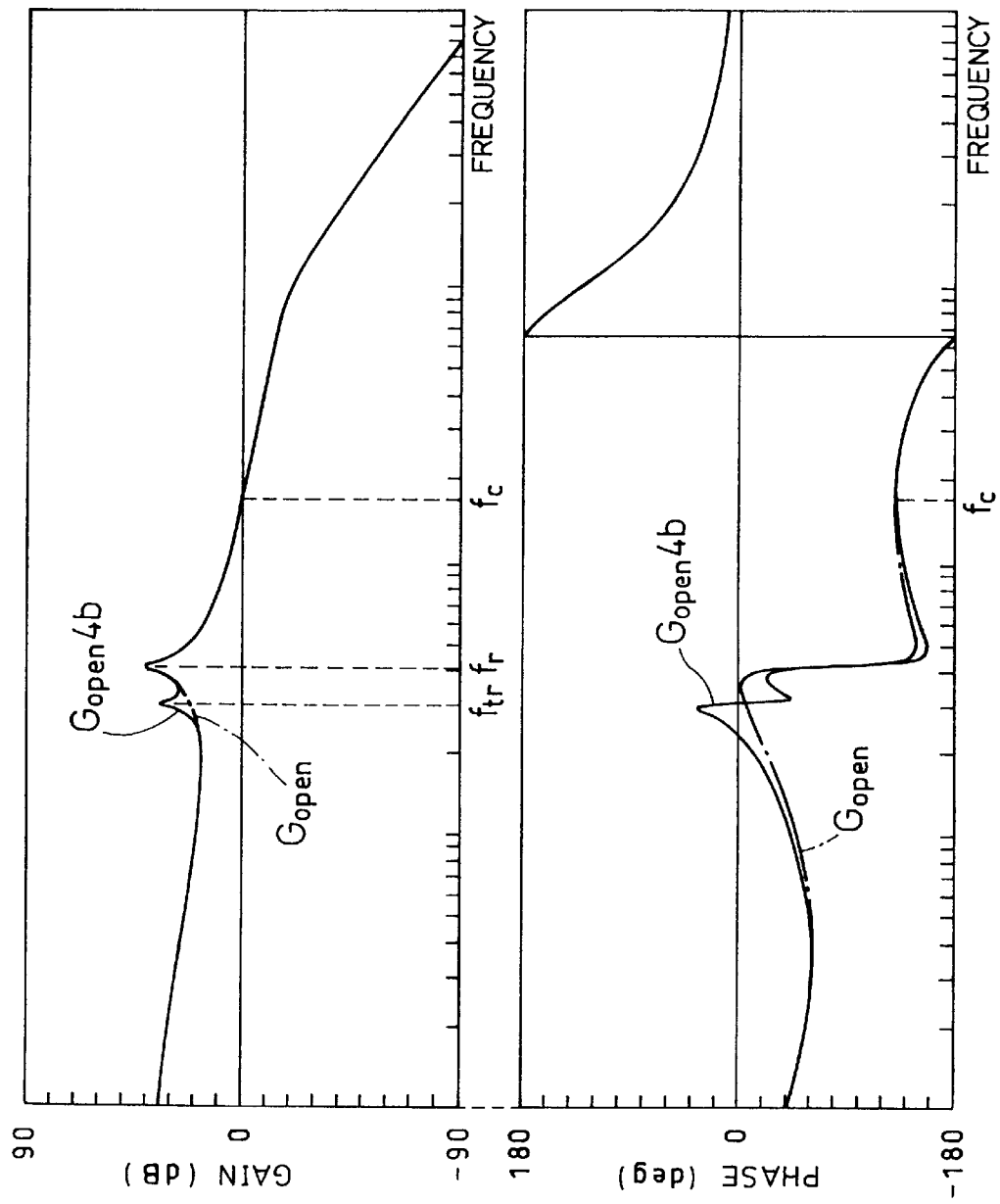
FIG. 27 is a Bode diagram showing open-loop transfer characteristics in the control system.

Therefore, the gain of the open loop transfer characteristic $G_{open}4b$ in the present embodiment is higher (14 dB) at the fundamental frequency $f_{tr}$ of the track bend Tr compared with the conventional open-loop transfer characteristic $G_{open}$ as shown in FIG. 27. The phase characteristic is the same as the conventional open-loop transfer characteristics $G_{open}$ except for a vicinity of a center frequency $f_{tr}$ of the band-pass filter. Such open loop characteristics in combination of the gain characteristic and the phase characteristic are almost the same as the open-loop characteristics (see FIG. 13) of the fourth embodiment. However, compared with the gain-crossover frequency $f_c$, the characteristics of very high band are slightly different. In the present embodiment, as the positive feedback loop is provided as in the seventh embodiment, almost the same function as achieved by estimating the track bend and feeding the estimated signal forward can be achieved.

As a result, as in the fourth embodiment, the control system in accordance with the present embodiment offers an improved follow-up precision of the signal reproducing element 1 with respect to the track bend Tr while ensuring a sufficient stability. Therefore, in the control system adopting the punch-through servo system, the signal reproducing element 1 can follow the track bend Tr with high precision without loosing stability.

Furthermore, the control system in accordance with the present embodiment offers a significantly simplified structure compared with the control system in accordance with the fourth embodiment. As a result, the structure of the circuit can be simplified, thereby reducing a manufacturing cost.

As described, the control system in accordance with the seventh and eighth embodiments includes the actuator 2 for guiding the signal reproducing element 1 to a track formed on the recording medium, an error detector 3 for detecting a difference in relative position between the signal reproducing element 1 and the track and the drive circuit 4 for adjusting a control input to be applied to the actuator 2 based on an output of the error detector 3. Furthermore, the positive feedback loop for positive-feeding the control input Sd back to the actuator 2 is constituted by the adder 9 and the filter 10. As a result, while ensuring the stability, an improved open loop gain of the control system can be achieved. Additionally, the positive feedback loop of the present embodiment can be achieved with a circuit of a simpler structure compared with that of the feedforward loops of the third and fourth embodiments, thereby achieving a control system which offers an improved follow-up precision while maintaining a stability with a simple structure.

[Ninth Embodiment]

The described first through eighth embodiments are designed for the information recording and reproducing apparatus such as a magnetic tape device, a magnetic disk device, an optical disk device, etc., and are arranged so as to make the signal reproducing element 1 follow the track bend Tr of the target track. In contrast, the control system in accordance with the present embodiment is desired for a device such as a rotary head type magnetic tape device, etc., wherein a non-scanning period in which the signal reproducing element 1 does not scan the track is formed, and it is required to be set in a stand-by state in an appropriate position before the signal reproducing element 1 starts a dynamic tracking operation. Hereinafter, the explanations will be given through the case where the information recording and reproducing device is the rotary head type magnetic tape device. In this case, the signal reproducing element 1 is a magnetic head.

Figure 28:
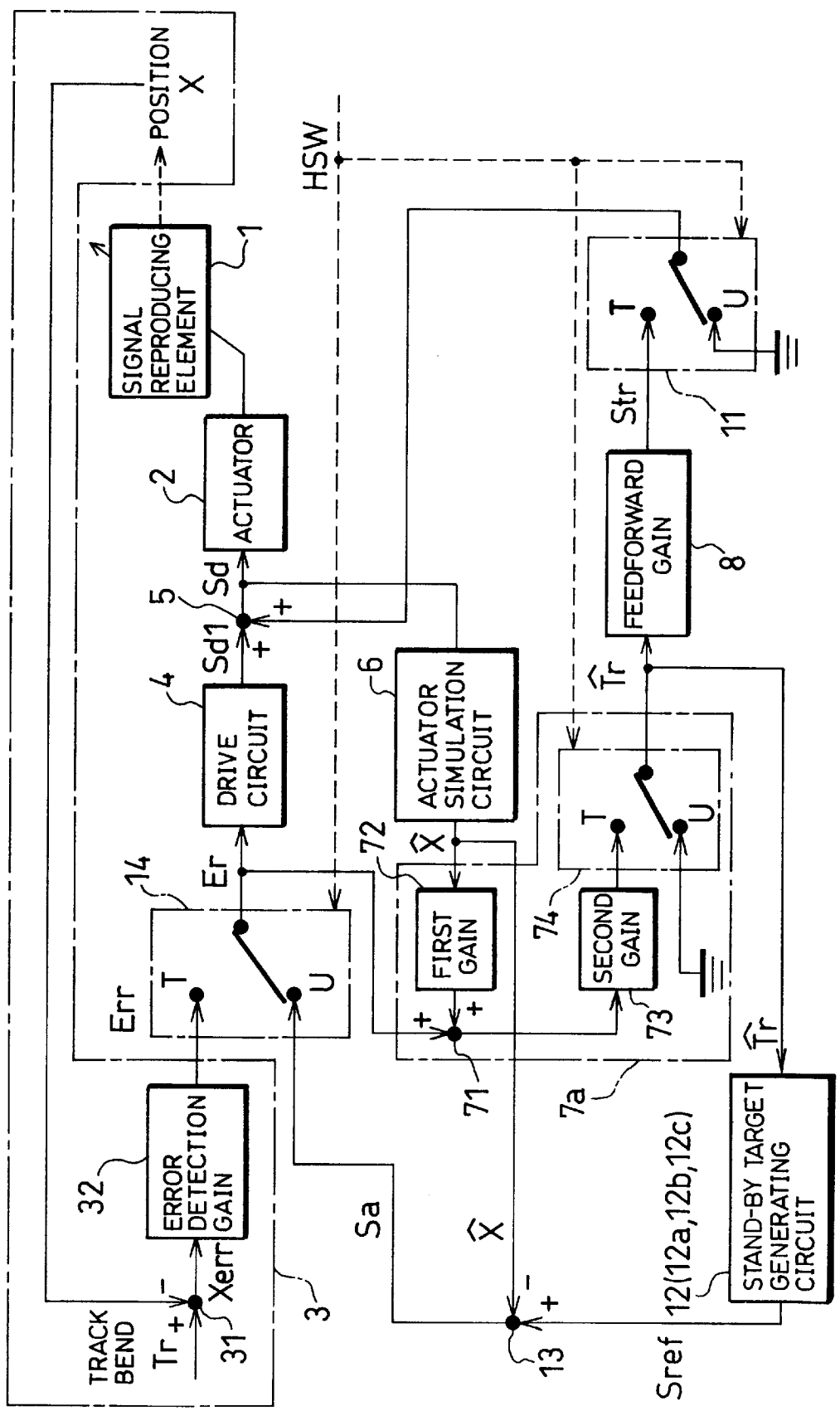
FIG. 28 is a block diagram showing a structure of essential parts of the control system in the information recording and reproducing apparatus in accordance with the ninth and tenth embodiments of the present invention.

As shown in FIG. 28, the control system in accordance with the present invention includes a first switch 11 for selecting whether or not an output Str of the feedforward gain 8 is transferred to the adder 5 in addition of the arrangement of the first embodiment shown in FIG. 1. The control system also includes a stand-by target generating circuit (stand-by target generation means) 12 and a comparator (comparison means) 13. The stand-by target generating circuit 12 outputs a target stand-by signal Sref indicative of a target follow-up signal in a stand-by state based on an input of a desired follow-up estimated signal $\hat{Tr}$ outputted from the target follow-up estimator 7a. The comparator 13 compares the target stand-by signal Sref with the output of the actuator simulation circuit 6. The control system further includes the second switch 14 between the error detector 3 and the drive circuit 4, which outputs either a head stand-by signal Sa to be outputted from the comparator 13 and the error signal Err to be outputted from the error detector 3.

In addition to the arrangement of the target follow-up estimator 7 shown in FIG. 1, the target follow-up estimator 7a in accordance with the present embodiment further includes a third switch 74 for selecting whether or not an output from the second gain 73 is to be sent to the feedforward gain 8 and the stand-by target generating circuit 12. No matter which is selected by the third switch 74, the output of the third switch 74, i.e., the output of the follow-up target estimator 7a are referred to as the desired follow-up estimated signal $\hat{Tr}$.

Here, members having the same function as those of the first embodiment will be designated by the same reference numerals, and thus the descriptions thereof shall be omitted here. As in the aforementioned first through fourth embodiments, it is preferable that the transfer function of each member be set so as to satisfy the above-mentioned equations (15) and (16).

Here, respective first through third switches 11, 14 and 74 are controlled by a head switch signal HSW showing whether the magnetic head (signal reproducing element 1) is in a magnetic tape scanning period. Based on the head switch signal HSW, the first switch 11 sends an output of the feedforward gain 8 in a scanning period while outputs a signal of 0 level in a non-scanning period. The second switch 14 outputs an error signal Err in a scanning period. On the other hand, in the non-scanning period, the second switch 14 transfers the head stand-by signal Sa to the drive circuit 4, etc. Furthermore, the third switch 74 sends an output of the second gain 73 as a desired follow-up estimated signal $\hat{Tr}$ to the feedforward gain 8 and the stand-by target generating circuit 12 in the scanning period, while outputs a signal of 0 level in a non-scanning period. Specifically, the target stand-by generating circuit 12 (shown by 12a) in accordance with the present embodiment includes a sample hold circuit (memory means) 91 and a fourth switch 92 for selecting whether or not an output signal $\hat{Trt}$ of the sample hold circuit 91 is to be sent to the comparator 13.

The sample hold circuit 91 is provided for sample-holding the desired follow-up estimated signal $\hat{Tr}$ based on a timing pulse TP indicative of a start of the scanning period. The fourth switch 92 is controlled based on the head switching signal HSW as in the respective switches 11, 14 and 74, and outputs a signal of 0 level in the scanning period, while transfers the output signal $\widehat{\text{Trt}}$ of the sample hold circuit 91 to the comparator 13 in the non-scanning period. In each figure in and after FIG. 28, in respective switches 11, 14, 74 and 92, the selecting side in the scanning period is denoted as T, while the selecting side in the non-scanning period is denoted as U. In the figure, the sample hold circuit 91 is hereinafter shown by S·H.

Here, as respective examples of the signal reproducing element 1 (magnetic head 26) and the actuator 2 in accordance with the present embodiment, the rotary head type magnetic tape device (see FIG. 30 and FIG. 31) disclosed in the aforementioned Japanese Examined Patent Application No. 8486/1993 (Tokukohei 5-8486) may be raised.

As shown in FIG. 32, the magnetic tape has a plurality of tracks formed in a slanted direction with respect to the moving direction of the tape. As described, a wounding angle of the magnetic tape to the drum device is 180°. Therefore, in a period till the next the start of the next period of scanning a track after the magnetic heads 26a has scanned one track by rotating the magnetic head, in the period till the magnetic head 26 contacts the magnetic tape again, the magnetic head 26 is in a stand-by position. Hereinafter, the period in which the magnetic head 26 is scanning the magnetic tape is defined to be a scanning period, while a period in which the magnetic head 26 is in a stand-by position without scanning the magnetic tape is defined to be a non-scanning period.

Additionally, the respective arrangements of the signal reproducing element 1 and the actuator 2 are not limited to the described arrangement shown in FIG. 30 and FIG. 31, and other arrangements may be equally adopted. Furthermore, in the following example, explanations are given through the case of adopting the magnetic head 26. However, needless to mention, any information recording and reproducing apparatus in which a non detection period is formed may be adopted. Additionally, for the detection method of the error in relative position in the error detector 3, various methods such as the second order frequency pilot signal system, the fourth order pilot signal system, the wobbling system etc., may be adopted.

Next, respective operations of each member in the scanning period and the non-scanning period will be explained in reference to timing charts shown in FIGS. 33 through 36.

Figure 29:
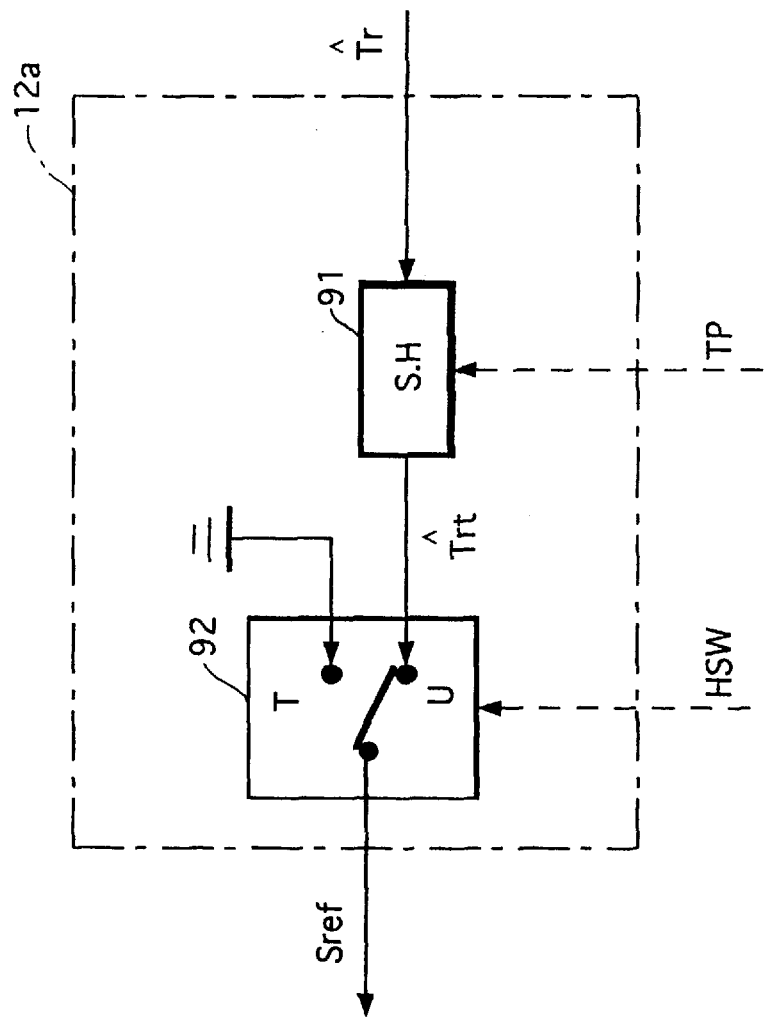
FIG. 29 is a block diagram showing a structure of essential parts of a target stand-by generating circuit in accordance with the ninth embodiment.
Figure 33:
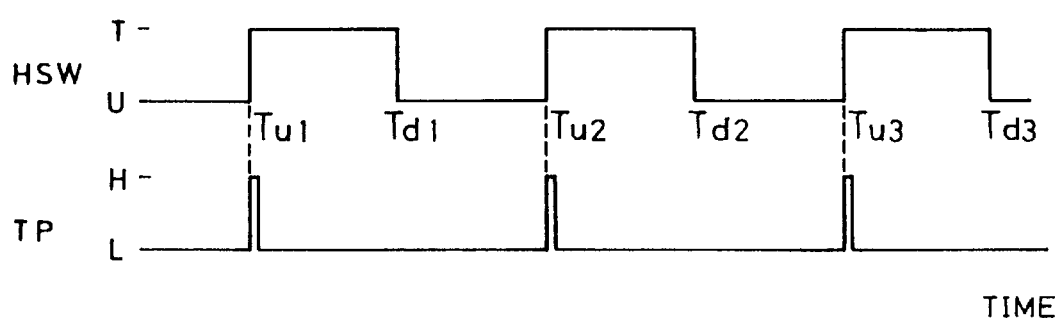
FIG. 33 is a timing chart showing each signal to be applied to the control system.

As shown in FIG. 33, to the first through third switches 11, 14 and 74 shown in FIG. 28 and the fourth switch 92 shown in FIG. 29, head switching signals HSWs which differ between the scanning period and the non-scanning period are respectively applied. Additionally, in the sample hold circuit 92 (see FIG. 29), a timing pulse TP in which a signal level is raised at a start of each scanning period is supplied.

Figure 34:
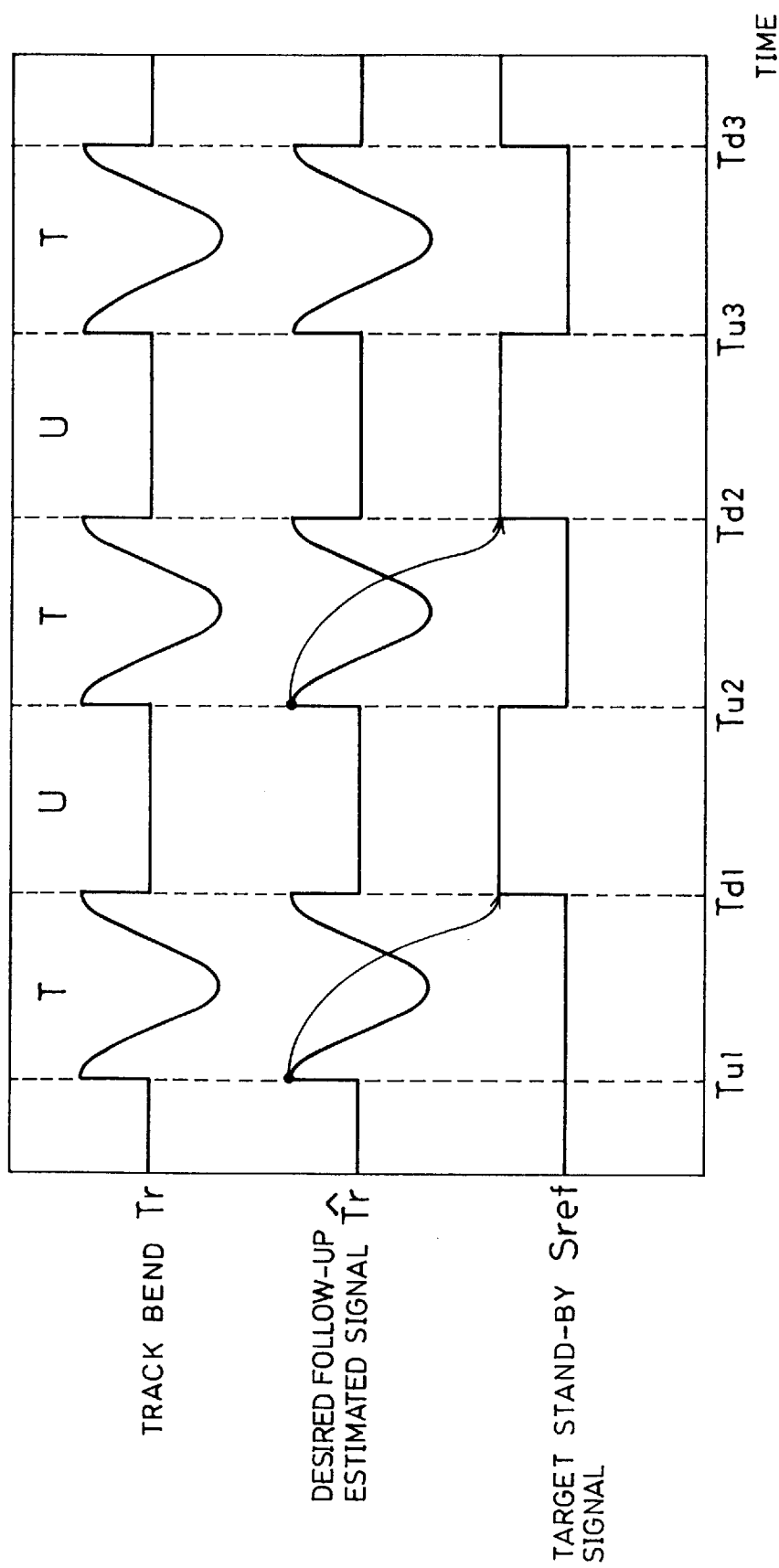
FIG. 34 is a timing chart showing one example of a stand-by target signal in the control system in accordance with the ninth embodiment of the present invention.
Figure 35:
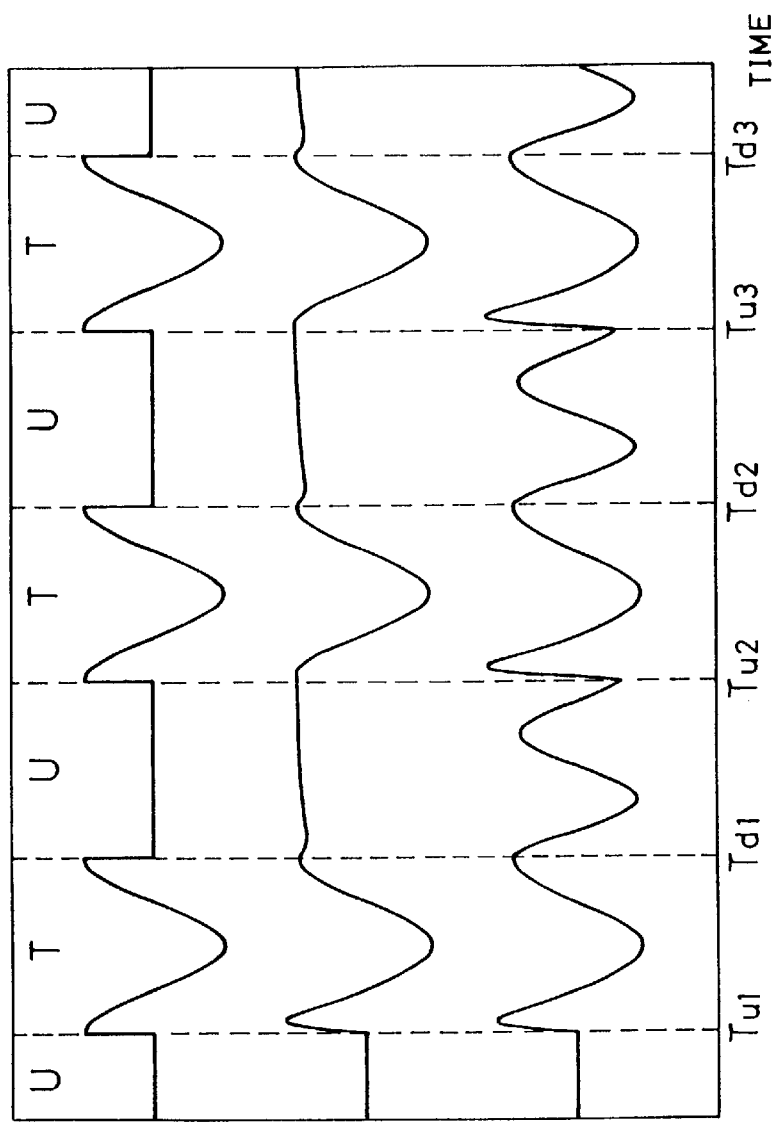
FIG. 35 is a timing chart showing one example of a displacement of a magnetic head in the control system.

In the scanning period of the magnetic tape by the magnetic head 26, i.e., the period, in which the head switching signal HSW is in the T level, the respective switches 11, 14, 74 and 92 select the T side. Thus, the control system in accordance with the present embodiment operates in the same manner as the first through fourth embodiments, and as shown in FIG. 34, with respect to the track bend Tr, the desired follow-up estimated signal $\widehat{\text{Tr}}$ outputted (a period from $T_{u1}$ through $T_{d1}$). As a result, as shown in FIG. 35, the magnetic head 26 in accordance with the present embodiment follows the track bend Tr. In this period, the portion different from the arrangement adopted in the first through fourth embodiments of the control system is separated by the switches 11, 14, 74 and 92. Thus, the operation of the control system is the same as that of the aforementioned embodiments, and thus the descriptions thereof shall be omitted here.

Thus, the sample hold circuit 91 in accordance with the present embodiment sample-holds a desired follow-up estimated signal $\widehat{\text{Tr}}$ at every rise of the timing pulse TP (at $T_{u1}$). Thus, in the period till the start of the-next scanning period (from $T_{u1}$ to $T_{u2}$), an output signal $\widehat{\text{Trt}}$ of the sample hold circuit 91 is the target follow-estimated signal $\widehat{\text{Tr}}$ of the magnetic head 26 at a start of the scanning of the magnetic tape ($T_{u1}$). However, as the fourth switch 92 selects the T side during the scanning period, as shown in FIG. 34, the stand-by target generating circuit 12a outputs a signal of 0 level as the target stand-by signal Sref (in a period from $T_{u1}$ till $T_{d1}$).

In the non-scanning period (from $T_{d1}$ through $T_{u2}$), respective switches 11, 14, 74 and 92 select the U side based on the head switching signal HSW. Therefore, the fourth switch 92 outputs the output signal $\widehat{\text{Trt}}$ to the comparator 13 as the stand-by target signal Sref. During this period, the sample hold circuit 91 holds the output signal $\widehat{\text{Tr}}$, the target stand-by signal Sref is the desired follow-up estimated signal $\widehat{\text{Trt}}$ at the start of the last scanning period. Additionally, in figures in and after FIGS. 34, sampling point is denoted as black dot on a waveform of the desired follow-up estimated signal $\widehat{\text{Tr}}$, and a correlation between each sample and the target stand-by signal Sref is shown by an arrow.

The target stand-by signal Sref is compared with the estimated position signal $\hat{x}$ outputted from the actuator simulation circuit 6 by the comparator 13. Then, a head stand-by signal Sa that is a difference signal between them is outputted from the second switch 14. On the other hand, in the corresponding period, the first switch 11 outputs a signal of 0 level. Therefore, based on an input of the head stand-by signal Sa, the drive signal Sd1 outputted from the drive circuit 4 is directly applied to the actuator 2 as a control input Sd. Additionally, the actuator simulation circuit 6 generates an estimated position signal $\hat{x}$, and the comparator 13 compares a newly generated estimated position signal $\hat{x}$ and the target stand-by signal Sref (desired follow-up estimated signal $\widehat{\text{Tr}}$ being held) again.

As a result, the control system in accordance with the present embodiment is a closed loop controlled so that the estimated position signal $\hat{x}$ coincides with the target stand-by signal Sref. Therefore, in the present embodiment, the magnetic head 26 in the non-scanning period (from $T_{d1}$ till $T_{u2}$) is directed to the target position to be followed at a start of the last scanning period (at $T_{u1}$) as shown in FIG. 35 based on the correlation given by the described equations (17) and (18).

In general, in the rotary head-type magnetic tape device, the track bend Tr is known to be substantially the same as the track bend Tr in a vicinity of the point. Therefore, the target position to be followed by the magnetic head 26 is substantially the same between the start of the last scanning period and the start of the next scanning period. Therefore, in the non-scanning period, the magnetic head 26 in accordance with the present embodiment can wait in a vicinity of the target position to be followed at a start of the next scanning operation by waiting in the target position to be followed at the start of the last scanning operation.

Therefore, upon starting the next scanning operation ($T_{u2}$), the sample hold circuit 91 newly sample-holds the desired follow-up estimated signal $\hat{Tr}$ to replace the output signal $\hat{Trt}$. During the scanning period, as the fourth switch 92 selects the T side, the target stand-by signal Sref becomes 0 level (period from $T_{u2}$ till $T_{d2}$ shown in FIG. 34).

Thereafter, the described operation is repeated, and the control system makes the magnetic head 26 follow the track bend Tr during the scanning operation, and in the non-scanning period, the magnetic head 26 can wait at the target follow-up position at the start of the last scanning period, i.e., in a vicinity of the target position to be followed at the start of the next scanning period.

In the non-scanning period, as the magnetic head 26 does not scan the track, the error detector 3 cannot detects a relative error. Therefore, as described in comparative example shown in FIG. 35 as the conventional arrangement, during the scanning period, the magnetic head 26 (displacement X) oscillates independently of the length of the non-scanning period, etc., at a unique frequency of the actuator 2. As a result, when start scanning the track, the position X of the magnetic head 26 may be separated from the target position to be followed undesirably. In this case, as a relative error is extremely large, a time required for the magnetic head 26 to reach the target position to be followed becomes long, and the follow-up precision is lowered.

Figure 36:
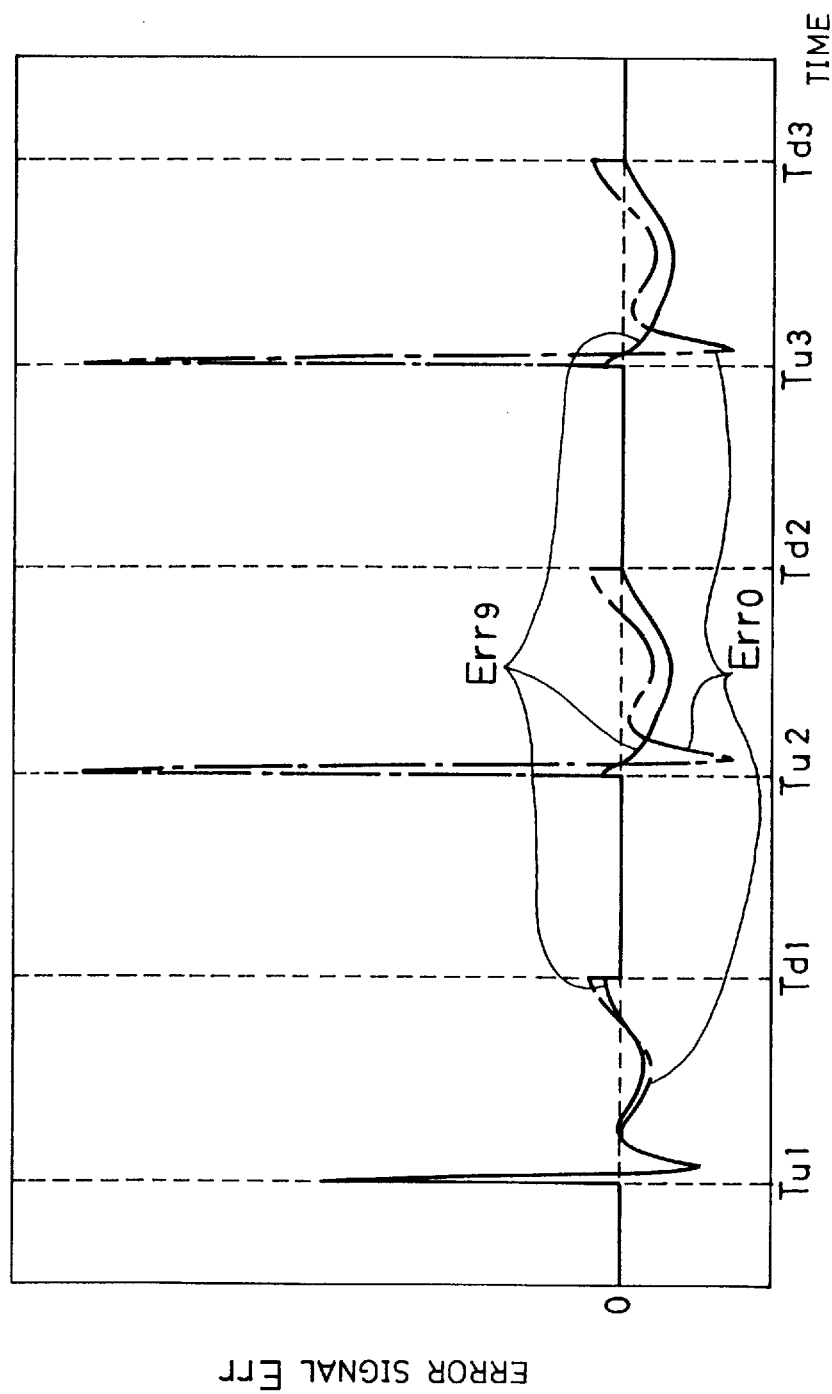
FIG. 36 is a timing chart showing an example of an error signal in the control system.
Figure 50:
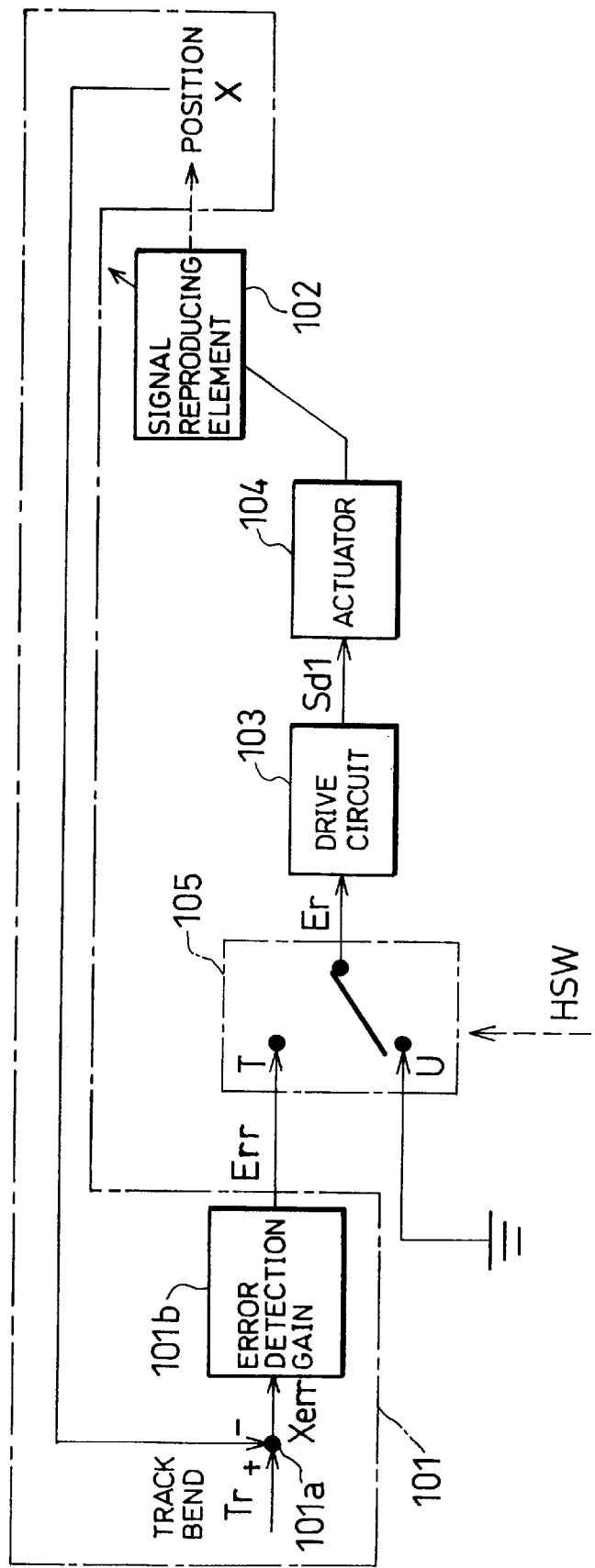
FIG. 50 which shows another prior art is a block diagram showing a structure of essential parts of the control system in the information recording and reproducing apparatus.
Figure 51:
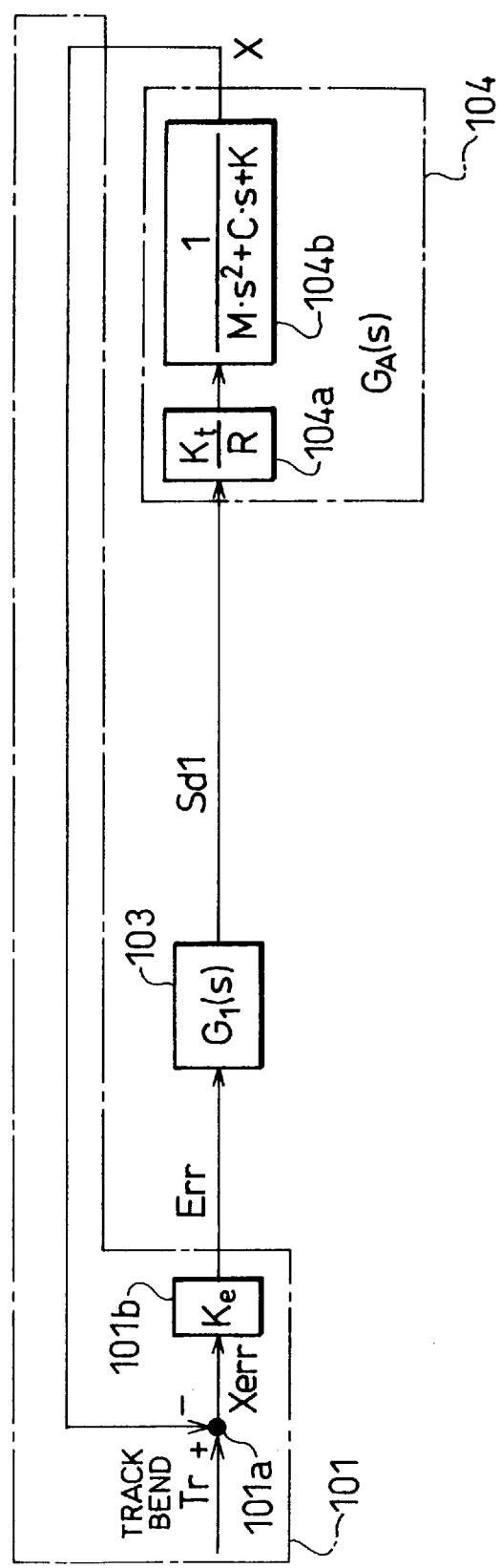
FIG. 51 is a control block diagram showing essential parts of the control system, in which each block in the equivalent circuit of FIG. 49 is shown in transfer function.
Figure 52:
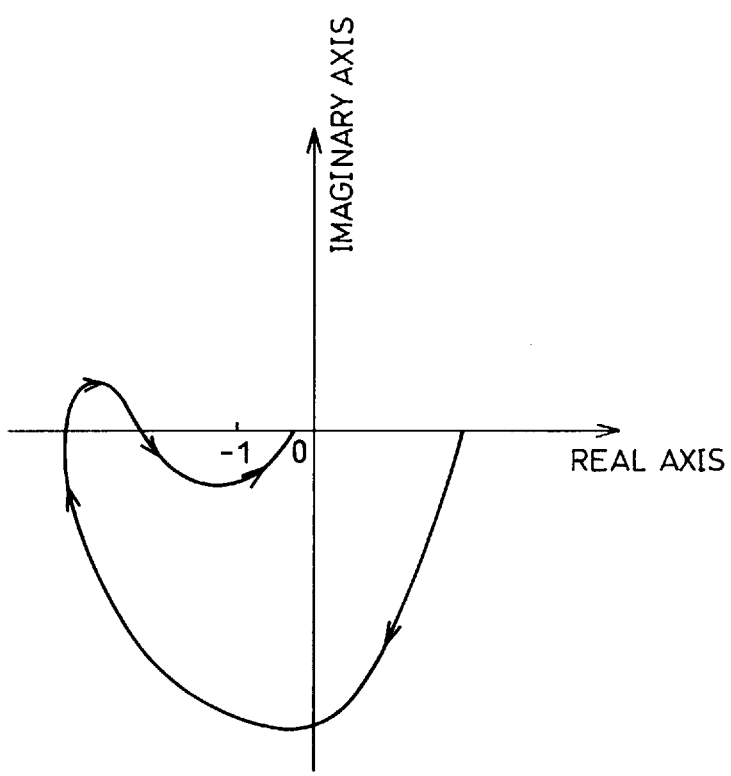
FIG. 52 is a vector trace showing open-loop transfer characteristics in the case there the control system adopts a punch-through servo system.
Figure 53:
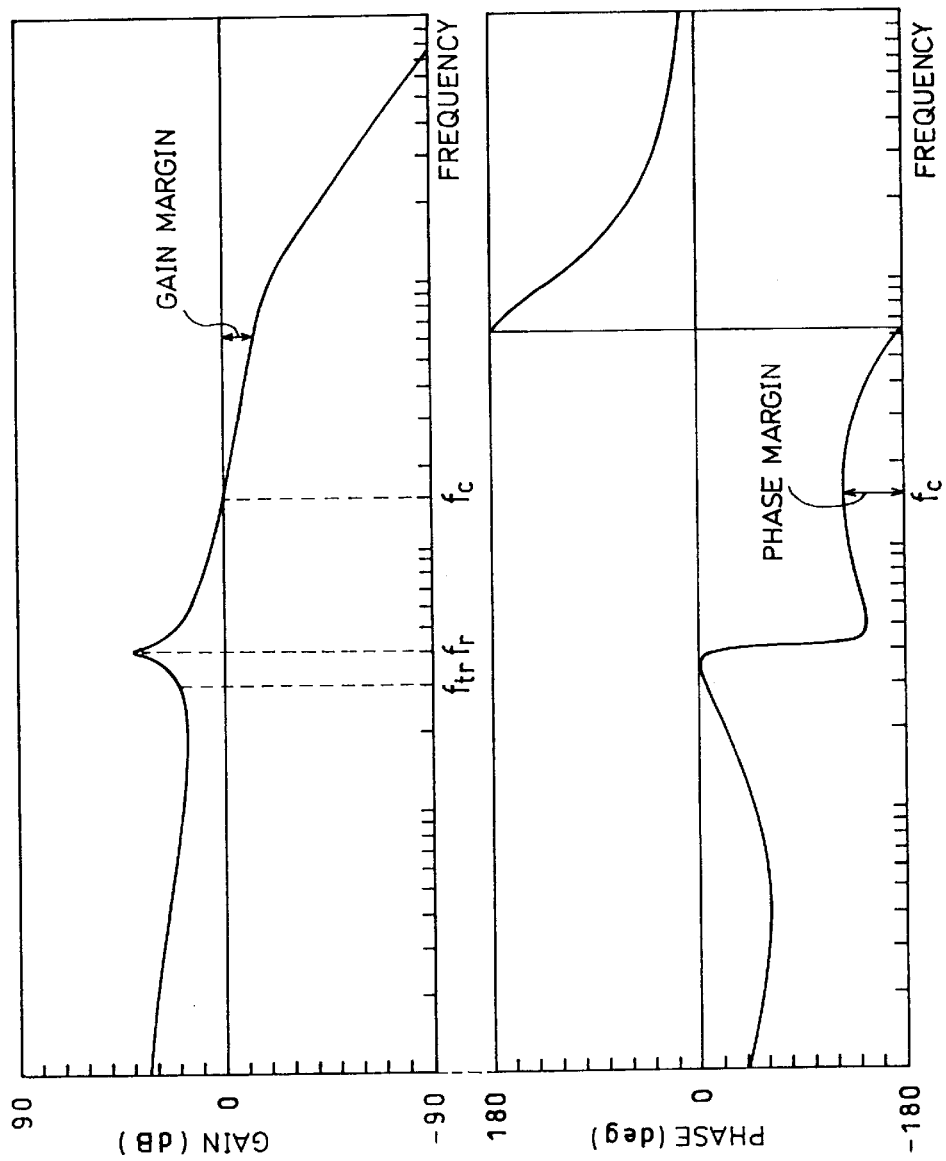
FIG. 53 is a Bode diagram showing open-loop transfer characteristics in the control system.
Figure 54:
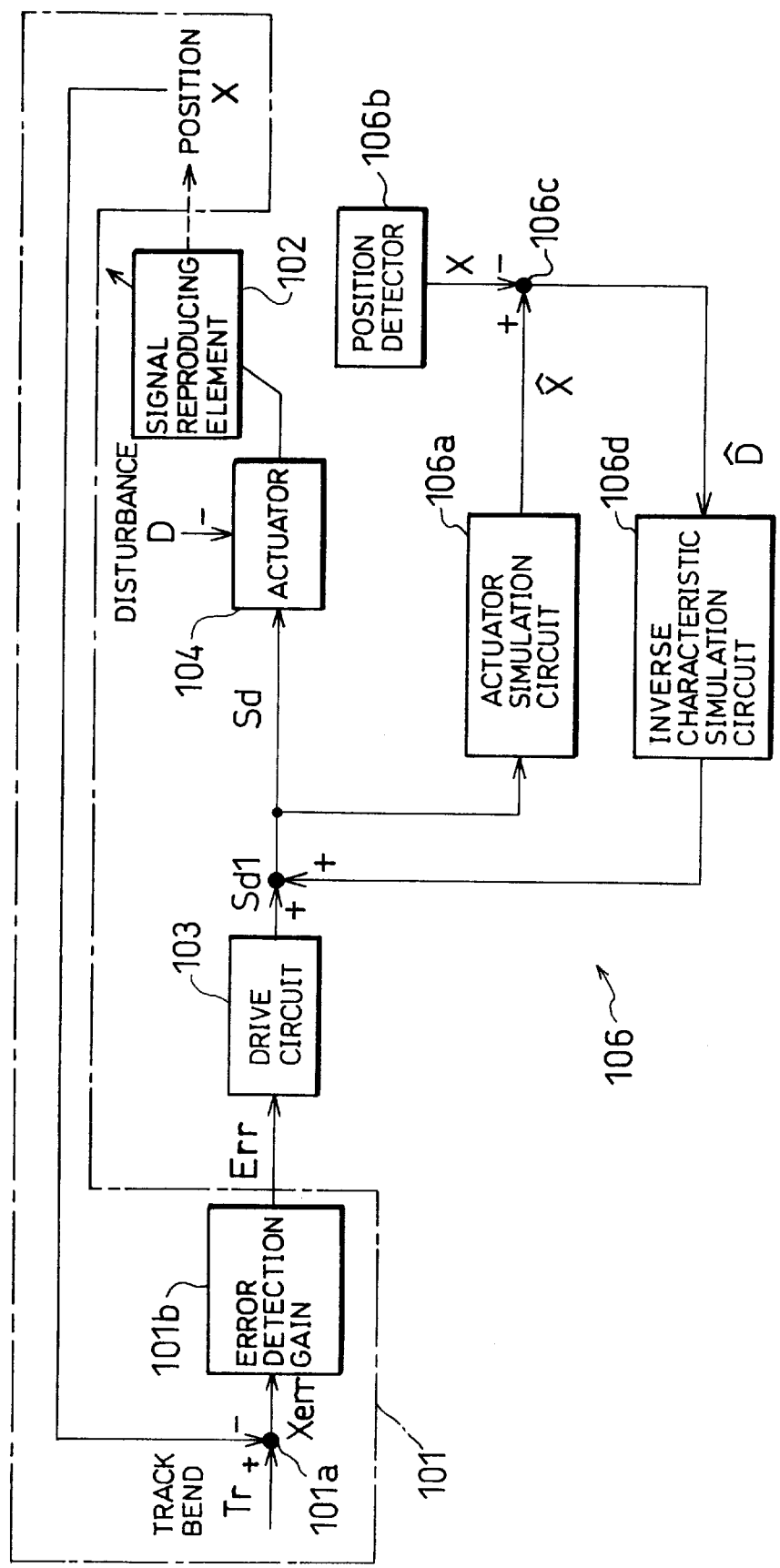
FIG. 54 which shows still another prior art is a block diagram showing a structure of essential parts of the control system in the information recording and reproducing apparatus

In contrast, the magnetic head 26 in accordance with the present embodiment, like the non-scanning period, even if the error detector 3 cannot detect the relative error, the magnetic head 26 can wait at an appropriate position without oscillation like the prior art. Therefore, as shown in FIG. 36, when start scanning the track, the error signal $Err_9$ in accordance with the present embodiment has an extremely small value compared with the conventional error signal $Err_0$. As a result, directly after the start of the scanning of the track, the magnetic head 26 can follow the track bend Tr, and a significantly improved follow-up precision can be achieved when starting the scanning of the track. FIG. 35 and FIG. 36 show conventional arrangements in which the control system shown in FIG. 50 is adopted.

[Modified Example 1]

Figure 37:
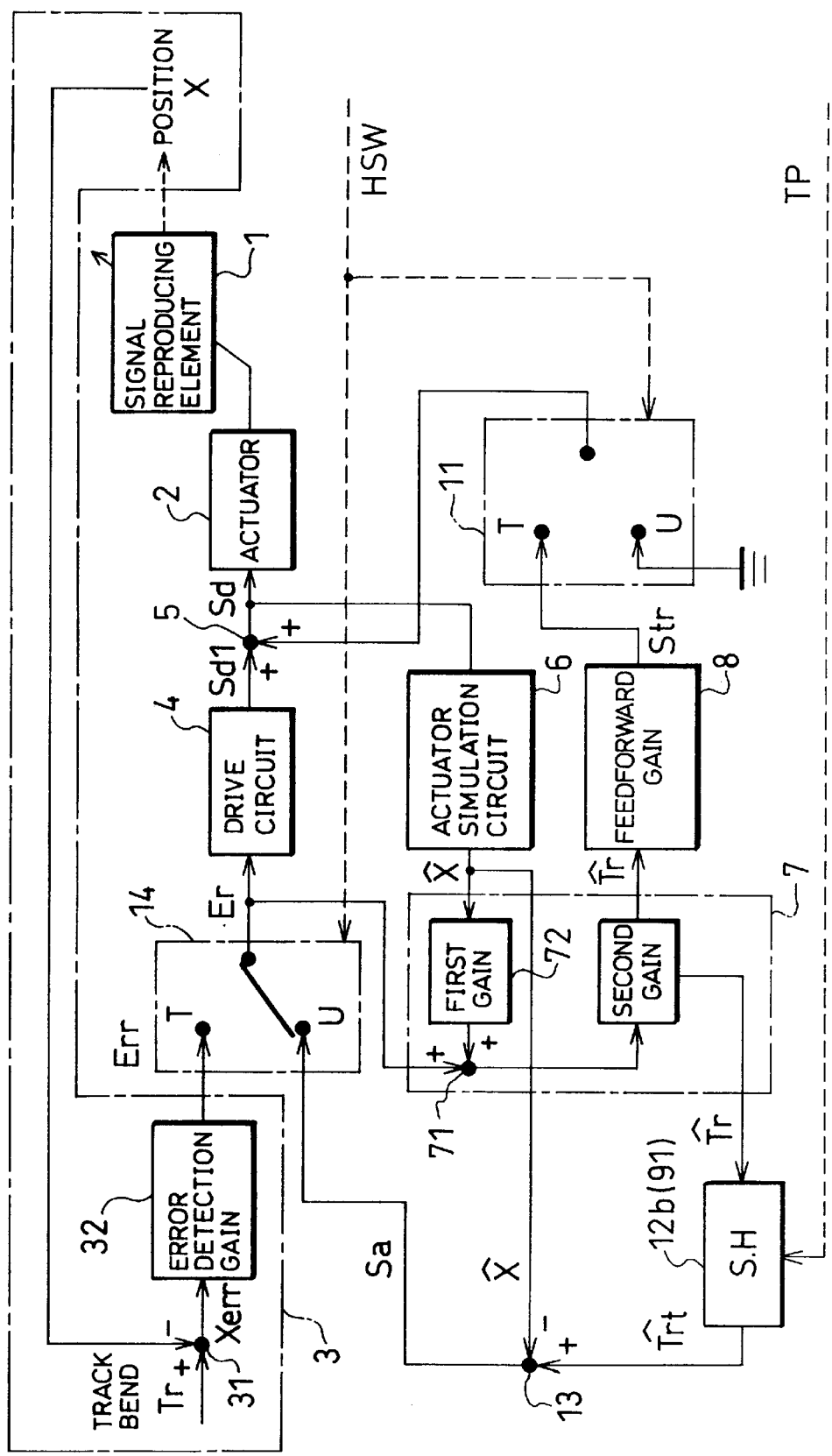
FIG. 37 which is a block diagram showing a structure of essential parts of a modified example of the control system.

In the case where the target stand-by generating circuit 12 shown in FIG. 28 is the target stand-by generating circuit 12a shown in FIG. 29, the third switch 74 shown in FIG. 28 and the fourth switch 92 shown in FIG. 29 may be omitted. Namely, in the non-scanning period, as the timing pulse TP cannot be raised, the output of the sample hold circuit 91 is not affected by the desired follow-up estimated signal $\hat{Tr}$ no matter how change it is. In the scanning period, the second switch 14 does not select the comparator 13 side. Therefore, based on the target stand-by signal Sref outputted from the target stand-by generating circuit 12, no matter how the head stand-by signal Sa outputted from the comparator 13 changes, the subsequent signal would not be affected. Therefore, in the present embodiment, as shown in FIG. 37, the target follow-up estimator 7 in which the third switch 74 is omitted may be adopted in replace of the target follow-up estimator 7a shown in FIG. 28, and the target stand-by generating circuit 12b in which the fourth switch 92 is omitted may be adopted in replace of the target stand-by generating circuit 12a shown in FIG. 29. In this modified example 1, the same effect as achieved from the control system shown in FIG. 28 and FIG. 29 can be achieved with a simple structure.

[Modified Example 2]

Figure 38:
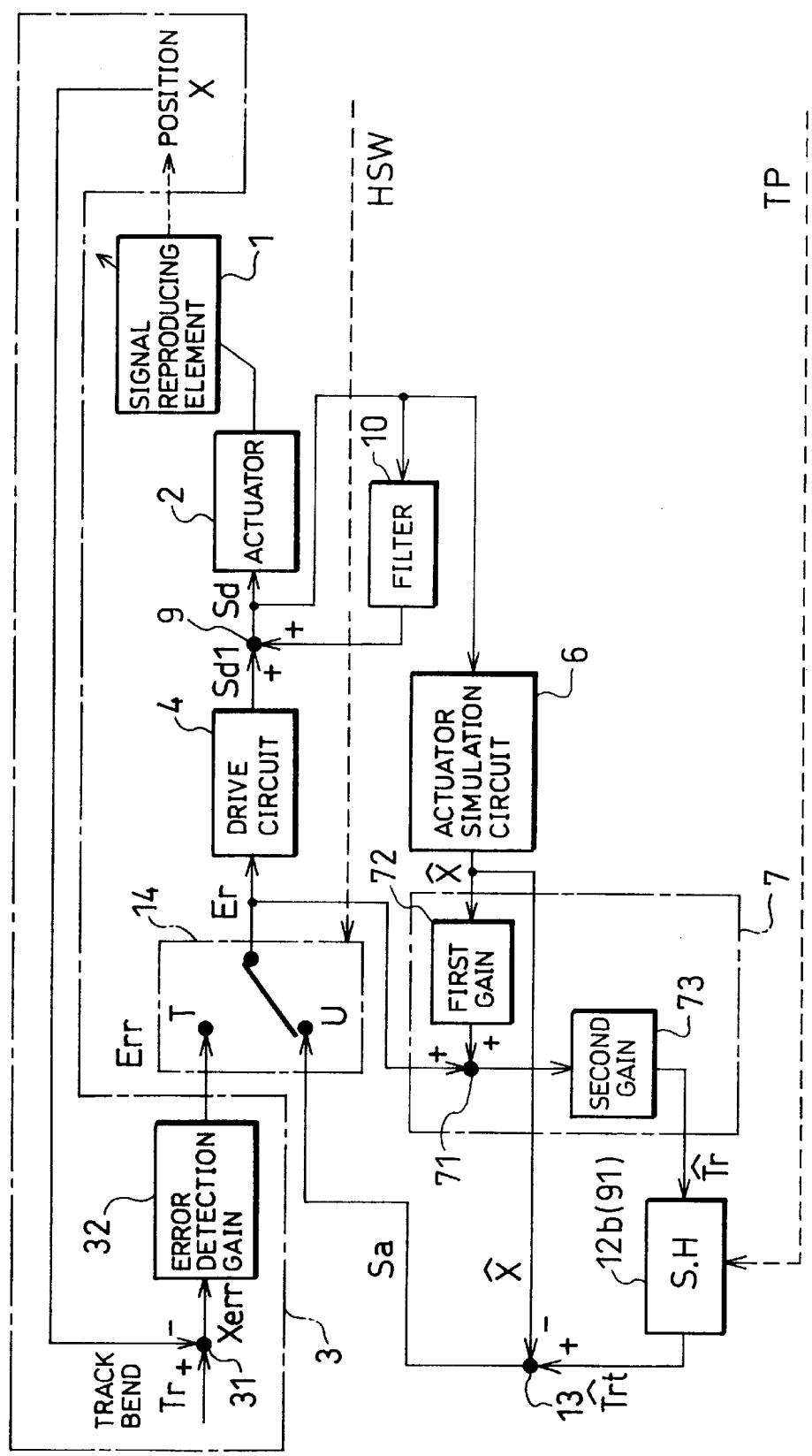
FIG. 38 is a block diagram showing a structure of essential parts of another modified example of the control system.

The described ninth embodiment, and the modified example 1, explanations will be given through the case of performing the stand-by process in which the first switch 11 is added to the arrangement adopted in the first through fourth embodiments. However, the present invention is not limited to such arrangement For example, as shown in FIG. 38, the arrangement which permits the stand-by process to be performed may be added to the respective arrangements adopted in the seventh and eighth embodiments. Here, explanations will be given through the case of, for example, adding the target stand-by generating circuit 12b (sample hold circuit 91) shown in FIG. 37 as a member for use in the stand-by process.

In the seventh and eighth embodiments, different from the first through fourth embodiments, the feedforward loop with the actuator simulation circuit 6 and the target follow-up estimator 7 is not formed. Therefore, in the modified example 2, the actuator simulation circuit 6 and the target follow-up estimator 7 are added to the arrangement of the seventh or eighth embodiment. As in FIG. 37, the target stand-by generating circuit 12b, the comparator 13 and the second switch 14 are added. Additionally, in the modified example 2, as the feedforward loop is not formed, the first switch 11 for selecting whether or not feedforward addition is to be carried out is not provided. The members adopted in the modified example 2 are all shown in the seventh, eighth or ninth embodiments (modified example 1), and thus the members having the same functions of the modified example 2 are designated by the same reference numerals as the aforementioned embodiments, and thus the descriptions thereof shall be omitted here.

In the modified example 2, as in the ninth embodiment, in the non-scanning period, the signal reproducing element 1 (magnetic head 26) can be set in the stand-by position in a vicinity of the target position to be followed when scanning the next track is started. Therefore, the signal reproducing element 1 can follow the track bend Tr immediately after starting the scanning of the track.

The arrangement of the control system is not limited to that of the modified example 2, and the same effect can be achieved from the control system of other arrangement by adding the actuator simulation circuit 6 and the target follow-up estimator 7 as well as the target stand-by generating circuit 12 and the comparator 13. However, as shown in FIGS. 28, 29 and 37, in the case of performing the stand-by process by adding the above described members to the control system of the first through fourth embodiments, the actuator simulation circuit 6 and the target follow-up estimator 7 can be used in common in the follow-up control in the scanning period and the stand-by process in the non-scanning period. Therefore, at a start of the scanning period as well as during the scanning period, a follow-up precision can be improved, and a control system of a simplified structure can be achieved.

[Tenth Embodiment]

The ninth embodiment is especially advantageous in that the magnetic head 26 (signal reproducing element 1) in the non-scanning period can wait at an appropriate stand-by position without oscillating the magnetic head 26 (signal reproducing element 1). However, as shown in FIG. 36, there is a portion where an absolute value of the error signal Err, satisfies the following condition: It is very small when starting the scanning operation, while becomes greater than the conventional error signal $Err_0$ during the scanning period. Therefore, an effect of improving the tracking precision obtained from the first through fourth embodiments (the effect of reducing the absolute value of the error signal Err) is partially disturbed.

The cause of such problem is that the target stand-by signal Sref in the non-scanning period is a DC signal. Namely, the magnetic head 26 (signal reproducing element 1) waits in substantially the same position in the non-scanning operation, and thus the track bend Tr equivalently has the DC offset in the following scanning period. As a result, the error signal Err in the scanning period has the DC offset, and the absolute value thereof is partially increased.

According to the control system in accordance with the present embodiment includes a target stand-by generating circuit 12c which outputs a target stand-by signal Sref which satisfy the below-described two conditions in the non scanning period is adopted as the target stand-by generating circuit 12 shown in FIG. 28 in order to perform an appropriate stand-by process in the scanning period, while maintaining the tracking precision as achieved from the first through fourth embodiments:

Condition 1: The target stand-by signal Sref is a signal waveform which does not contain a DC component.
Condition 2: The signal level at the end of the non-scanning period is equivalent to the level of the desired follow-up estimated signal $\hat{Tr}$ at the start of the last scanning.

In the following, explanations will be given through an example of cos-waveform as a typical example of the signal waveform which satisfies the described conditions 1 and 2. Other than the target stand-by generating circuit 12c, the arrangement of the present embodiment is the same as that of the ninth embodiment, and thus the entire structure of the control system will be explained in reference to FIG. 28 as in the ninth embodiment.

Next, the arrangement of the target stand-by generating circuit 12c which generates the signal waveform will be explained in detail in reference to FIG. 39. Namely, the target stand-by generating circuit 12c includes the reference waveform generating part 93 which generates a cos-waveform having a predetermined amplitude and a level-change part 94 for changing an amplitude of the cos-waveform based on a level of the desired follow-up estimated signal $\hat{Tr}$. Furthermore, the target stand-by generating circuit 12c includes a fourth switch 92 for selecting whether or not an output of the level change part 94 is to be outputted as a target stand-by signal Sref.

The reference waveform generating part 93 includes ROM (Read-Only Memory) 93a in which data string of the cos waveform which has been normalized to 1 is stored and a counter 93b for instructing the ROM 93a for the data to be read in sync with the clock signal CK of a predetermined frequency. The frequency of the cos waveform generated by the reference waveform generating part 93 is set to the length of the non-scanning period of the control system in accordance with the present embodiment. Furthermore, the counter 93b is reset at a rising timing of the timing pulse TP2 which shows the start of the non-scanning period. As a result, the reference waveform generating part 93 can output a data string which shows a cos-waveform of an amplitude of 1 in order and one period of which is equivalent to the time interval of the non-scanning period sequentially in sync with the clock signal CK.

Additionally, the level change part 94 includes an analog-digital converter (ADC) 94a, D-type flip flop (D-FF) 94b, a multiplier 94c and a digital-analog converter (DAC) 94d. The analog-digital converter 94a is provided for converting the desired follow-up estimated sign $\hat{Tr}$ applied by the target follow-up estimator 7a shown in FIG. 28 into the digital signal. The D-type flip flop (D-FF) 94b holds the digital signal at the start of the scanning period according to the timing pulse TP. The multiplier 94c multiplies the data string of the cos- waveform to be sequentially applied from the reference signal generating part 93 by the digital signal thus held. The digital analog converter (DAC) 94d for converting the digital signal to be outputted from the amplifier 94c into the analog signal. The described arrangement permits an amplitude of the cos waveform from the reference waveform generating part 93 to be converted into a level of the desired follow-up estimated signal $\hat{Tr}$ at a start of the last scanning period.

The output of the level change part 94 is outputted as the target stand-by signal Sref via the fourth switch 92. Additionally, as the fourth switch 92 in accordance with the present embodiment has the same function as the fourth switch 92 shown in FIG. 29, and thus the descriptions thereof shall be omitted here.

Figure 40:
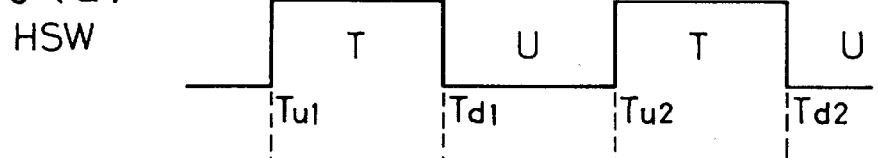
FIG. 40(a) through FIG. 40(d) are timing charts showing each signal to be supplied to a target stand-by generating circuit.
Figure 40:
Figure 40:
Figure 40:
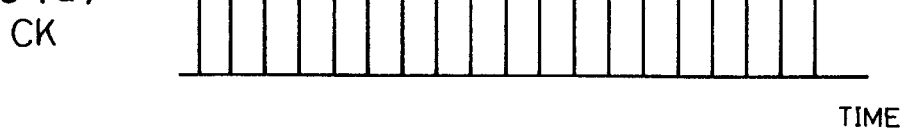

Before explaining the operation of the entire control system in accordance with the present embodiment, the operation of the target stand-by generating circuit 12c having the described arrangement will be explained. As shown in FIG. 40, to the fourth switch 92 and D-FF94b, the same head switch signal HSW and the timing pulse TP are respectively applied as in the ninth embodiment. To the counter 93b, the timing pulse TP2 at which the pulse rises at a start of each non-scanning period and a clock signal CK of a predetermined frequency are applied. Furthermore, the ADC 94a converts the follow-up estimated signal $\hat{Tr}$ applied from the follow-up target estimator 7a shown in FIG. 28 into a digital signal, and is sequentially applied to the D-FF 94b.

At a start of the scanning period ($T_{u1}$ in the figure), the timing pulse TP is raised. Based on the above, the D-FF94b stores the digital signal applied from the ADC 94a at this time and holds till the timing pulse TP is raised (till $T_{u2}$). Additionally, in the scanning period, as in the ninth embodiment, the fourth switch 92 selects the T side. As a result, the target stand-by generating circuit 12c outputs a signal of 0 level as a target stand-by signal Sref irrespectively of the start in the reference waveform generating part 93 and the level change part 94 (in a period from $T_{u1}$ to $T_{d1}$ shown in FIG. 41).

Figure 41:
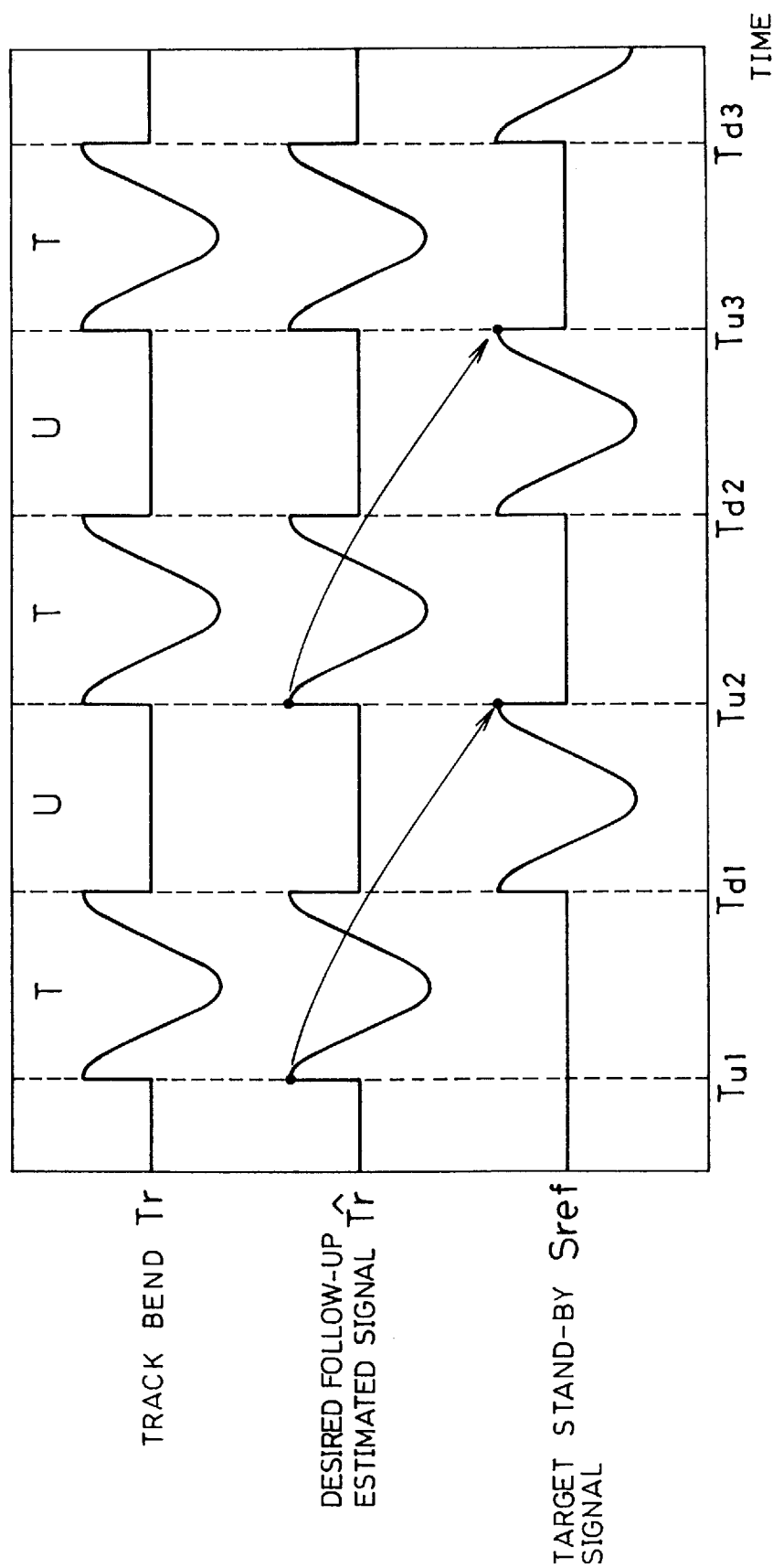
FIG. 41 is a timing chart showing an example of the target stand-by signal in the control system.

As shown in FIG. 40, in the non-scanning period (at $T_{d1}$), a level of the head switch signal HSW changes, and the fourth switch 92 selects the U side. As a result, the stand-by target signal Sref is an output of the level change part 94. At this point, the timing pulse TP2 is raised. The counter 93b clears the count value to 0 based on the above, and subsequently starts counting in sync with the clock signal CK to be periodically inputted. The ROM 93a sequentially reads the data string which shows a cos-waveform in accordance with a count value to be sequentially applied from the counter 93b. The multiplier 93b multiplies each digital signal which constitutes the data string by a value held by the D-FF94b. Furthermore, the DAC 94d converts the digital signal sequentially supplied from the multiplier 94c into an analog signal, and is outputted through the fourth switch 92. As a result, as shown in FIG. 41, in the non-scanning period (period from $T_{d1}$ till $T_{u2}$), the target stand-by generating circuit 12c outputs a cos-waveform as the target stand-by signal Sref. Here, as the frequency, the phase and the amplitude of the cos-waveform are set as described above, the conditions 1 and 2 described earlier are satisfied. Namely, at a start ($T_{d1}$) and the end ($T_{u2}$) of the non-scanning period, the level of the target stand-by signal Sref is equivalent to the level of the desired follow-up estimated signal $\hat{Tr}$ at a start of the last scanning period ($T_{u1}$). Also, in the non-scanning period, the target stand-by signal Sref does not have a DC component.

Thereafter, when a scanning period is started (at $T_{u2}$), as the fourth switch 92 selects the T side, the target stand-by signal Sref becomes 0 level Additionally, at his point, as the timing pulse TP is raised, the D-FF94b newly holds the level of the desired follow-up estimated signal $\hat{Tr}$.

Figure 42:
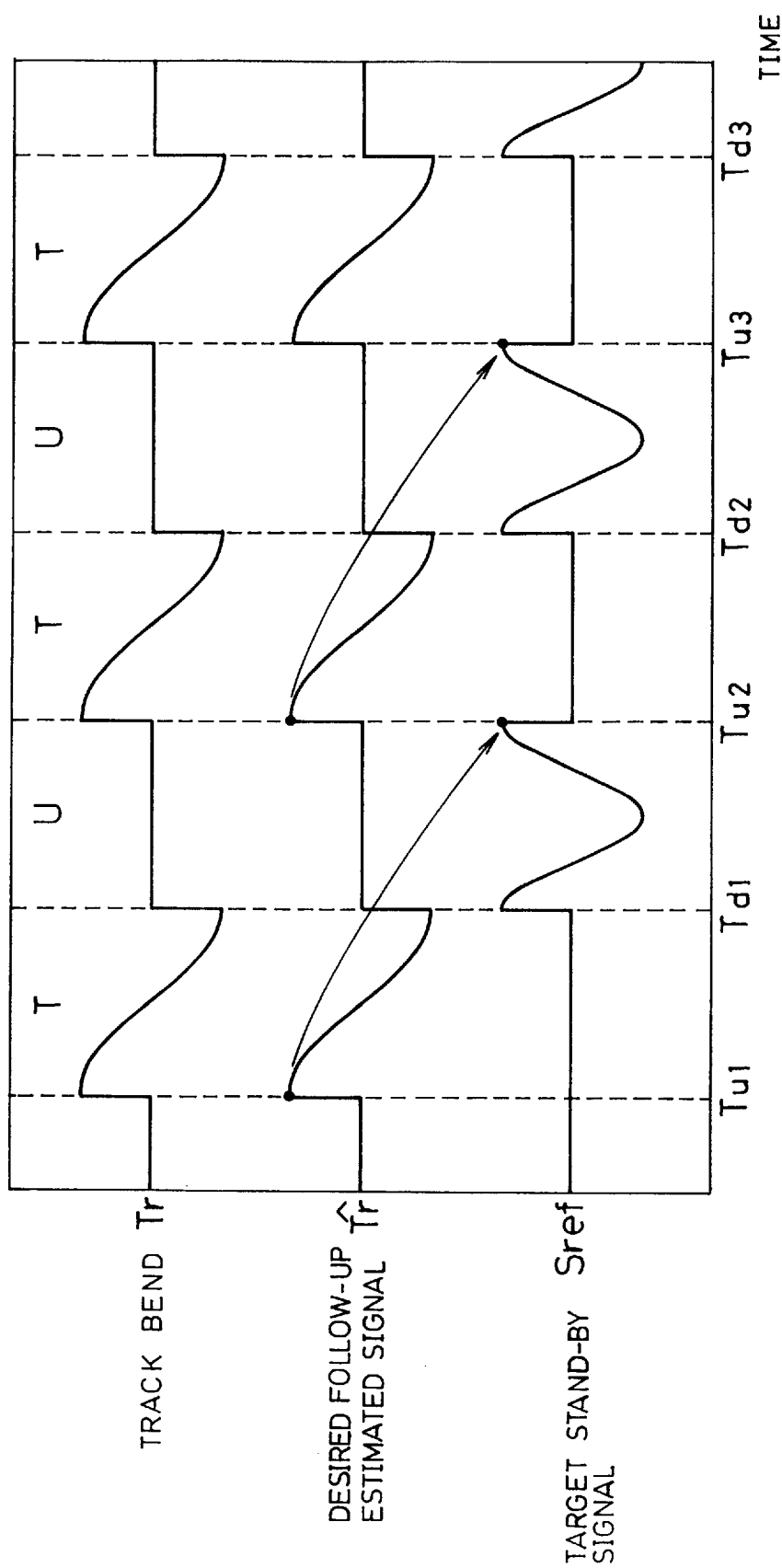
FIG. 42 is a timing chart showing another example of the target stand-by signal in the control system.

Thereafter, the target stand-by generating circuit 12c repeats the described operation, and during the scanning period, it outputs the target stand-by signal Sref, and upon completing the non-scanning period, it outputs a cos-waveform in the same level as the target follow-up estimated signal $\hat{Tr}$ at a start of the last scanning period. As shown in FIG. 42, even when the track bend Tr becomes different from that as shown in FIG. 41, as in FIG. 41, the target stand-by generating circuit 12c prepares the target stand-by signal Sref which satisfy the described two conditions. In both FIGS. 41 and 42, the respective correspondences are shown by arrows.

Figure 39:
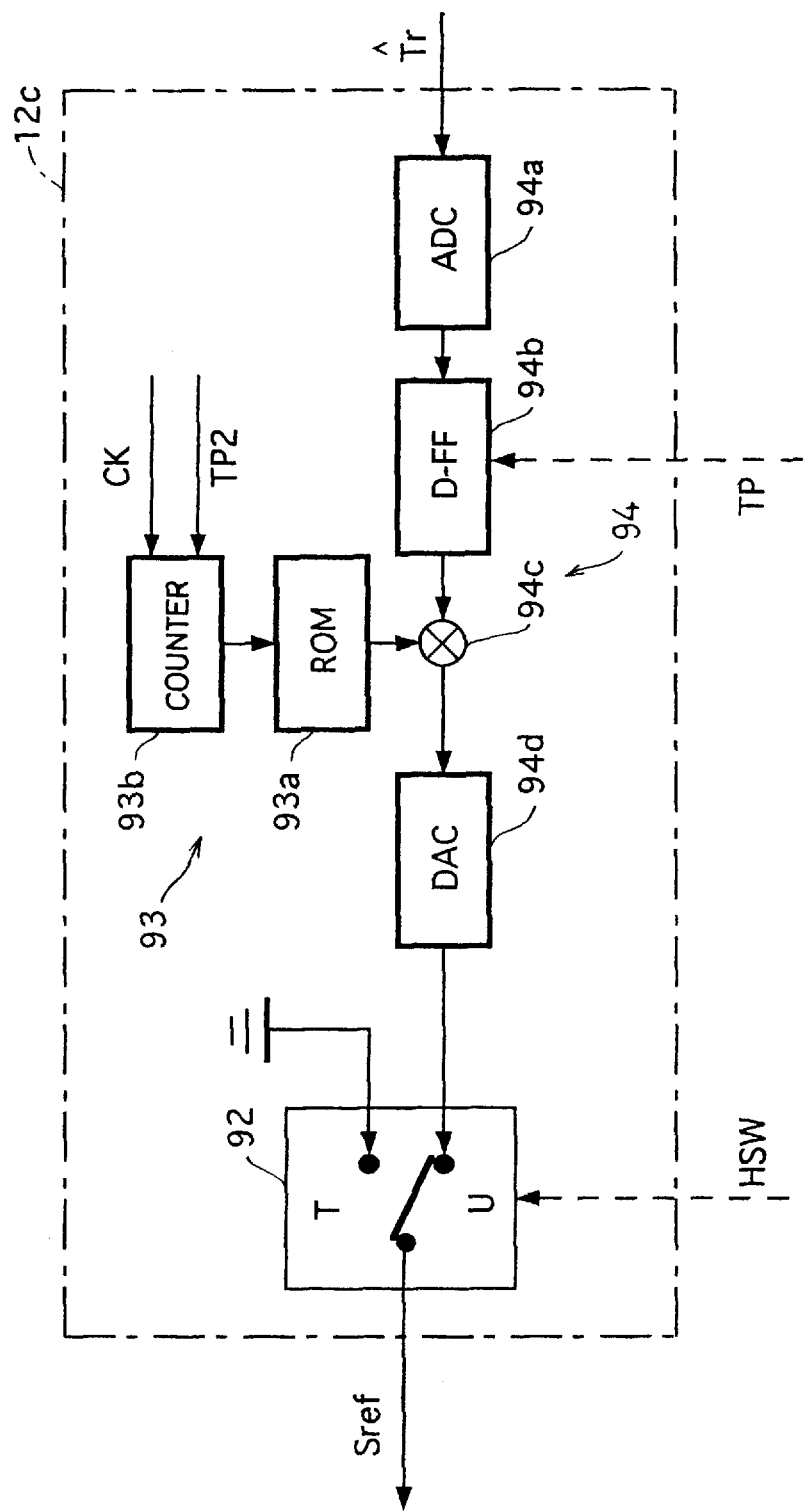
FIG. 39 is a block diagram showing a structure of essential parts of a stand-by target generation circuit of the control system in the information recording and reproducing apparatus in accordance with the tenth embodiment of the present invention.

Additionally, the arrangement of the target stand-by generating circuit 12c is not limited to those shown in FIG. 39. For example, such arrangement where the reference waveform generating part 93 and the level change part 94 are constituted by analog circuits may be adopted. Additionally, the waveform generated by the target stand-by generating circuit 12c is not limited to cos-waveform. As long as the target stand-by generating circuit 12c generates a waveform which satisfies the described two conditions, the same effect as achieved by the present embodiment can be achieved.

Next, an operation of an entire control system (see FIG. 28) provided with the target stand-by generating circuit 12 will be explained in reference to FIG. 43. Namely, in the scanning period (for example, a period from $T_{u1}$ till $T_{d1}$), the first through third switches 11, 14 and 74 select the T side as in the ninth embodiment. Therefore, in the scanning period, the control system in accordance with the present embodiment makes the magnetic head 26 (signal reproducing element 1) shown in FIG. 39 follow the track bend Tr as in the first through fourth embodiments.

In the non-scanning period ($T_{d1}$), the respective switches 11, 14 and 74 select the U side. For example, as shown in FIG. 41, at the end of the non-scanning period ($T_{u1}$), the target stand-by generating circuit 12c holds the same level as the desired follow-up estimated signal $\hat{Tr}$ at a start of the previous scanning period, and generates the target stand-by signal Sref which does not contain the DC component. As a result, during the non-scanning period (a period from $T_{d1}$ till $T_{u2}$), the magnetic head 26 controls such that the estimated position signal $\hat{x}$ coincides with the target stand-by signal Sref as in the ninth embodiment. As a result, during the period, the displacement X of the magnetic head 26 is as shown in FIG. 43. However, in the present embodiment, the target stand-by signal Sref is set as described above. As a result, different from the conventional technique, at the end of the non-scanning period ($T_{u2}$), the magnetic head 26 is directed to the target follow-up position at the start of the last scanning period ($T_{u1}$), i.e., in a vicinity of the target follow-up position at a start of the next scanning period ($T_{u2}$).

Thereafter, the same operation is repeated, and the control system makes the magnetic head 26 follow the track bend Tr during the scanning period, and upon completion of the non-scanning period, the magnetic head 26 can be waited at an appropriate position.

Figure 43:
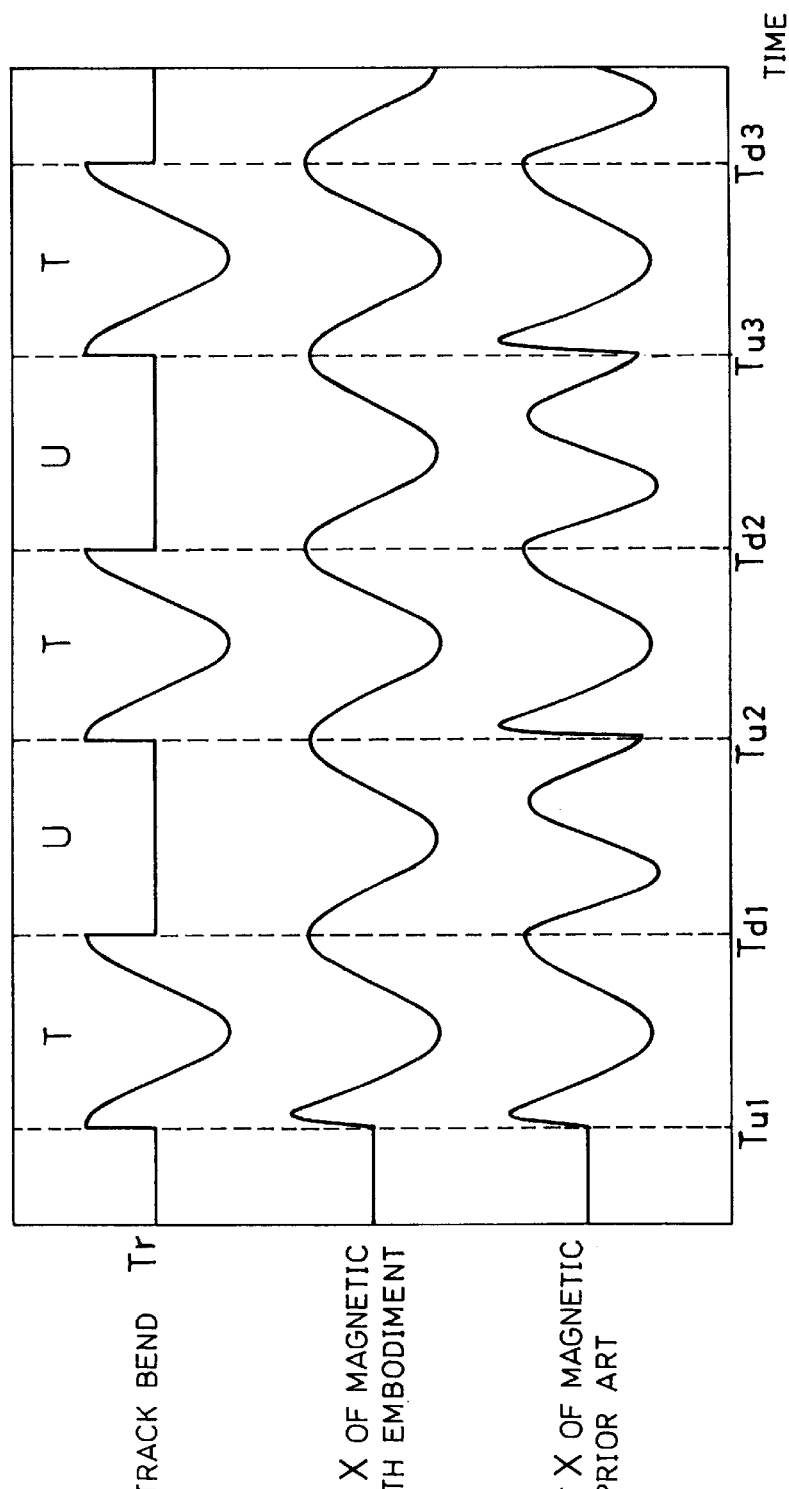
FIG. 43 is a timing chart showing a modified example of a displacement of the magnetic head in the control system.
Figure 44:
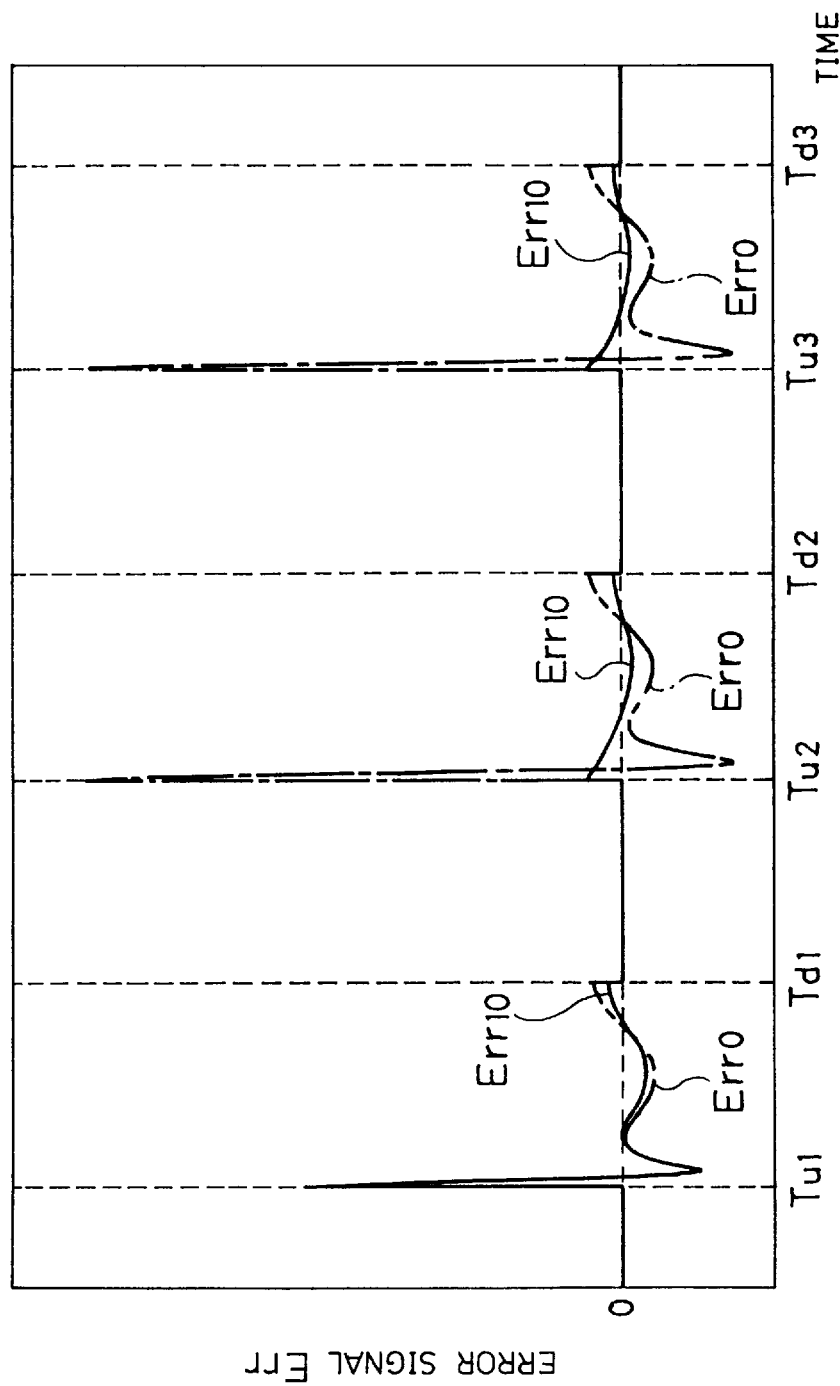
FIG. 44 is a timing chart showing an example of an error signal in the control system.

Therefore, as shown in FIG. 44, when a scanning of the track is started, the error signal $Err_{10}$ of the control system in accordance with the present embodiment has a very small absolute value as in the ninth embodiment compared with the conventional error signal $Err_0$. As a result, the magnetic head 26 can follow the track bend Tr immediately after the scanning of the track has started. As a result, compared with the conventional arrangement, a significantly improved follow-up precision at a start of the scanning period can be achieved. In the prior art shown in FIGS. 43, 44 and 45, as in FIG. 35, the control system having the arrangement shown in FIG. 50.

Furthermore, in the present embodiment, as shown in FIG. 43, different from the ninth embodiment shown in FIG. 35, during the non-scanning period, the displacement X of the magnetic head 26 does not have an offset in terms of DC. Therefore, in the following scanning period, the offset in terms of DC added equivalently to the track bend TR in the ninth embodiment can be prevented. As a result, as shown in FIG. 44, the error signal $Err_{10}$ in accordance with the present embodiment has a very small absolute value compared with the conventional error signal $Err_0$ in accordance with the ninth embodiment over the entire scanning period. As a result, during the scanning period, the control system offers a significant improvement in the follow-up precision of the magnetic head 26.

Figure 45:
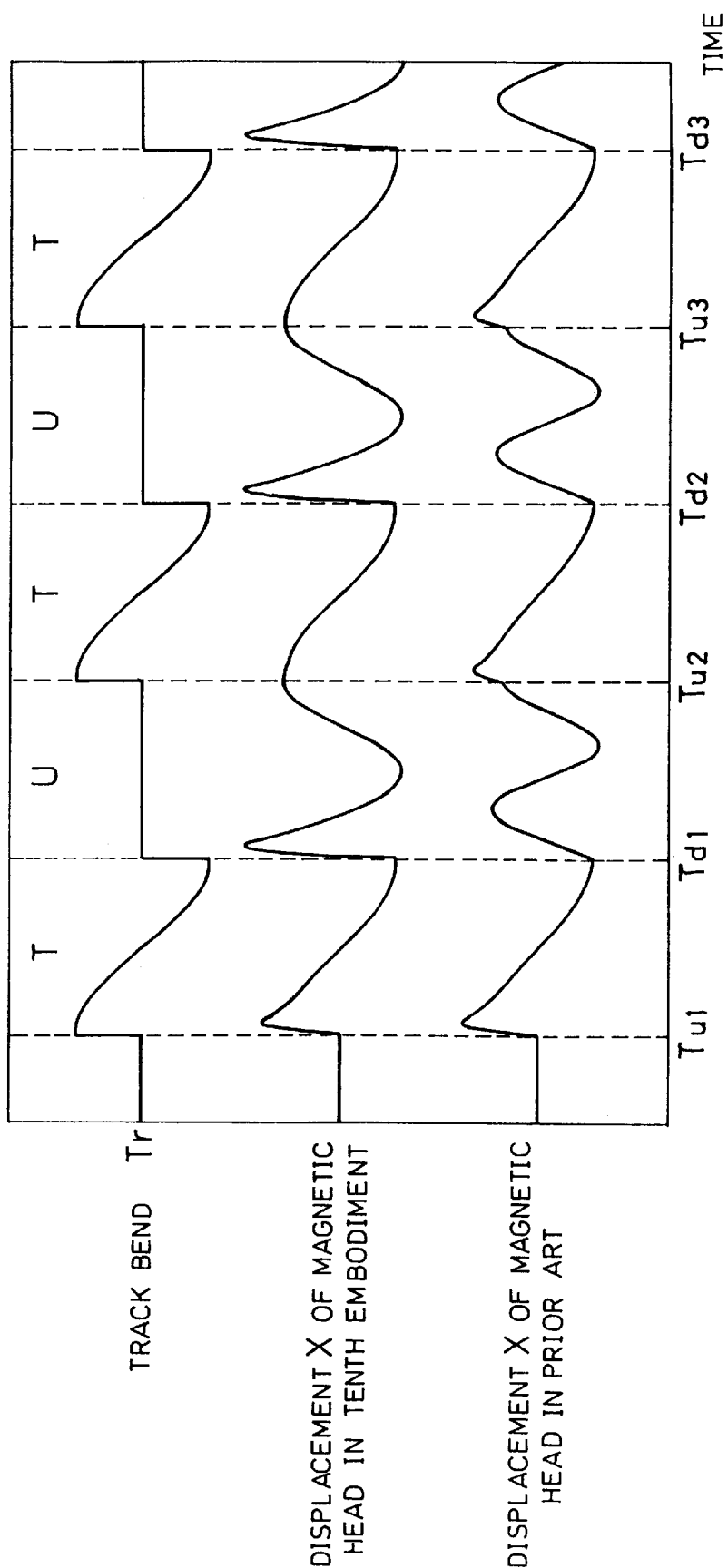
FIG. 45 is a timing chart showing another example of the displacement of the magnetic head in the control system.

Similarly, as shown in FIG. 42, in the case where the magnetic head 26 follows the track bend Tr different from that shown in FIG. 43, as shown in FIG. 45, the control system is able to guide the magnetic head 26 to an appropriate position at the completion of the non-scanning period. Therefore, like FIG. 43, the magnetic head 26 can follow the track bend Tr desirably from the start of the scanning of the track.

As a result, the control system in accordance with the present embodiment can guide the magnetic head 26 to an appropriate position during the non-scanning period while obtaining the same tracking precision as the first through fourth embodiment during the scanning period. In the above explanation, explanations have been given through the case of adopting the target stand-by generating circuit 12c having the arrangement of FIG. 39 as the target stand-by generating circuit 12 having the arrangement of FIG. 28. However, the present invention is not intended to be limited to this. For example, like the modified example 1 of the ninth embodiment (see FIG. 37), the third switch 74 or the fourth switch 92 may be omitted. Like the modified example 2 of the ninth embodiment (see FIG. 38), in the seventh and eighth embodiments, even if the member which permits the same stand-by process as the present embodiment to be performed is added, the same effects as achieved by the present embodiment can be obtained.

As described, the control system in accordance with the ninth and the tenth embodiments includes the signal reproducing element 1, the actuator 2, the error detector 3 and the drive circuit 4 as in the first through eighth embodiments. Additionally, in the both embodiments, based on a control input Sd to be applied to the actuator 2, the actuator simulation circuit 6 which estimates the position X of the signal reproducing element 1 and the target follow-up estimator 7(7a) which estimates the track bend Tr, i.e., the target to be followed by the signal reproducing element 1 are provided.

Furthermore, the control system in accordance with the ninth and the tenth embodiments includes the target stand-by generating circuit 12 which instructs the target to be followed by the signal reproducing element 1 in the non-scanning period based on the output from the target follow-up estimator 7 in the scanning period, and the comparator 13 for comparing the estimated position signal $\hat{x}$ generated by the actuator simulation circuit 6 with the target stand-by signal Sref outputted from the target stand-by generating circuit 12 in the non-scanning period and outputting a result of comparison as a difference signal to the drive circuit 4.

During the scanning period, as in the first through eighth embodiments, the drive circuit 4 adjusts a control input Sd to be applied to the actuator 2. As a result, the signal reproducing element 1 follows the track bend Tr.

On the other hand, during the non-scanning period, the actuator simulation circuit 6 generates the estimated position signal $\hat{x}$ as in the scanning period. For example, the target stand-by generating circuit 12 estimates the target to be followed at a start of the next scanning period and generate the target stand-by signal Sref indicative of the target to be followed in the non-scanning period. Furthermore, the comparator 13 inputs a difference signal between the target stand-by signal Sref and the estimated position signal $\hat{x}$ to the drive circuit 4. As a result, the signal reproducing element 1 controls such that the estimated position signal $\hat{x}$ coincides with the target stand-by signal Sref.

As a result, during the non-scanning period, the signal reproducing element 1 can follow the stand-by target shown by the target stand-by signal Sref. As a result, the signal reproducing element 1 can follow the desired value (track bend) immediately after the start of the next scanning period, thereby improving the follow-up precision at the start of the scanning period.

Additionally, the control system is not limited to the rotary head type magnetic tape device, and any control system in which a detection period, in which a desired value is generated and the error detector 3 can detect a relative error, and a non-detection period in which a desired value is not generated, and the error detector 3 cannot detect the relative error are alternately formed would permit the same effects as achieved in the described embodiments can be achieved.

A suitable example of the device including the described control system may be the rotary head-type magnetic tape device. The magnetic tape device includes the rotary drum having a magnetic tape wound around at a predetermined angle, a magnetic head mounted on the outer surface of the rotary drum, and an actuator for guiding the magnetic head to a desirable track formed on the magnetic tape. The control system controls the actuator.

In the described arrangement, when reproducing a signal recorded on the magnetic tape, the magnetic tape is wound around the outer surface of the drum being rotated at a predetermined angle. The magnetic head scans in a moving direction of the magnetic tape in a slanted angle. Additionally, in a period after scanning the track till the start of the next track, the magnetic head does not scan the track. Furthermore, at least upon completing the non-scanning period, the magnetic tape device set the magnetic head to the target position to be followed at a start of the last scanning period. Therefore, the magnetic head can be set in a vicinity of the target position to be followed at a start of the next scanning operation.

As a result, when the scanning of the track is started, the magnetic head can immediately follow the track bend. Therefore, compared with the conventional arrangement, the follow-up precision can be significantly improved at the start of the scanning of the track.

On the other hand, in the described target stand-by generating circuit 12, various methods of generating the target stand-by signal Sref can be adopted. For example, like the generally adopted rotary head-type magnetic tape device, when respective target to be followed have relative correlations at the start of each scanning period, as in both of the above embodiments, the target stand-by signal Sref is generated in such a manner that the target stand-by signal Sref at the end of each non-Scanning period coincides with a value of the desired follow-up estimated signal $\hat{Tr}$ at a start of the last scanning period.

As a result, the control system is able to guide the signal reproducing element 1 to a vicinity of the target to be followed at a start of each scanning period. As a result, from the start of each scanning period, the signal reproducing element 1 is able to follow the track bend Tr immediately, and the following precision at a start of each scanning period can be improved.

In order to generate the target stand-by signal Sref in the described method, as shown in the ninth embodiment, it is preferable that the target stand-by generating circuit 12 includes a sample hold circuit 91 for sample-holding the target estimated signal $\hat{Tr}$ at a start of each scanning period. According to the described arrangement, the target stand-by generating circuit 12 (12a, 12b) in accordance with the ninth embodiment is able to generate the target signal Sref having a predetermined value upon completion of the non-scanning period. As a result, the control system of an improved following precision at a start of scanning period can be achieved with a simple structure.

In the case of adopting the target stand-by generating circuit 12 (12a, 12b) having the described arrangement, in the non-scanning period, as the target stand-by signal Sref has the DC offset, the signal reproducing element 1 waits at a position having an offset almost in DC. Therefore, in the subsequent scanning period, an equivalent offset appears in the track bend Tr. As a result, in a part of the scanning period, a relative error becomes larger, which may lower the following precision.

In consideration of the above, it is preferable that the target stand-by generating circuit 12c be controlled such that a value of the signal at a completion of the non-scanning period is the same as the value of the desired follow-up estimated signal $\hat{Tr}$ at a start of the last scanning period, and that in the non-scanning period, the target stand-by signal Sref which does not contain the DC component is generated as in the tenth embodiment.

In the described arrangement, the control system guides the signal reproducing element 1 such that the estimated position signal $\hat{x}$ coincides with the target stand-by signal Sref as in the ninth embodiment. However, as the target stand-by signal Sref does not contain the DC component, the control system is able to guide the signal reproducing element 1 with accuracy without having the DC offset. As a result, compared with the ninth embodiment, a significantly improved following precision in the scanning period can be achieved. On the other hand, upon completing the non-scanning period, as in the ninth embodiment, the value of the target stand-by signal Sref is set to the same value as the target estimated signal $\hat{Tr}$ at a start of the last scanning period. As this offers an improved precision at a start of the scanning period, an improved following precision at a start of the scanning period can be achieved over the conventional arrangement. As a result, in the control system in which the scanning period and the non-scanning period are alternately formed, an improved following precision can be achieved over the entire scanning period.

[Eleventh Embodiment]

The described first through tenth embodiments are respectively arranged such that based on the error signal Err indicative of an error with regard to a relative position between the signal reproducing element 1 and the track bend Tr, the signal reproducing element 1 follows the track bend TR over a high frequency band with high precision. In contrast, in the present embodiment, the signal reproducing element 1 is followed up the target access at high speed.

Figure 46:
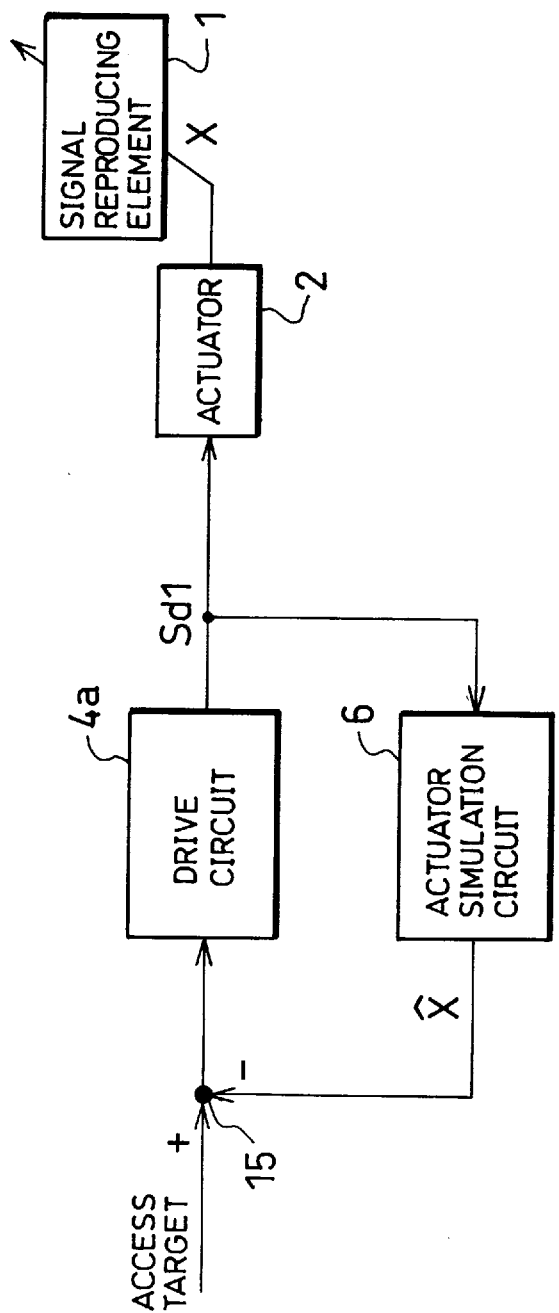
FIG. 46 is a block diagram showing essential parts of the control system in the information recording and reproducing apparatus in accordance with the eleventh embodiment of the present invention.
Figure 47:
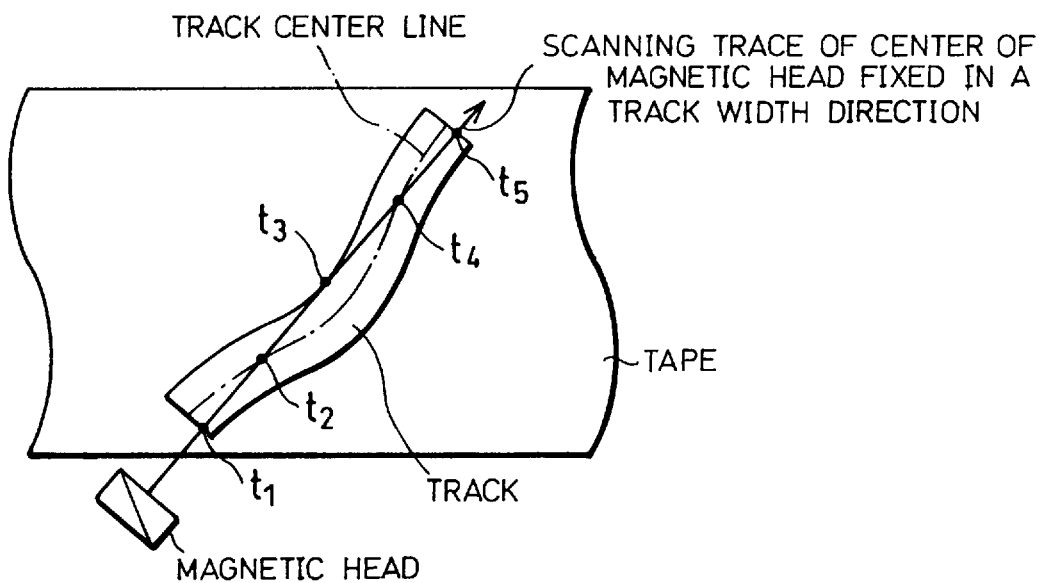
FIG. 47 is an explanatory view explaining a track bend.
Figure 48:
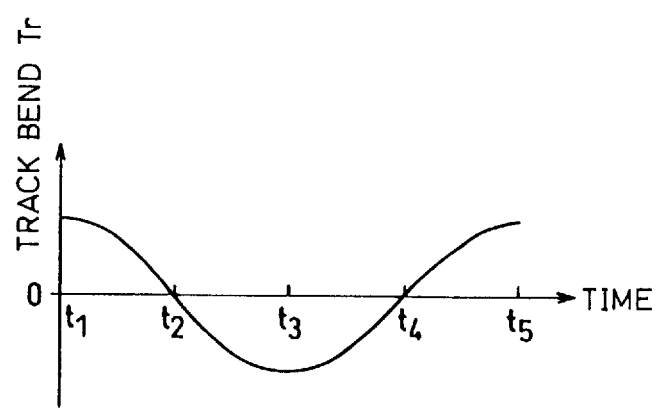
FIG. 48 is a graph showing a correlation between a change in time and the track bend in the case where the magnetic head is moved as shown in FIG. 47.
Figure 49:
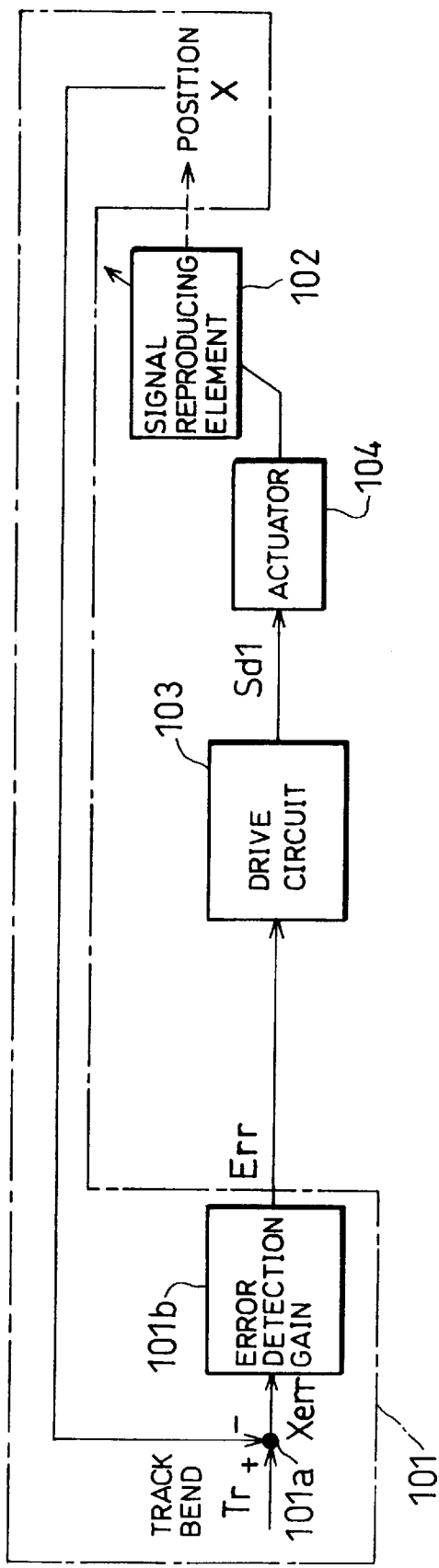
FIG. 49 which shows prior art is a block diagram showing a structure of essential parts of the control system in the information recording and reproducing apparatus.

As shown in FIG. 46, the information recording and reproducing device in accordance with the present embodiment includes the actuator 2 for moving the signal reproducing element 1 based on an instructed control input Sd1, a drive circuit (controlling element) 4a for instructing an amount of operation Sd1 to the actuator 2 based on the resulting access target, an actuator simulation circuit (actuator simulation means) 6 for estimating the position X of the signal reproducing element 1 with respect to the control input Sd1, and a comparator (comparison means) 15 for comparing the estimated position signal $\hat{x}$ estimated by the actuator simulation circuit 6 with the target access. In FIG. 46, those shown in respective preferred embodiments of the present invention will be designated by the same reference numerals, and thus the descriptions thereof shall be omitted here.

In the described arrangement, the comparator 15 compares the estimated position signal $\hat{x}$ with the target access, and the drive circuit 4a outputs the drive signal Sd1 to the actuator 2 and the actuator simulation circuit 6 based on a result of comparison. Furthermore, the actuator simulation circuit 6 estimates the position X of the signal reproducing element based on the drive signal Sd1, and the comparator 15 compares the output $\hat{x}$ of the actuator simulation circuit 6 with the access target again. As a result, the signal reproducing element 1 is controlled so as to be coincides with the access target, and reaches the desired position at high speed.

Therefore, in order to enable the signal reproducing element 1 to access the target track at high speed, it is required to increase the moving speed. On the other hand, with an increase in moving speed it becomes difficult to stop the signal reproducing element 1 precisely at the target track due to the effect of the weight of the signal reproducing element 1. Therefore, in the conventional information recording and reproducing apparatus, such as a magnetic disk device, an optical disk device, etc., a speed sensor is provided to control the moving speed of the signal reproducing element 1 to be reduced in a vicinity of the target track.

In contrast, in the information recording and reproducing apparatus in accordance with the present embodiment, the drive signal Sd1 to be applied to the actuator 2 is adjusted in accordance with a difference between the access target and the estimated position signal $\hat{x}$. As a result, as in the conventional mode, the information recording and reproducing apparatus is able to guide or hold the signal reproducing element 1 at high speed to the target position such as the target track position without performing the control in accordance with the speed of the signal reproducing element by means of a sensor nor detecting the position of the position of the signal reproducing element 1. As a result, the sensor is not needed, and the structure of the signal recording and reproducing device can be simplified.

As described, first through eleventh embodiments, for example, like the information recording and reproducing device adopting the punch-through servo system has been explained for controlling the actuator 2 which can be expressed by the second-order lag element having a resonance, and the drive circuit 4 performs a phase-lead compensation in a higher band than the resonance frequency $f_r$ of the actuator. However, it is not limited to this. Each of the described preferred embodiment is also applicable to the control system which does not adopt the punch-through servo system.

However, as the control system of each embodiment offers an improved following precision while maintaining the stability, even for the control system of the punch-through servo system, a sufficient stability can be ensured. Therefore, while setting the resonance frequency $f_r$ of the actuator 2 low, an improved following precision and the following frequency of the signal reproducing element 1 can be achieved. As a result, the information recording and reproducing apparatus of the described preferred embodiments is especially advantageous in that a reduction in power consumption and an improved recording density by an improved following precision of the signal reproducing element 1 with respect to the track bend Tr can be achieved. Such effect is especially noticeable when adopting the band-pass filter having a center frequency of the fundamental frequency $f_{tr}$ of the track bend Tr as shown in the fourth, sixth and eighth embodiments.

Additionally, in the first through eleventh embodiments, explanations have been given through the case of adopting the control system to the information recording and reproducing apparatus such as the disk device, the rotary head-type magnetic tape device, etc., however, the present invention is not intended to be limited to this. For example, the control system may be designed for a camera, robot, etc., to adjust the position, speed, and acceleration of the lens axis and arm to follow the desired value. Namely, in the case where the apparatus to which the described control system is not the information recording and reproducing apparatus, i.e., the object to be controlled does not include the track, the track bend Tr corresponds to a desired value of the object to be controlled in each device.

However, it is especially preferable to adopt the control system to the information recording and reproducing device, as the recording density and the recording capacity of the recording medium to be recorded or reproduced by the information recording and reproducing apparatus can be improved. To be more specific, in the information recording and reproducing apparatus, in order to improve the recording density and recording capacity of the recording medium, it is required to perform the tracking control or the focus control at high precision over a wide band. On the other hand, due to the track bend Tr or the wrap of the disk, the respective desired values of the tracking control and the focus control vary as time passes. Furthermore, normally, in each control of the information recording and reproducing device, the error detector 3 detects only a relative error between the signal reproducing element 1 and the desired value. Therefore, the target to be followed such as the track bend, disk wrap, etc., cannot be measured independently. Especially, the track bend cannot be measured by means of a sensor.

However, by adopting the control system adopted in each of the embodiments to the information recording and reproducing apparatus, it is permitted to make the signal reproducing element 1 follow the target without directly measuring the described desired values. As a result, the information recording and reproducing apparatus permits an improved recording density and recording capacity of the recording medium.

By adopting the described control system to the tracking control of the information recording and reproducing apparatus, even with respect to a fine track bend Tr which is not a problem in the case of wide track width like the conventional arrangement, the signal reproducing element 1 can follow at high precision. As a result, even when reducing an interval between tracks formed on the recording medium, the signal reproducing element 1 is permitted to perform at least either one of a recording operation and a reproducing operation with respect to a desired track without having an effect from an adjoining track. This permits a track width to be reduced, thereby improving the recording density of the recording medium and increasing the recording capacity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for controlling an object which performs a mechanical operation, comprising:
   a detector for detecting a relative difference between a controlled variable of said object and a desired value;
   a controlling element for adjusting a control input to be instructed to said object based on the relative difference;
   object simulation means for estimating the controlled variable of said object based on the control input to be applied to said object and outputting a controlled variable estimated signal;
   target estimation means for estimating a target value of the controlled variable based on said relative difference and the controlled variable estimated signal and outputting a desired follow-up estimated signal; and
   a feedforward gain for feedfowarding said desired follow-up estimated signal to an input side or an output side of said controlling element.

2. The control system as set forth in claim 1, wherein said feedforward gain includes:
   inverse characteristic simulation means for simulating inverse characteristics of said object; and
   a filter.

3. The control system as set forth in claim 2, wherein:
   said filter is a low-pass filter in which a cut-off frequency is higher than a gain-crossover frequency in open-loop transfer characteristics of a control system being constituted by said object, said detector, and said controlling element.

4. The control system as set forth in claim 2, wherein:
   said filter is a low-pass filter in which a cut-off frequency is lower than a gain-crossover frequency in open-loop transfer characteristics of a control system being constituted by said object, said detector, and said controlling element.

5. The control system as set forth in claim 2, wherein:
   said filter is a band-pass filter for passing a frequency component equivalent to a fundamental frequency of said target to be followed by said object to be controlled.

6. The control system as set forth in claim 5, wherein:
   said band-pass filter has a center frequency equivalent to the fundamental frequency of the target to be followed by said object to be controlled.

7. The control system as set forth in claim 6, wherein:
   said band-pass filter is a second order band-pass filter.

8. The control system as set forth in claim 5, wherein:
   said object simulation means simulates characteristics of the object to be controlled in a passband of said band-pass filter.

9. The control system as set forth in claim 8, wherein:
   said object simulation means is a gain of a proportional element.

10. The control system as set forth in claim 5, wherein:
    said inverse characteristic simulation means simulates inverse characteristics of said object in a passband of said band-pass filter.

11. The control system as set forth in claim 10, wherein:
    said inverse-characteristic simulation means is a gain of a proportional element.

12. The control system as set forth in claim 5, wherein:
    said feedforward gain includes a low-pass filter in which a cut-off frequency is higher than the fundamental frequency.

13. The control system as set forth in claim 12, wherein:
    said band-pass filter is a second order band-pass filter.

14. The control system as set forth in claim 1, wherein:
    said feedforward gain includes inverse characteristic simulation means for simulating inverse characteristics of said object to be controlled, and a gain of a proportional element.

15. The control system as set forth in claim 1, wherein:
    said feedforward gain includes inverse characteristic simulation means for simulating inverse characteristics of said object to be controlled and a gain part in which a maximum value for the gain in the transfer function is set to substantially 1.

16. The control system as set forth in claim 1, wherein:
    said object simulation means simulates at least integral characteristics of the highest order of all the characteristics of said object to be controlled, and
    said feedforward gain includes inverse characteristic simulation means for simulating inverse characteristics with respect to at least integral characteristics of the highest order of all the characteristics of said object to be controlled.

17. The control system as set forth in claim 5, wherein:
    said object to be controlled is a second-order lag element having a resonance, and
    said controlling element includes a phase compensation part for compensating for a phase-lead in a higher frequency band than a resonance frequency of said object to be controlled.

18. An information recording and reproducing apparatus, comprising;
    a signal recording and reproducing part for performing at least either one of a recording operation and a reproducing operation with respect to a recording medium on which tracks are formed;
    an actuator for moving said signal recording and reproducing part; and
    said control system as set forth in claim 1 in which said actuator is the object to be controlled.

19. The information recording and reproducing apparatus as set forth in claim 18, wherein:

said actuator moves said signal recording and reproducing part in a widthwise direction of said track, and said detector detects an error in relative position between the signal recording and reproducing part and a track as desired.

20. A control system for controlling an object which performs a mechanical operation, comprising:

a detector for detecting a relative error between a controlled variable of said object to be controlled and a desired value, and a controlling element having a positive feedback loop through a filter, for adjusting a controlled input to be applied to said object to be controlled based on the relative error, wherein a frequency characteristics of the filter is set so as to have a gain of not more than 0 db in a higher band than a gain crossover frequency in open loop transmission characteristics of a control system composed of the object to be controlled, the detector and the controlling element when the filter is disconnected.

21. The control system as set forth in claim 20, wherein: said filter is a low-pass filter.

22. The control device as set forth in claim 20, wherein: said filter is a band-pass filter.

23. The control system as set forth in claim 22, wherein: said filter is a band-pass filter for passing a frequency component equivalent to a fundamental frequency of said target to be followed by said object to be controlled.

24. The control system as set forth in claim 23, wherein: said object to be controlled is a second-order lag element having a resonance, and said controlling element includes a phase compensation part for compensating for a phase-lead in a higher frequency band than a resonance frequency of said object to be controlled.

25. An information recording and reproducing apparatus, comprising;

a signal recording and reproducing part for performing at least either one of a recording operation and a reproducing operation with respect to a recording medium on which tracks are formed;

an actuator for moving said signal recording and reproducing part; and a control system as set forth in claim 20 in which said actuator is said object to be controlled.

26. The information recording and reproducing apparatus as set forth in claim 25, wherein:

said actuator moves said signal recording and reproducing part in a widthwise direction of said track, and said detector detects an error in relative position between the signal recording and reproducing part and a track as desired.

27. A control system which generates a desired value intermittently and controls an object which performs a mechanical operation, comprising:

a controlling element for adjusting a control input to be applied to said object to be controlled based on an input control;

a detector for supplying a relative difference between a control variable of said object to be controlled and the desired value to said controlling element during a detection period in which a desired value is generated;

object simulation means for estimating the control variable of said object to be controlled and outputting the controlled variable estimated signal based on the control input to be instructed to said object to be controlled;

target follow-up estimation means for estimating a desired value of said controlled variable based on the relative difference and the controlled variable estimated signal and outputting a desired follow-up estimated signal;

target stand-by generation means for generating a target stand-by signal indicative of a target to be followed of a controlled variable in other non-direction period based on the desired follow-up estimated signal in said detection period; and comparison means for supplying a difference signal between the target stand-by signal and the controlled variable estimated signal to said controlling element in the non-detection period.

28. The control system as set forth in claim 27, wherein: said target stand-by generation means prepares a target stand-by signal in which a value at an end of the non-detection period coincides with a value of the desired follow-up estimated signal at a start of the last detection period.

29. The control system as set forth in claim 28, wherein: said target stand-by generation means includes memory means which holds the target follow-up estimated signal at a start of the detection period, and during the next non-detection period, keeps outputting a value thus held as the target stand-by signal.

30. The control system as set forth in claim 28, wherein: said target stand-by generation means generates a signal having a waveform which does not contain a DC component as the target stand-by signal during the non detection period.

31. The control system as set forth in claim 30, wherein said target stand-by generation means includes:

a reference waveform generator which generates a reference waveform at a predetermined period and an amplitude;

a multiplier for multiplying a reference waveform by a specified factor;

a factor specifying means for specifying a factor to said multiplier based on a value of the desired follow-up estimated signal at a start of the last detection period.

32. The control system as set forth in claim 31, wherein: said reference waveform generator generates a cos-waveform having a period having the length of said non-detection period, an amplitude of "1" and a size of "1" at an end of the non-detection period, and said factor specifying means is memory means for storing a value of the desired follow-up estimated signal at a start of the last detection period.

33. The control system as set forth in claim 27, further comprising:

a feedforward gain for feedforwarding said desired follow-up estimated signal to an input side or an output side of said controlling element.

34. The control system as set forth in claim 27, wherein: said controlling element includes a positive feedback loop through a filter.

35. An information recording and reproducing apparatus, comprising;

a signal recording and reproducing part for performing at least either one of a recording operation and a reproducing operation with respect to a recording medium on which tracks are formed;

an actuator for moving said signal recording and reproducing part; and a control system as set forth in claim 27 in which said actuator is said object to be controlled.

36. The information recording and reproducing apparatus as set forth in claim 34, wherein said recording medium is a magnetic tape, the information recording and reproducing apparatus further comprising:
- a rotary drum having the magnetic tape wound around an outer surface thereof at a predetermined angle; and
- said signal recording and reproducing part is a magnetic head mounted on an outer surface of said rotary drum; and
- said actuator guides said magnetic head to a desired track formed on the magnetic tape.

37. An information recording and reproducing apparatus, comprising;
- a signal recording and reproducing part for performing at least either one of a recording operation and a reproducing operation with respect to a recording medium on which tracks are formed;
- an actuator for moving said signal recording and reproducing part;
- a controlling element for adjusting a control input to be applied to said actuator;
- actuator simulation means for estimating a position of said signal recording and reproducing part based on the control input to be instructed to said actuator and outputting an estimated position signal; and
- comparison means for inputting a difference signal between the desired value indicative of a desired position of said signal recording and reproducing part and the estimated position signal to said controlling element.

38. A control system for controlling an object which performs a mechanical operation, comprising:
- a detector for detecting a relative error between a controlled variable of said object to be controlled and a desired value,
- a controlling element having a positive feedback loop through a filter for adjusting a controlled input to be applied to said object to be controlled based on the relative error,
- said object to be controlled is a second-order lag element having a resonance, and
- said controlling element includes a phase compensation part for compensating for a phase-lead in a higher frequency band than a resonance frequency of said object to be controlled.

39. The control system as set forth in claim 38 wherein:
said filter is a band-pass filter for passing a frequency component equivalent to a fundamental frequency of said target to be followed by said object to be controlled.

* * * * *